(12) United States Patent
French

(10) Patent No.: US 6,243,875 B1
(45) Date of Patent: Jun. 12, 2001

(54) THERMOBONDED GLOVES AND METHODS OF MAKING SAME

(75) Inventor: Robert C. French, Solvang, CA (US)

(73) Assignee: North Safety Products, Inc., Cranston, RI (US)

( * ) Notice: Subject to any disclaimer, the term of this patent is extended or adjusted under 35 U.S.C. 154(b) by 0 days.

(21) Appl. No.: 09/216,188

(22) Filed: Dec. 18, 1998

Related U.S. Application Data

(62) Division of application No. 08/870,837, filed on Jun. 6, 1997, now Pat. No. 6,039,829.

(51) Int. Cl.[7] .................................................. A41D 19/00
(52) U.S. Cl. ................................. 2/167; 2/169; 156/251
(58) Field of Search .............................. 2/159, 167, 169; 156/251, 252, 256, 258, 267, 250, 308.4, 515, 285

(56) References Cited

U.S. PATENT DOCUMENTS

| | | |
|---|---|---|
| 3,028,576 | 4/1962 | Gerard . |
| 3,147,493 | 9/1964 | Winson . |
| 3,250,660 | 5/1966 | Greig et al. . |
| 3,387,307 | 6/1968 | Blatz . |
| 3,536,568 | 10/1970 | Rothstein . |
| 3,866,245 | 2/1975 | Sutherland . |
| 4,034,853 | 7/1977 | Smith . |
| 4,555,293 | 11/1985 | French . |
| 4,604,152 | 8/1986 | Liukko . |
| 4,643,791 | 2/1987 | Jurrius et al. . |
| 4,776,921 | 10/1988 | French . |
| 4,804,432 | 2/1989 | Jurrius et al. . |
| 4,916,757 | 4/1990 | Berlin et al. . |
| 5,244,525 | 9/1993 | Neuwirth et al. . |
| 5,429,707 | 7/1995 | Smith . |
| 6,065,155 * | 5/2000 | Sandusky ........................ 2/161.1 |

* cited by examiner

Primary Examiner—Peter Nerbun
Assistant Examiner—Katherine Moran
(74) Attorney, Agent, or Firm—Pitney, Hardin, Kipp and Szuch LLP

(57) ABSTRACT

Two types of gloves with thermobonded seams that define fingers and a thumb portion that extends over the palm of the glove thus allowing free thumb rotation are disclosed. Devices for manufacturing the two types of gloves are disclosed. Methods from manufacturing the gloves, including two ways to manufacture the thumb portion, are disclosed. An improved die plate for thermobonding that holds a heat element in a channel using wedge shaped channel walls is disclosed.

9 Claims, 30 Drawing Sheets

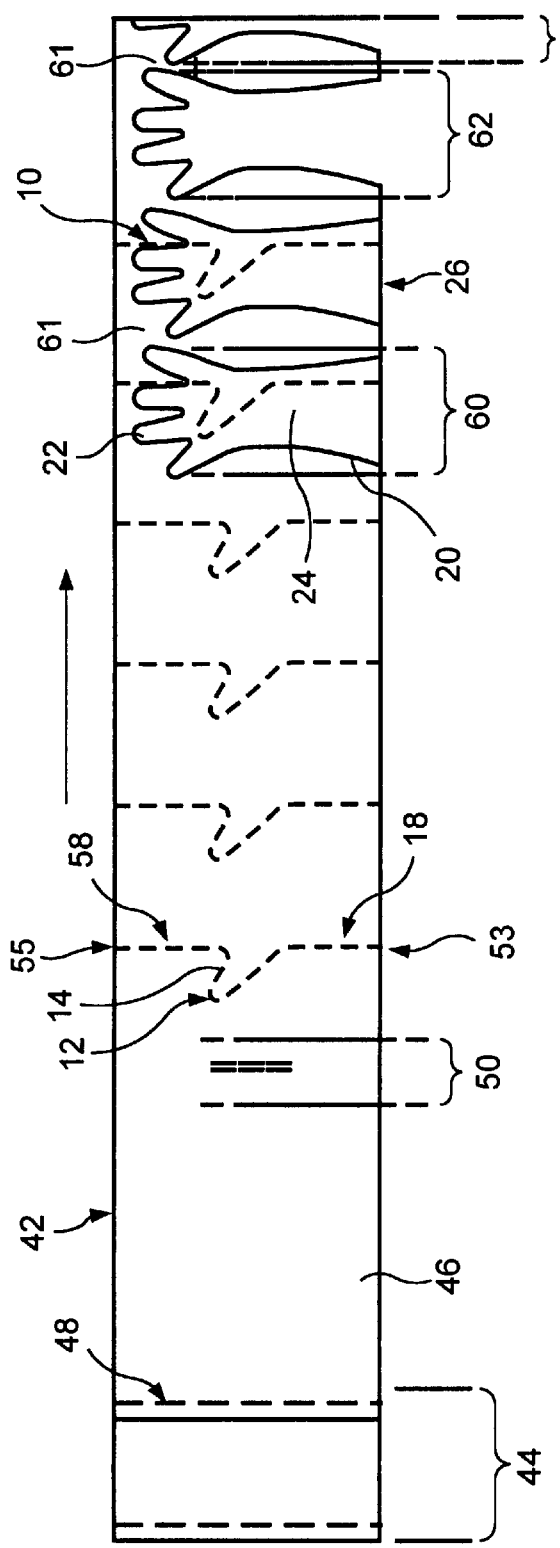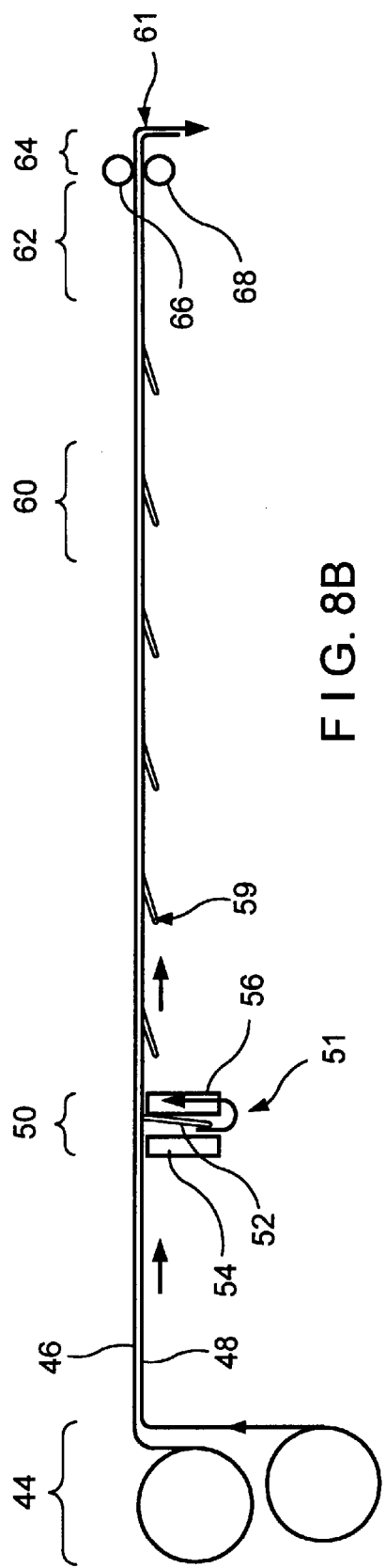

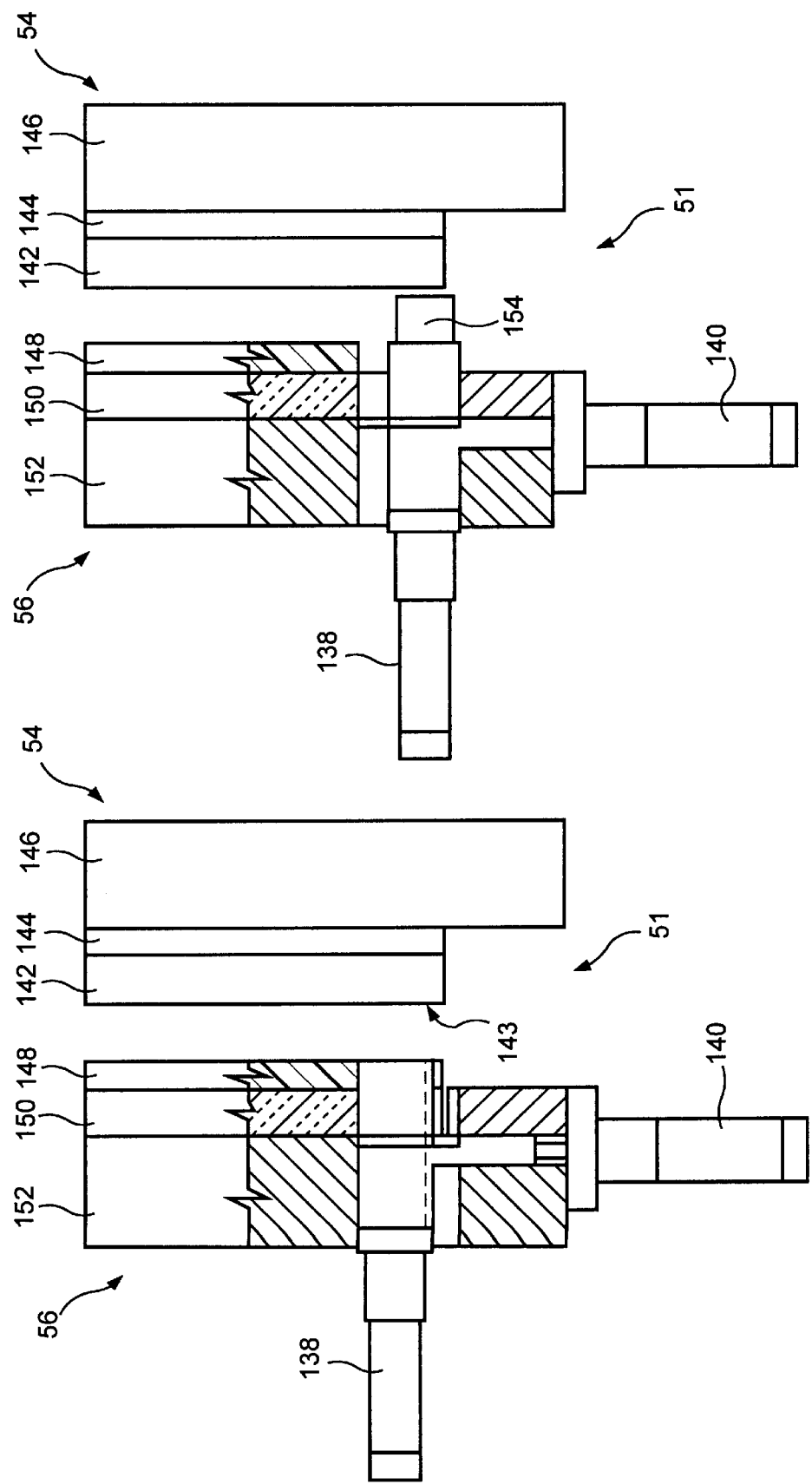

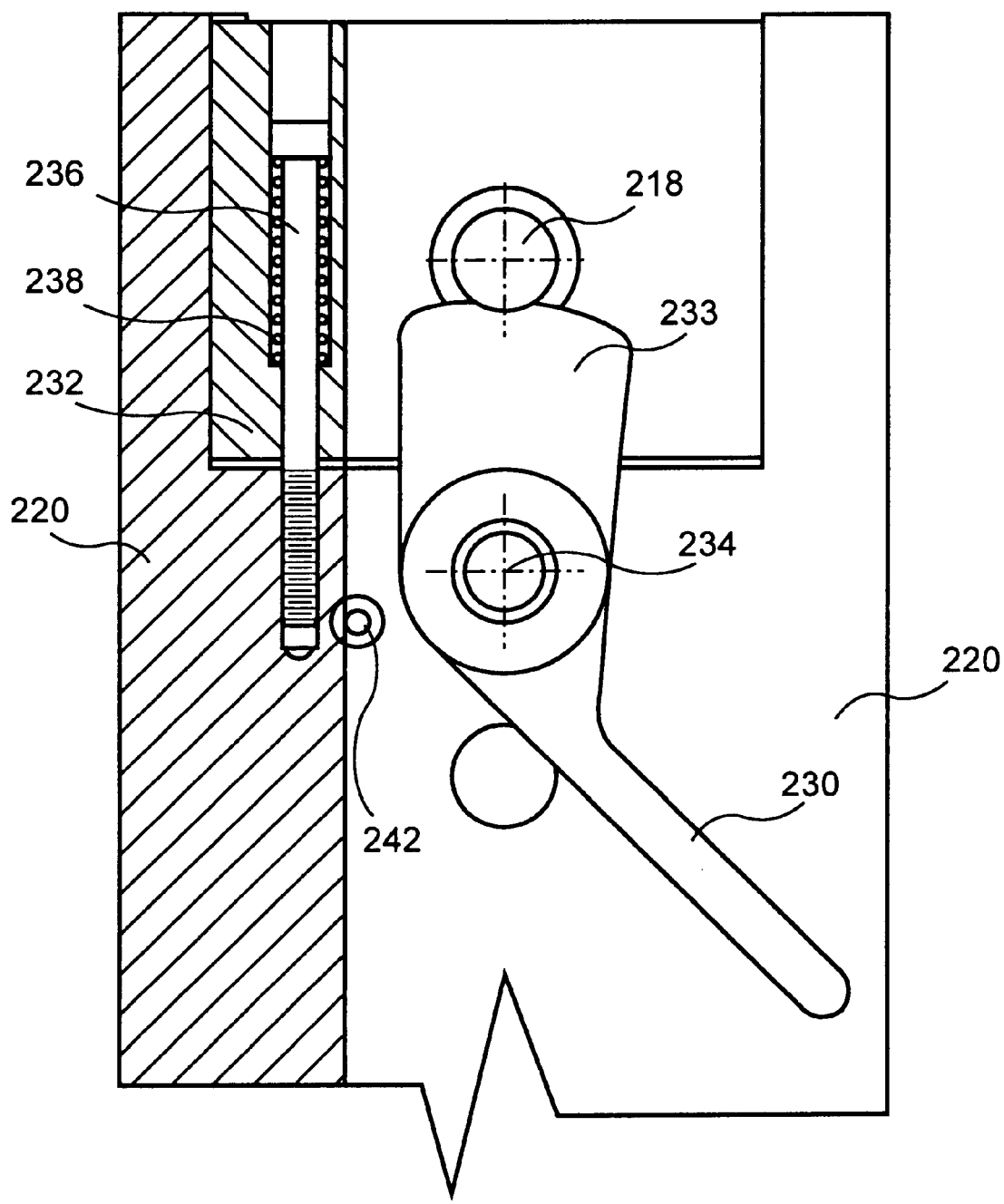
F I G. 16C

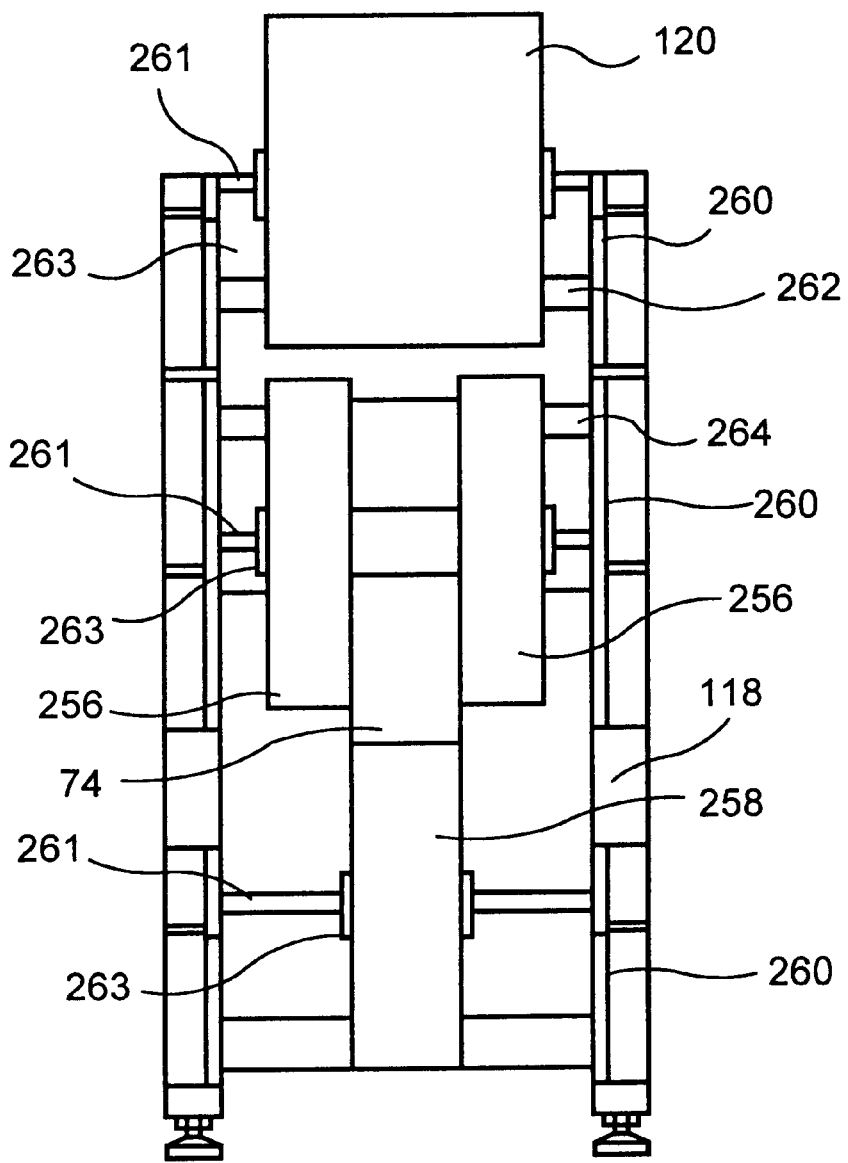
F I G. 20

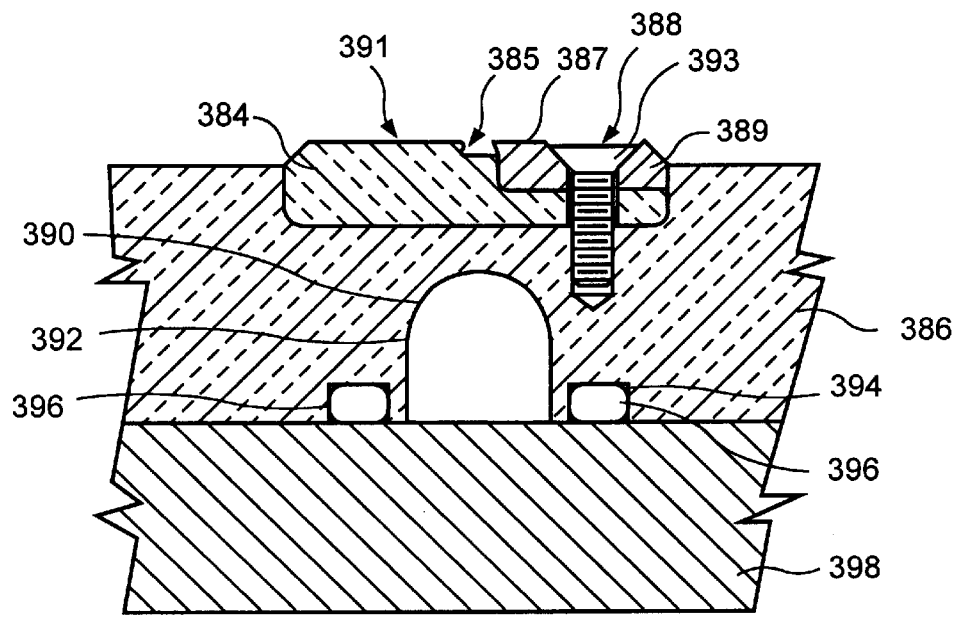
F I G. 27A
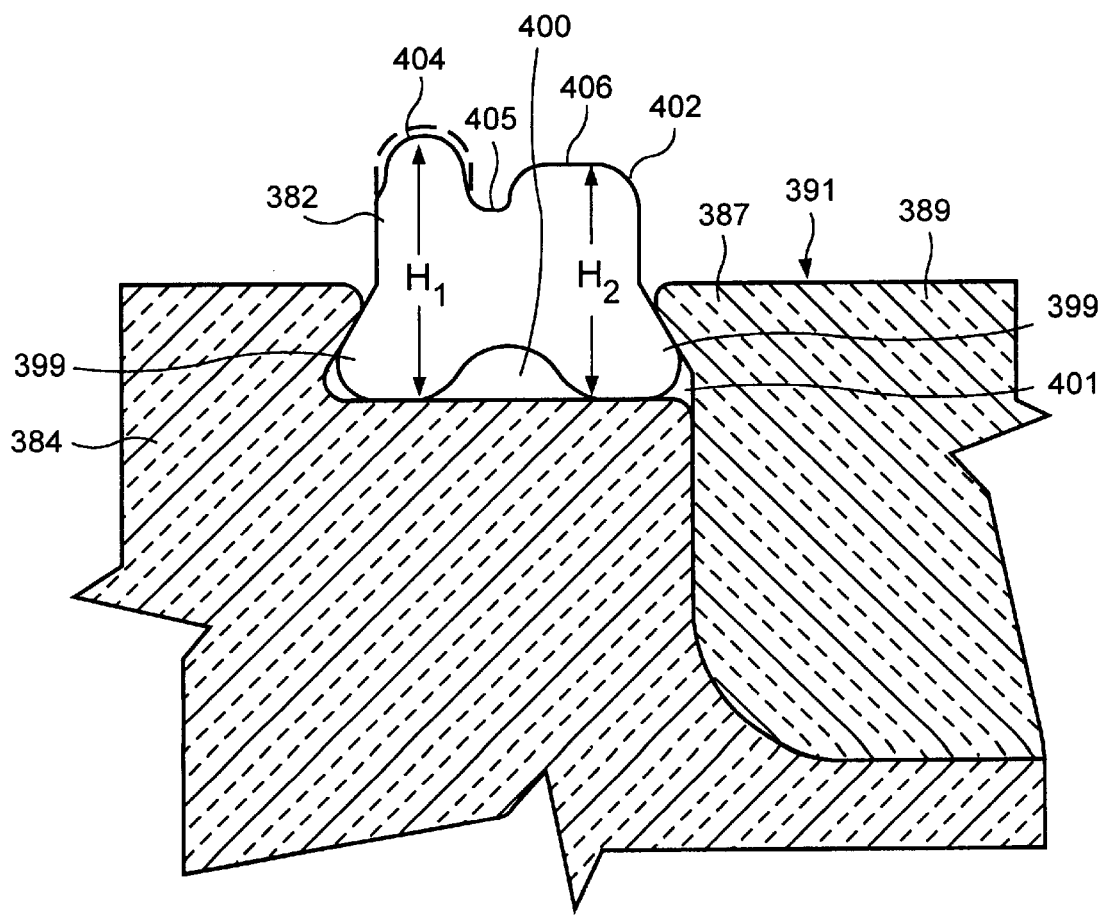
F I G. 27B

THERMOBONDED GLOVES AND METHODS OF MAKING SAME

This application is a division of Ser. No. 08/870,837 Jun. 6, 1997 now U.S. Pat. No. 6,039,829.

BACKGROUND OF THE INVENTION

This invention relates to a device and method for making gloves, and specifically relates to an apparatus and methods for making a glove with thermobonded seams having fingers, a hand portion and a thumb portion that folds inwardly across the hand portion to provide better fit and to relieve stress at seams attaching the thumb portion to the hand portion.

Many prior art gloves have been manufactured using thermobonding around the periphery of the glove to define the finger and thumb portions attached to a hand portion. For example, U.S. Pat. No. 3,866,245 describes a plastic glove with a peripheral thermobonded seam and a precut liner inset and methods of making such a glove. A glove with a finely powdered coating to prevent sticking of the material except at its thermobonded seams is disclosed in U.S. Pat. No. 3,387,307. U.S. Pat. No. 3,147,493 discloses a thermobonded mitten or glove having a separate thumb crotch and a thermobonded seam across the palm at the level of the thumb crotch. U.S. Pat. No. 4,916,757 describes a thermobonded glove having peripheral sealed seams that define a thumb, forefinger and a mitten-like portion and a method of making the glove. Die-cut gloves made from a strip of film sealed around the glove periphery are severably connected by joining the finger of one glove to the wrist of an adjacent glove as described in U.S. Pat. No. 4,034,853. Similarly, thermobonding can be used to form other types of garments such as those described in U.S. Pat. No. 5,429,707.

A variety of thermobonding devices and methods to produce seams of gloves, mittens or other garments are known. For example, U.S. Pat. No. 4,555,293 and U.S. Pat. No. 4,776,921 disclose thermobonding plastic sheets by melting the material in a confined void zone located between a heating element and a pressure means. U.S. Pat. No. 3,028,576 discloses an apparatus and method of thermobonding seams and cutting away peripheral edges of gloves. An apparatus for thermobonding sheet material using cooperating die members and a vacuum to draw the sheet material to the die is described in U.S. Pat. No. 3,250,660. Another thermobonding device to seal and sever plastic films using a rapidly heated die is disclosed in U.S. Pat. No. 3,536,568. U.S. Pat. No. 5,244,525 describes a method of thermobonding and cutting sheets of polymer film by applying a xerographic toner in an outline of a seam and then exposing the toner to infrared radiation to melt the film U.S. Pat. No. 4,604,152 discloses a method of making a sealed waterproof seam by melting a thermoadhesive adjacent to a stitched seam. U.S. Pat. No. 4,643,791 and U.S. Pat. No. 4,804,432 disclose a device and methods for manufacturing thermobonded gloves by first forming a thermobonded thumb-shaped loop and then joining the thumb loop to the thermobonded fingers of a glove.

Many of the prior art devices and methods of manufacturing thermobonded gloves inefficiently utilize raw materials in the process, producing relatively large amounts of scrap. Moreover, some methods of removing scrap material cause stress on the glove materials, thus stretching and weakening of the materials or producing misalignment of materials in the process line resulting in substandard gloves and further wastage. Prior art devices and methods often require an additional step of cutting the wrist of the final glove to free it from the scrap material. Many thermobonding methods degrade the integrity of the thermoplastic materials by stretching the material during sealing which produces thinner weaker seams or intermittent weak points in the seams. Moreover, thermobonding devices are often susceptible to buckling during heating due to expansion of the heat element. Buckling is particularly a problem in contoured regions such as used to form a thumb or fingertips of a glove.

Gloves formed by peripheral thermobonded seams that define a thumb and fingers in a single plane limit hand movement because stress occurs across the back of the hand when the thumb and/or fingers are flexed. Such gloves inhibit free rotation of the thumb and produce stress points in the thermobonded seams, particularly at the crotch of the thumb and the fingers. Stress points tend to rip during glove usage, exposing the user's hands to hazardous materials or exposing the handled materials to contamination from the user's hands. To avoid glove stress and seam failure, users tend to wear gloves that are substantially oversized. Oversized gloves, however, present additional problems because they interfere with dexterity, bunch in the palm region and slip from the user's hand. Thus oversized gloves also risk exposing the user's hands to hazardous materials or entangling the glove material with machinery.

The gloves of the present invention overcome many of the deficiencies of the prior art gloves by allowing free rotation of the thumb relative to the fingers, thus relieving stress points in thermobonded seams and providing better fitting gloves. This eliminates the need to wear substantially oversized gloves. Moreover, the glove design lends itself to good manufacturing processes. Because substantially oversized gloves are not required by the user, the amount of thermoplastic material used to manufacture gloves suitable for the user is conserved. The methods of the present invention overcome many of the problems of the prior art by efficiently utilizing materials during glove production and eliminating the need for cutting the gloves at the wrist during manufacturing. Strong, even thermobonded seams are produced by using the improved thermobonding device of the present invention.

SUMMARY OF THE INVENTION

According to the invention, there is provided a glove that includes a wrist portion, the wrist portion formed from at least two layers of thermoplastic material such that the wrist portion has an outside surface, an inside surface, a lower end and an upper end, wherein the lower end defines an aperture of the glove for inserting a hand therethrough; a hand portion, the hand portion formed from at least two layers of thermoplastic material such that the hand portion has an outside surface, an inside surface, a lower end and an upper end, wherein the lower end of the hand portion is connected to the upper end of the wrist portion; a plurality of diverging fingers, the fingers formed from at least two layers of thermoplastic material such that each finger has a lower end defining an opening for inserting a user's finger therethrough and an upper end, the upper end of the finger being closed; a peripheral seam, the peripheral seam being a thermobonded seam joining the at least two layers of thermoplastic material, thereby forming the wrist portion, the hand portion and the diverging fingers, such that the wrist portion and the hand portion are aligned along a longitudinal axis that is perpendicular to the upper end of the wrist portion and to the lower and upper ends of the hand portion; a thumb portion, the thumb portion formed from at least two layers of the plastic material and having an inside surface and an outside surface, wherein the inside surface is connected to the inside surface of the hand portion, defining an internal opening for inserting a user's thumb into the thumb portion, the internal opening being located substantially along the longitudinal axis, and wherein the thumb portion extends over the hand portion at about a 45° angle relative to the longitudinal axis; and a thumb seam, the thumb seam being a thermobonded seam joining the at least two layers of thermoplastic material that form the thumb portion, the thumb seam having a curvilinear portion and a linear portion, the curvilinear portion defining a peripheral edge of the thumb portion and the linear portion defining a seam formed in the hand portion, wherein the linear portion is substantially parallel to the longitudinal axis. In one embodiment, the linear portion of the thermobonded thumb seam extends in a first direction to the peripheral seam adjacent to the lower ends of the fingers, and wherein the linear portion extends in a second direction to the lower end of the wrist portion. Another embodiment further includes at least one thermobonded seam transverse to the longitudinal axis on a palm of the glove. In another embodiment, the glove includes at least two thermobonded seams transverse to the longitudinal axis on the palm of the glove, wherein at least one thermobonded seam joins the upper end of the hand portion and thermoplastic material that forms the fingers, and wherein at least one thermobonded seam joins the upper end of the wrist portion and the lower end of the hand portion. In one embodiment, the thumb seam intersects the thermobonded seam transverse to the longitudinal axis on the palm. In one embodiment, the thermoplastic material is flexible and about 3 to 15 mils thick, preferably about 6 to 10 mils thick. In another embodiment, the thermoplastic material is an array of nonwoven spunbonded fibers, an array of woven or knit thermoplastic fibers, a polymeric film, or a laminate combination thereof, and preferably the thermoplastic material includes sheets of spunbonded polyolefin fibers, polyester, nylon, polytetrafluoroethylene (PTFE) or rayon acrylic.

According to another aspect of the invention, there is provided a method of making thermobonded gloves, including the steps of providing a process line having a longitudinal axis; feeding a first sheet of thermoplastic material into the process line; forming a loop in the first sheet of thermoplastic material, the loop being substantially perpendicular to the process line; thermobonding a thumb seam between two layers of thermoplastic material forming the loop, thereby forming a thumb portion for insertion of a user's thumb therein; feeding a second sheet of thermoplastic material into the process line; translocating the thumb portion along the process line such that the thumb portion is in adjacent facing relation with the second sheet of thermoplastic material; and thermobonding a peripheral seam between the two sheets of thermoplastic material, wherein the thermobonding step includes forming an aperture in the glove for inserting a user's hand therein. In one embodiment, the method also includes the step of feeding at least a third sheet of thermoplastic material into the process line to form a portion of a palm of the glove. In another embodiment, the method also includes the steps of removing the glove from the process line, and removing scrap material from the process line. A preferred embodiment also includes the step of removing scrap material from the loop after thermobonding the thumb seam. In one embodiment, the translocating step includes lifting the thermoplastic material and moving the thermoplastic material along the process line by a clamp means. In another embodiment, the thermobonding step of the peripheral seam forms a wrist portion and a hand portion at an angle of about 90° relative to the longitudinal axis of the process line.

According to another aspect of the invention, there is provided a method of making thermobonded gloves, including the steps of providing a first process line having a longitudinal axis; feeding a first layer of thermoplastic material into the first process line; feeding a second layer of thermoplastic material into the first process line, the second layer being a narrower width than a width of the first layer, wherein the first and second layers are in facing adjacent relation such that at least one side edge of each of the first and the second layers are in alignment; thermobonding the first layer and second layers forming a thumb seam, the thumb seam extending between a first side edge and a second side edge of each of the first and second layers; providing a second process line having a longitudinal axis perpendicular to the longitudinal axis of the first process line; feeding a sheet of thermoplastic material into the second process line; translocating the thumb portion in alignment with the second process line such that the thermoplastic material containing the thumb portion is in adjacent facing relation with the sheet of thermoplastic material in the second process line; and thermobonding the thumb portion and the sheet of thermoplastic material on the second process line thereby forming a peripheral seam of the glove, the peripheral seam forming an aperture in the glove for inserting a user's hand therethrough. In one embodiment, the first and second layers of thermoplastic material are formed from a single sheet of thermoplastic material, whereas in another embodiment the first and second layers are separate sheets of thermoplastic material. One embodiment of the method also includes the steps of removing scrap material from around the thumb portion by holding the scrap material stationary while the thumb portion is translocating in alignment with the second process line, and translocating the scrap material from around the thumb portion along the first process line to a scrap removal station. In one embodiment, the thermobonding step for forming the peripheral seam forms a wrist portion and a hand portion at an angle of about 90° relative to the longitudinal axis of the second process line.

According to another aspect of the invention, there is provided an apparatus for manufacturing a glove, including a process line with a translator means for moving thermoplastic material along the process line; a loop forming means for moving a portion of thermoplastic material from the process line to form a loop perpendicular to the process line, wherein the loop includes two adjacent facing layers of thermoplastic material connected at a base of the loop, each layer having a first side edge and a second side edge; a thumb forming die means for thermobonding a thumb seam between the two layers of the loop, wherein the thumb seam extends between the first side edge and the second side edge of each of the layers and defines a thumb portion; a peripheral seam forming die means located on the process line downstream from the thumb forming die means for thermobonding a peripheral seam between thermoplastic material containing the thumb portion and a second sheet of thermoplastic material on the process line, wherein the peripheral seam defines a wrist portion, hand portion and fingers of the glove in registry with the thumb portion, and wherein the peripheral seam extends from a first point on a side edge of the second sheet of thermoplastic material to a second point on the side edge of the second sheet of thermoplastic material to produce an open wrist portion; and a glove removal means located on the process line downstream from peripheral seam forming die means for removing the glove from the process line. The apparatus of one embodiment also includes a scrap removal system for removing scrap thermoplastic material from the thumb forming die means, from the process line or both. In one embodiment, the translator means includes a cooperating clamp and translator element such that thermoplastic material in the process line is sequentially held stationary by a clamp when the translator element is disengaged from the material and is released from the clamp when the translator element engages the material and moves it along the process line. In one embodiment, the clamp holds the material in contact with a material support platform and the translator element engages the material between two opposing flat faces of the translator element. In another embodiment, the loop forming means includes a hollow horizontal bar containing a pair of cables that prevent wobbling or skewing of the horizontal bar when it is moved by means of a power actuated plunger. In a preferred embodiment, each of the pair of cables has one end attached to a rigid support located above the horizontal bar, passes through the horizontal bar, and has one end attached to a rigid support located below the horizontal bar such that the pair of cables together substantially form the letter "H." In one embodiment, the thumb forming die means includes a die plate having an attached heating element in a contour shape defining the thumb seam shape and an opposing resilient pressure plate, both plates located substantially perpendicular to the process line. In another embodiment, the peripheral seam forming die means includes at least one die plate having an attached heating element in a contour shape defining the peripheral seam shape and at least one opposing resilient pressure plate. In a preferred embodiment, one set of die plate and opposing resilient pressure plate is used to form a right-handed glove and another set of die plate and opposing resilient pressure plate is used to form a left-handed glove. In one embodiment, the glove removal means includes a power actuated rod adjacent to the process line, a rotatable arm attached to the power actuated rod, and a lifting means for removing the glove from the process line and releasing the glove at a point outside of the process line. In a preferred embodiment, the lifting means includes a vacuum head with a porous baffle that lifts the glove by vacuum pressure and releases the glove by releasing the vacuum pressure on the glove. In another embodiment the lifting means includes a clamp that engages opposing fingers to lift the glove and disengages the opposing fingers to release the glove. Another embodiment also includes a means for moving a first strip and a second strip of thermoplastic material along the process line such that the first and second strips are adjacent to and overlapping with the sheet of thermoplastic material used to form the loop; and a strip sealing die means located on the process line downstream from the thumb forming die means and upstream from the peripheral seam forming die means for sealing the first and second strips to the sheet of thermoplastic material used to form the loop. In one embodiment, the strip sealing die means includes a pair of parallel seam sealing assemblies such that one sealing assembly seals the first strip to the sheet of thermoplastic material used to form the loop and the other sealing assembly seals the second strip to the sheet of thermoplastic material used to form the loop. In another embodiment, both a right-handed and left-handed glove can be made on the same apparatus. In a preferred embodiment, a right-handed and left-handed glove are positioned in opposing relation in the same process line on the same apparatus.

According to another aspect of the invention, there is provided an apparatus for manufacturing a glove, including a first process line with a translator means for moving thermoplastic material along the process line; a thumb forming die means located in the first process line for thermobonding a thumb seam between the two layers of thermoplastic material having different widths and in adjacent facing relation with each layer, both layers being aligned along at least one edge; a scrap removal means located on the first process line; a second process line with a translator means for moving thermoplastic material from the first process line to the second process line and for moving at least one additional sheet of thermoplastic material along the second process line; a peripheral seam forming die means located on the second process line that receives thermoplastic material containing the thumb portion from the first process line and a sheet of thermoplastic material on the second process line and thermobonds a peripheral seam between the thermoplastic material containing the thumb portion and the sheet of thermoplastic material, thereby forming in registry with the thumb portion, fingers, a hand portion and a wrist portion with a aperture for receiving a user's hand, and a glove removal means located on the second process line downstream from the peripheral seam forming die means. One embodiment also includes a strip seamer assembly located on the first process line for thermobonding a thermoplastic layer to a completed thumb portion to form a continuous strip of material that moves to the second process line. In one embodiment, the first process line is located in a plane parallel to a plane defined by the second process line and at about a 900 angle relative to the second process line.

According to another aspect of the invention, there is provided a die plate for forming a thermobonded seam including a metal plate having an upper surface, and a heat element housing member releasably attached to the metal plate, wherein the housing member has a pair of wedge shaped walls that define a channel for holding a heat element. In one embodiment, the upper surface of the metal plate includes a relief to prevent adhesion of thermoplastic material to the upper surface and a coating to provide electrical insulation. In another embodiment, the housing member also includes a set plate releasably attached to the housing member and to the metal plate, wherein a portion of the set plate defines a wedge-shaped wall of the housing member. Preferably, the metal plate includes a trough located below the heat element housing member for holding a heating means, a cooling means, a sensing means or any combination thereof. Another embodiment also includes a heat element having an exposed surface defining a contour shape above the upper surface of the metal plate, a pair of feet that fit within the channel and a relief located between the pair of feet. In one embodiment, the exposed surface of the heat element defines a contour shape in cross section that includes a semicircular head having a first height, a flattened head having a second height that is less than the first height, and a trough located therebetween having a third height that is less than the second height. In another embodiment, the exposed surface of the heat element defines a contour shape in cross section that is substantially semicircular or elliptical. In yet another embodiment, the exposed surface of the heat element defines a contour shape in cross section that is substantially triangular with an elliptical apex. In a prefered embodiment, the exposed surface of the heat element defines at least two different contour shapes in cross section at different regions along the longitudinal axis of the heat element.

BRIEF DESCRIPTION OF THE DRAWINGS

FIG. 8A is a plan view diagrammatically showing a process line for making type A gloves.

FIG. 8B is a side view of the process line of FIG. 8A.

FIG. 13A is a side view of the die means for forming a thumb seam with a means for removal of scrap material shown in the open position.

FIG. 13B is a side view of the die means for forming a thumb seam with a means for removal of scrap material shown in the open position.

FIG. 16C is a view of the release lever system with a partial cross section view taken along the line C—C of FIG. 16B.

FIG. 20 is a facing view of the glove manufacturing apparatus of FIG. 18 from the left-most end of FIG. 18.

FIG. 27A is a cross-section view of the die plate of FIG. 26A–26C taken along. the line 27—27 but without a heat element.

FIG. 27B is an enlarged cross-section view of the heat element housing containing a heat element used for thermobonding thermoplastic films and film laminates.

DETAILED DESCRIPTION OF THE PREFERRED EMBODIMENT

Thermobonded Gloves: Type A and Type B

Figures 1, 2, 3:
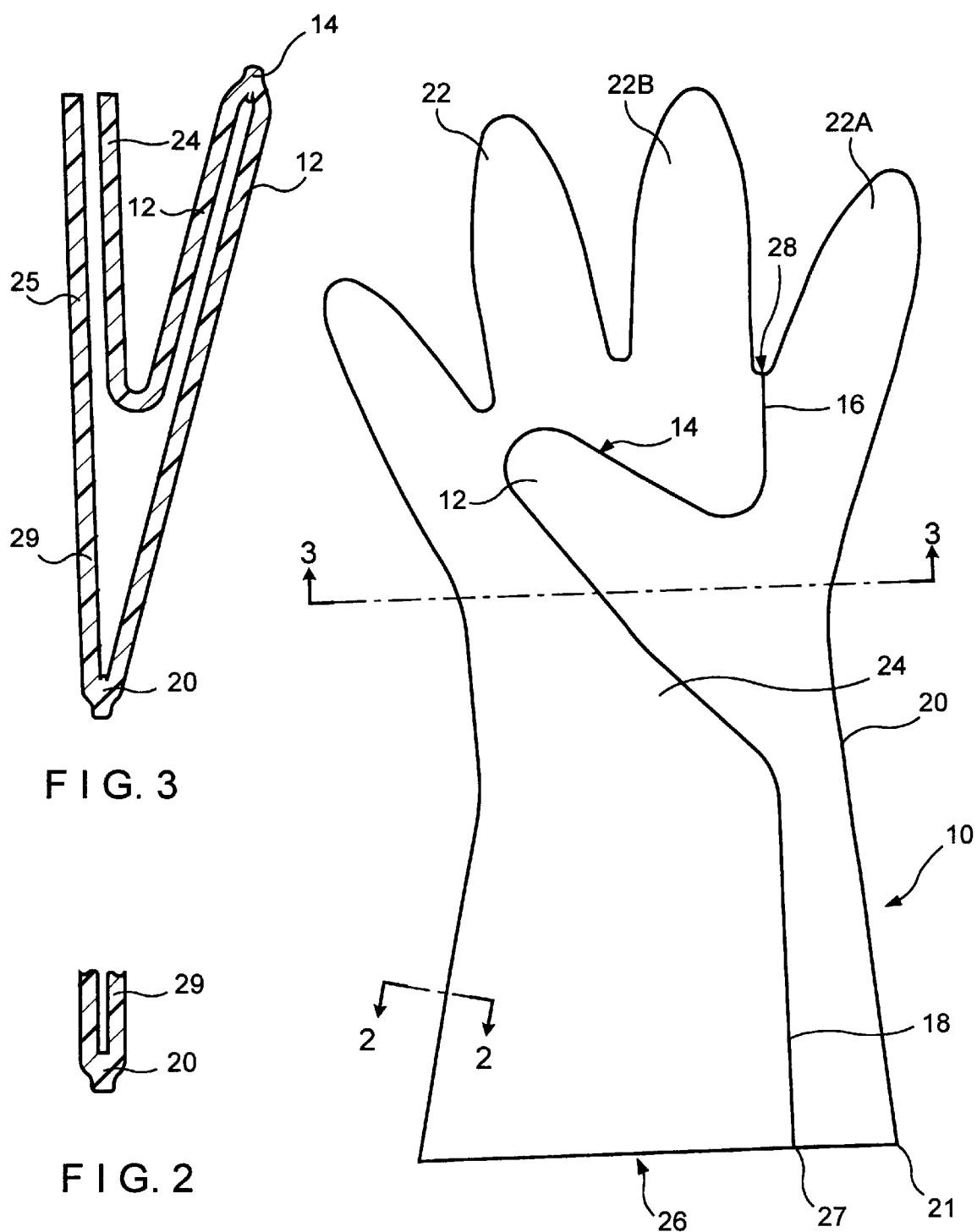
FIG. 1 is a plan view of a type A glove of the present invention.
FIG. 2 is a truncated cross section view taken along the line 2—2 of FIG. 1.
FIG. 3 is a truncated cross section view taken along the line 3—3 of FIG. 1.

Referring to FIG. 1, a type A glove 10 of the present invention has a thumb portion 12 defined by a thermobonded curvilinear seam 14 that extends into a first linear seam 16 extending toward the fingers 22 of the glove and a second linear seam 18 extending toward the wrist 26 portion of the glove. The first and second linear seams 16, 18 extend substantially along the longitudinal axis of the glove. A peripheral thermobonded seam 20 defines the four fingers 22 which are in a diverging relation to each other, and the hand portion 24 of the glove 10. The angle between the diverging fingers is between about 15° and about 400° and preferably is about 20° to about 25°. The wrist 26 portion of the glove is open between the two ends 21 of the thermobonded seam 20. The peripheral seam 20 is preferably projected slightly outward relation to the longitudinal axis of the glove been the hand portion 24 and the wrist 26 on the side opposite the thumb portion 12. The first linear seam 16 extending from the thumb curvilinear seam 14 joins the peripheral seam 20 at the crotch 28 between the forefinger 22A and the second finger 22B. The second linear seam 18 terminates at a point 27 on the wrist portion 26.

FIGS. 2 and 3 illustrate portions of the glove 10 in cross section showing the thermobonded peripheral seam 20 and the curvilinear seam 14 that defines the thumb portion 12. The plastic material 29 from which the glove is formed can be any flexible thermobondable material that resists liquid and gaseous chemicals. Preferred plastic materials include sheets of thermoplastic material that is microporous and hydrophobic, such as those made of a loose array of nonwoven spunbonded fibers, woven or knit thermoplastic fibers, laminate layers and polymeric films. Suitable plastic materials include sheets made of spunbonded polyolefin fibers (e.g., polyethylene and polypropylene fibers), nylon, polytetrafluoroethylene (PTFE) and rayon acrylic. Some elastomeric thermoplastic materials are also suitable such as, for example, urathanes, polyesters, styrene butadienes, copolymers, polyblends such as vinyl nitrile, modified acrylates, fluorocarbons and the like. The plastic material is about 3 to about 15 mils thick, preferably about 6 to about 10 mils thick, although it will be understood that thicker or thinner plastic material may be used.

As shown in FIGS. 2 and 3, the thermobonded seams 14, 20 are substantially the same thickness as the sum of the plastic sheets that are bonded together. That is, the thermobond results from fusing or cross-linking the different layers of the plastic material to form a nonintermittent seal that is approximately as thick as the bonded layers without substantial stretching or compression of the materials at the bond site.

As shown in FIG. 3, the plastic material 29 that forms the hand portion 24 extends without a seam into the thumb portion 12 where it is joined at a thermobonded seam 14 to another layer of the material 29 which forms the other half of the thumb portion 12. The back portion 25 of the glove is thermobonded at seam 20 to the material making up half of the thumb portion 12. As illustrated in FIGS. 1 and 3, the thumb portion 12 extends across the hand portion 24 of the glove so that the glove conforms to the shape of the hand allowing thumb rotational movement, thus providing greater comfort than gloves in which the thumb and fingers lie in the same plane such as when a single peripheral seam is used to form the thumb and finger portions. Preferably, the thumb portion 12 is folded against the hand portion and extends at an angle of about 45° from the longitudinal axis of the glove.

Figure 4:
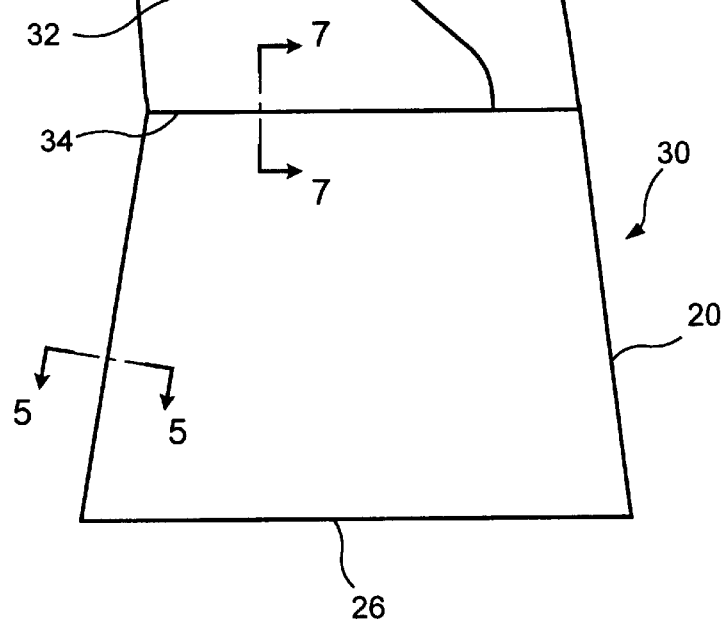
FIG. 4 is a plan view of a type B glove of the present invention.

FIG. 4 illustrates a type B glove 30 of the present invention, this embodiment having a palm 32 defined by two thermobonded palm seams 34, 36 that extend across the hand portion 24 transverse to the longitudinal axis of the glove. The first transverse seam 34 extends between the peripheral seam 20 and is located near the base of the palm 32. The second transverse seam 36 extends between the peripheral seam 20 and is located near the base of the fingers 22 of the glove. Like the type A glove shown in FIG. 1, the type B glove includes a thumb portion 12, a hand portion 24, four fingers 22 and an open wrist 26 portion. The two transverse seams 34, 36 are preferably lap seams (see FIG. 7) that join the palm portion 34 to the rest of the glove. The thumb curvilinear seam 14 extends to the first transverse seam 34 and includes a relatively short linear seam 38 that extends from the thumb curvilinear seam 14 to the second transverse seam 36 near the fingers 22. The type B glove conserves the amount of thermoplastic material needed to manufacture the gloves and may also be used to thermobond different types of plastic materials in the hand and thumb portions relative to the rest of the glove (e.g., to form a reinforced palm and thumb).

Figure 6:
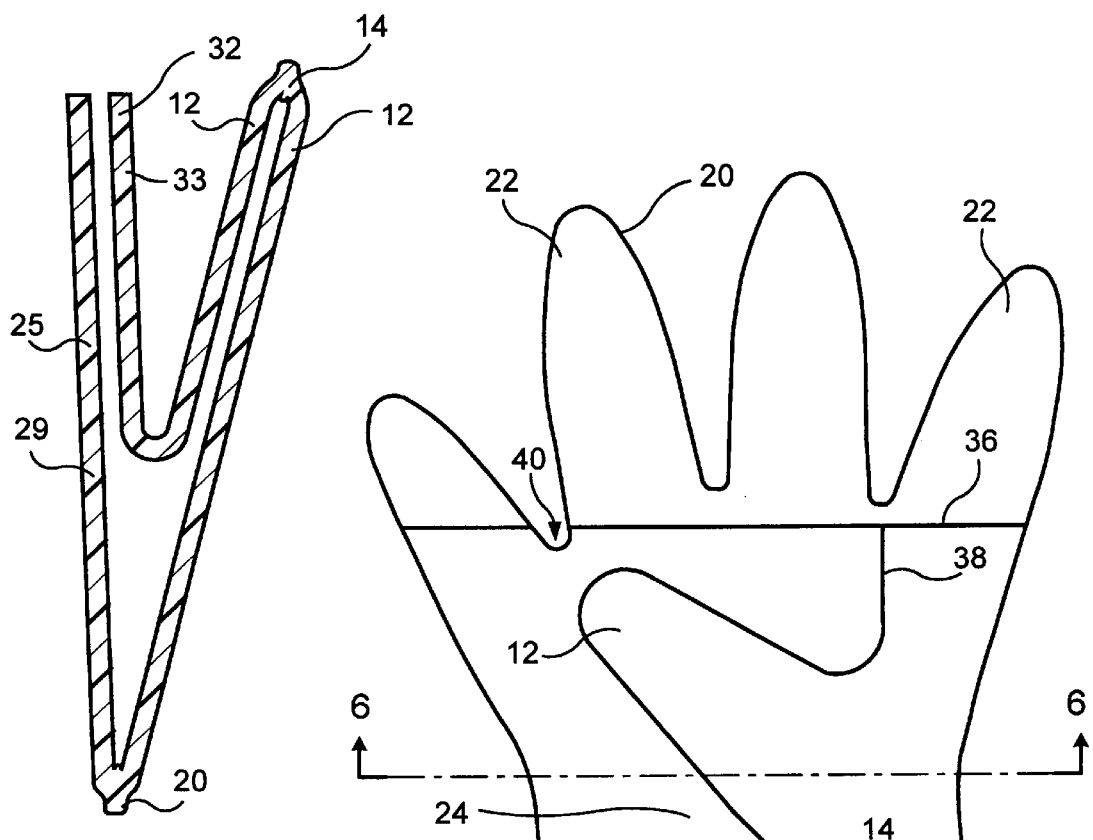
FIG. 6 is a truncated cross section view taken along the line 6—6 of FIG. 4.
Figure 5:
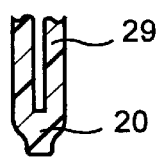
FIG. 5 is a truncated cross section view taken along the line 5—5 of FIG. 4.

FIGS. 5 and 6 show the cross sections of the glove at the peripheral seam (FIG. 5) and across the palm and thumb regions (FIG. 6). As shown in FIG. 6, the material 33 making up the palm 32 and thumb portion 12 is thermobonded at a seam 14 to form the thumb which is thermobonded at seam 20 to join it to the material 29 making up the back portion 25 of the glove. Although FIG. 6 shows the palm 32 to be a single layer of material, laminated multiple layers of plastic material may be used to form a reinforced and/or insulated palm 32. Alternatively, a different thermoplastic material that has additional strength and/or insulating properties relative to the material making up the other portions of the glove may be used to form the thumb and palm.

Figure 7:
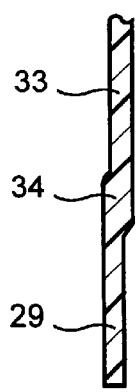
FIG. 7 is a truncated cross section view taken along the line 7—7 of FIG. 4.

As shown in FIG. 7, a lap thermobonded seam 34 seals the material 33 of the palm 32 to the remaining hand portion of the glove. Similar thermobonding (not shown) is used to seal the other transverse seam 36. As described above, the transverse seams 34, 36 are produced by crosslinking or fusing materials 29, 33 with minimal stretching or compression of the materials, thereby preventing weakening of the seams 34, 36 relative to the unbonded sheet materials.

The longitudinal thermobonded seams 16, 18, 38 of the two embodiments of the gloves 10, 30 minimize stress points and seam splitting such as occurs when seams are formed at an angle relative to the longitudinal axis of the glove. The transverse seams 34, 36 of the type B glove (FIG. 4) are also positioned in areas of relatively little mechanical stress when the gloves are in use. That is, the first transverse seam 34 is located at the base of the palm near the wearer's wrist which is generally a nonstress area, and the second transverse seam 36 is located in a nonstress area near the base of the fingers 22. The diverging fingers 22 have an elliptical crotch 40 between them which further eliminates stress during glove use by providing material at the base of the fingers of the gloves to allow freer movement of the fingers of the user's hand during use. For both embodiments of the glove, because stress at seams joining the thumb portion to the rest of the glove is minimized, a user may wear gloves that are generally sized to fit the wearer's hand rather than having to use oversized gloves to provide excess material to prevent seam stress. Moreover, because the gloves do not have to be oversized to be comfortably worn, glove slippage is minimized with less excess material at the palm region to interfere with dexterity. The offset of the palm relative to the cuff further prevents glove slippage. Entrance of the thumb of the user's hand into the thumb portion of the glove is from the side, along the longitudinal axis. That is, the internal opening to the thumb portion of the glove is located substantially along the longitudinal axis of the glove. This arrangement locks the user's thumb into place when the glove is put on and prevents glove slippage.

In addition to the structural features of the gloves that provide for better fit on the user's hands, the gloves may include means for adjusting the finger and/or thumb lengths and means for adjusting the girth of the glove at the wrist. Means for adjusting the finger and/or thumb lengths are preferably a means for holding any excess length at the fingertip and/or thumb tip on the back side of the glove. For example, the excess length may be bent over to the back of the glove finger so that the glove finger snugly fits the user's finger and then the excess material can be held in place with an adhesive, such as an adhesive tab attached to the fingertip and/or thumb tip. Preferably, an adhesive is applied to the backside of the glove fingertips and thumb tip and the adhesive is covered by a protective peel strip when the adhesive is not required or used. When needed, the glove tip is shortened by bending the fingertip to the backside of the finger portion, the protective peel strip is peeled off and the fingertip is attached to the backside of the finger portion by pressing the exposed adhesive portion to the backside of the finger portion. It will be understood that the same process and means for securing the excess length material may be used to adjust the glove's thumb length relative to the user's thumb. Similarly, the girth of the glove at the wrist may be adjusted by means of an adjustment band or strap that attaches to the backside of the glove near the wrist to gather and hold any excess material. For example, a strap of material may be attached to the glove at either of the side seams with an end of the strap located near the wrist portion of the glove and a similar adhesive portion of the strap provided at the other end of the strap or along substantially the length of the strap, with a protective peel strip positioned adjacent to the adhesive when the strap is not in use. After the glove is placed on the user's hand, the girth of the wrist may be adjusted by removing the protective peel strip, pulling the strap to extend over the wrist portion on the backside of the glove to tighten the wrist portion over the user's hand and gather excess material to the backside of the glove, and attaching the adhesive portion of the strap to the backside of the glove. When adhered to the backside of the glove, the adhesive strap holds any excess material along the backside, preventing excess material from interfering with the user's dexterity at the palm, thumb and finger portions of the glove. Moreover, when adhered to the backside of the glove, the adhesive strap holds the glove more securely to the user's hand to prevent slippage during use.

Manufacturing Processes for Type A and Type B Gloves

Both type A and type B gloves 10, 30 are manufactured in a multistep process in which two or more sheets of thermoplastic material 29 are passed along a process line to form gloves by sealing appropriate portions of the material together to form a thumb portion 12 which is joined to hand 24 and finger 22 portions. The individual steps of the process occur at discrete stations along the process line, which may include either of two different methods of producing the thumb portion. One method of producing a thumb portion 12 is referred to as the loop method and the other method is referred to as the non-loop method; both are described in detail below but are summarized here to provide information for understanding the process line in general. In the loop method, a flat sheet of plastic material is pulled out of the plane of the process line to form a loop of material which is substantially 90° to the plane of the process line when it is thermobonded to form the curvilinear thumb portion with its adjacent linear seams. The thumb portion is then returned to the plane of the process line for attachment to the hand portion and completion of the process. In the non-loop method, the thumb portion is thermobonded from two layers of plastic material positioned in die means located in a plane parallel to the plane of the process line. The thumb portion is then attached by another thermobonded line to the plastic material in the process line and the two sheets are thus drawn along the process line to continue glove production.

Referring to FIGS. 8A and 8B, one process line 42 that progresses from left to right is diagrammatically shown for making type A gloves 10. FIG. 8A shows the process line from above, whereas FIG. 8B shows a side view of the process line. At the first station 44 of the process line, an upper sheet of thermoplastic material 46 and a lower sheet of thermoplastic material 48 are dispensed such that the two sheets 46, 48 proceed along the plane of the process line in an adjacent facing relation. At the second station 50 along the process line 42, where a die assembly 51 is located, the lower sheet 48 is pulled or pushed out of the plane of the process line to form a loop 52 of material that is substantially perpendicular to the plane of the process line. The loop 52 is positioned between a first plate 54 and a second plate 56 of a die assembly 51 for thermobonding the thumb portion seam. The adjacent layers of plastic material that make up the loop 52 are thermobonded substantially between the two free edges 53, 55 of the lower plastic material 48 to form a linear seam 18 that begins at one edge 53, extends into the curvilinear seam 14 of the thumb portion 12 and extends further into a linear seam 58 that extends to the other edge 55. When thermobonding is completed, the sealed loop 59 of material is released from between the die plates 54, 56 and progresses along the process line 42 to the third station 60. Scrap material (not shown) from the lower sheet 48 that remains after the thumb portion 12 is formed is preferably removed as the sealed loop 59 progresses to the next station 60 but may be retained with the sealed loop 59 and removed further along the process line 42. At the third station 60, the peripheral seam 20 forms the fingers 22 and hand portion 24 of the glove. The peripheral seam 20 joins the upper sheet 46 to the lower sheet 48 that contains the thumb portion 12 such that the first linear seam 16 from the thumb intersects the peripheral seam 20 at the base of the forefinger. The peripheral seam preferably seals the thermoplastic sheets substantially around the entire glove leaving the wrist portion 26 open. The completed glove is releasably connected to the scrap material surrounding it such that the seal between the seam and the scrap material can be easily torn to remove the glove. The glove with its adjacent scrap material is moved along the process line to the fourth station 62 where the completed glove (no longer shown) is removed from the scrap material 61 which proceeds along the process line to the scrap removal station 64. Because the completed glove is formed with its longitudinal axis essentially perpendicular to the axis of the process line with the open wrist 26 formed by the adjacent and thermobonded sheets of plastic material 46,48, the completed glove can be removed without any additional cutting steps to form the wrist opening. Between stations 62 and 64, a pair of positioning elements 66, 68 retain the scrap material in the plane of the process line to maintain alignment of the sheets of thermoplastic material 46, 48 along the process line. One positioning element 66 is located proximate to the upper sheet 46 and the other positioning element 68 are located proximate to the lower sheet 48 such that the upper and lower sheets 46, 48 are positioned adjacent each other between the positioning elements 66, 68. The positioning elements 66, 68 may be automated rollers that, in addition to positioning the sheets of thermoplastic material along the process line, move the material so that it proceeds along the process line without bulging or crimping.

Figure 9A:
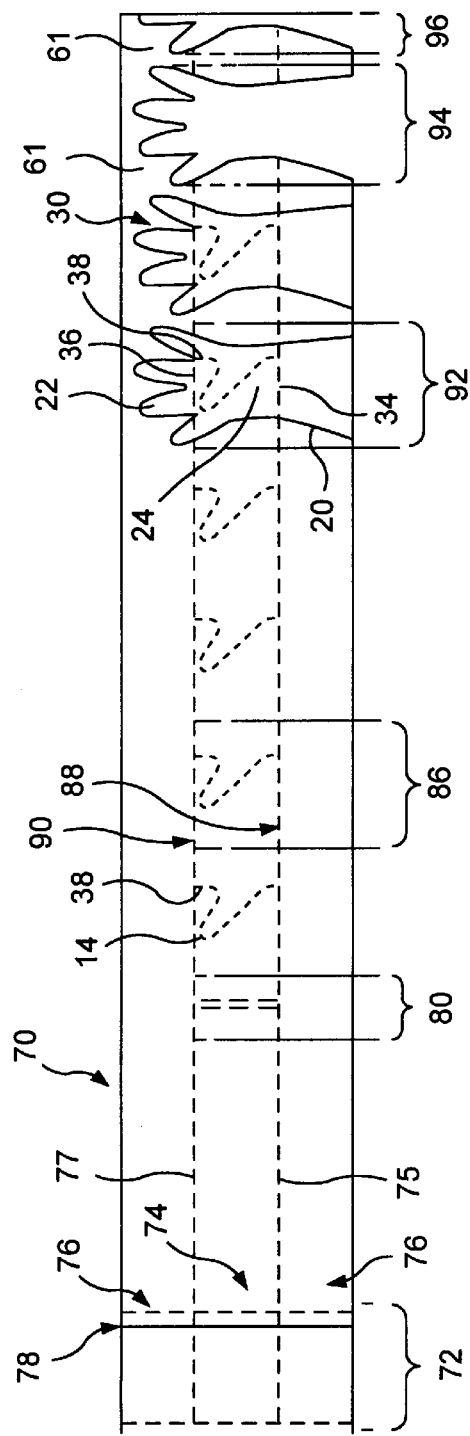
FIG. 9A is a plan view diagrammatically showing a process line for making type B gloves.
Figure 9B:
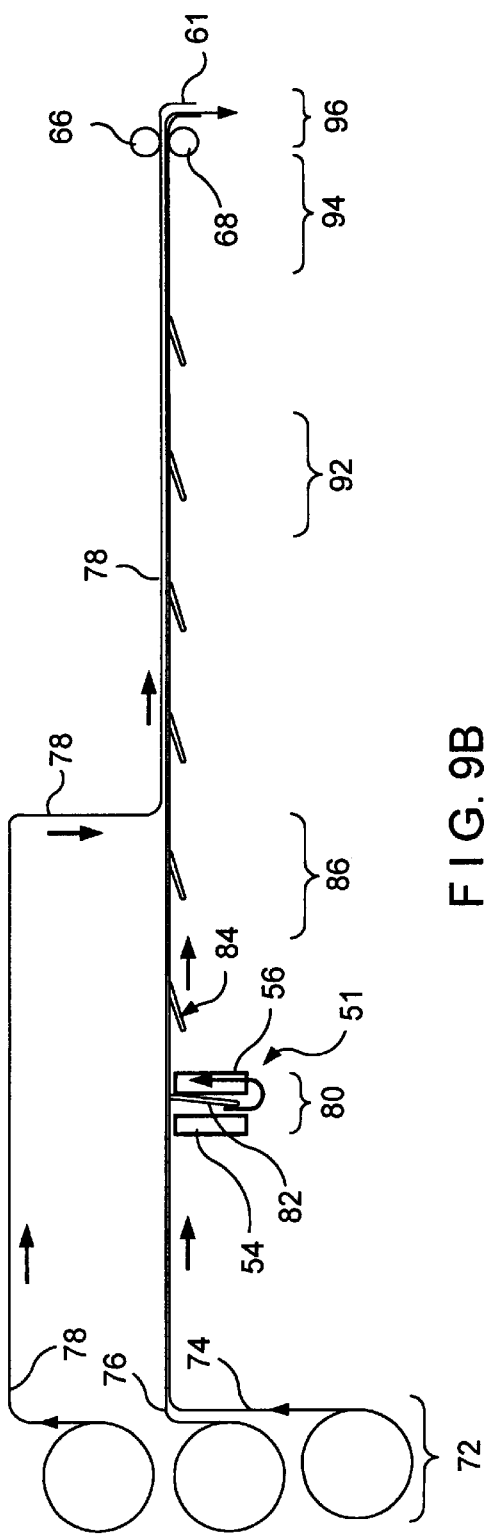
FIG. 9B is a side view of the process line of FIG. 9A.

A similar process line 70 for the production of type B gloves 30 is diagrammatically shown in FIGS. 9A and 9B. In contrast to the process line shown in FIGS. 8A and 8B, the process line of FIGS. 9A and 9B has three sources of thermoplastic material 74, 76, 78. The upper sheet 78 of material ultimately makes up the back of the hand of the glove. A centrally located lower sheet 74 ultimately makes up the thumb and palm portions of the glove, and is joined to two peripheral lower sheets 76 that ultimately form the fingers and wrist portion on the palm side of the glove. As shown in FIG. 9A, one peripheral lower sheet 76 is located adjacent to each of the two edges 75, 77 of the centrally located lower sheet 74.

The type B glove design is generally used where the cost of the material for the thumb and palm portion of the glove is prohibitive to be used in the entire glove. The lower sheet 74 used to form the thumb and palm portions of the type B glove has a narrower width than the sheet used to form the thumb and palm portions of the type A glove, thus conserving material. This design also allows one to use different thermoplastic materials in the thumb and palm compared to that of the fingers, wrist and back of the hand portions. For example, a laminated plastic may be used to form the thumb and palm portions to achieve different strength or insulating characteristics in those parts of the glove.

At the first station 72 of the process line, the thermoplastic materials are dispensed from rolls of material. The central lower sheet 74 and peripheral lower sheets 76 are aligned in the plane of the process line with one peripheral lower sheet 76 adjacent to the edges 75, 77 of the central lower sheet 74. The upper sheet 78 may be aligned parallel to the process line but in another plane, as shown in FIG. 9B, or may be aligned in the plane of the process line in an adjacent facing relation with the central lower sheet 74 and peripheral lower sheets 76. As shown in FIG. 9B, the central lower sheet 74 and the peripheral lower sheets 76 proceed along the plane of the process line to the second station 80 where the central lower sheet 74 is pulled or pushed out of the plane of the process line to form a loop 82 of material that is substantially perpendicular to the plane of the process line. At the second station 80, this loop 82 of thermoplastic material is positioned between a first plate 54 and a second plate 56 of a die assembly 51 for thermobonding the seam that defines the thumb portion 12 of the glove. The adjacent layers of the central lower sheet 74 material that make up the loop 82 are thermobonded between the two free edges 75, 77 of the material. That is, a linear seam 38 begins at one edge 77, extends into the curvilinear seam 14 of the thumb portion 12 and extends to the other edge 75 of the lower material 74. When thermobonding is completed, the sealed loop 84 of material is released from between the die plates 54, 56 and is drawn back into the plane of the process line 70 where it and the peripheral lower sheets 76 progress to the third station 86. Scrap material (not shown) from the central lower sheet 74 that remains after the thumb portion 12 is formed is preferably removed as the sealed loop 84 progresses to the third station 86 but may be retained along the process line and removed later. Linear seams 88, 90 parallel to the axis of the process line are formed at the third station 86, thereby sealing the edges 75, 77 of the central lower sheet 74 to the peripheral lower sheets 76 to form a single lower sheet. After the linear seams 88, 90 are formed, this single lower sheet and the upper thermoplastic sheet 78 are brought into an adjacent facing relation as they proceed along the process line to the fourth station 92 where the peripheral seam 20 forming the hand portion 24 and fingers 22 is thermobonded. The peripheral seam 20 joins the upper sheet 78 to the now bonded peripheral lower sheets 76 and the central lower sheet 74, containing the thumb and palm portions. Once the peripheral seam 20 is formed, the linear seams 88, 90 become the first and second transverse seams 34, 36 within the formed glove 30. The peripheral seam preferably forms a tearable seal between the completed glove and the surrounding scrap material such that the seal can be easily torn to remove the glove. The glove 30 with its surrounding scrap material 61 continues along the process line to the fifth station 94 where the completed glove (no longer shown) is removed from the process line, leaving the scrap material 61 which proceeds to the sixth station 96 where the scrap material is removed. Like the type A glove, the completed type B glove has an open wrist 26 formed by the adjacent sheets of plastic material joined at the peripheral seam 20, thus eliminating the need to cut the wrist 26 of the completed glove to release it from the scrap material. Between stations 94 and 96, a pair of positioning elements 66, 68 retain the scrap material 61 in the plane of the process line to maintain alignment of the following portions of the sheets of thermoplastic material 76, 78 along the process line. One positioning element 66 is located proximate to the upper sheet 78 and the other positioning element 68 are located proximate to the lower sheets 74, 76 such that the scrap material 61 is positioned between the positioning elements 66, 68. The positioning elements 66, 68 may be automated rollers that move the scrap material 61 along the process line without bulging or crimping to move the following portions of the sheets of material along the process line in correct alignment.

Figure 10:
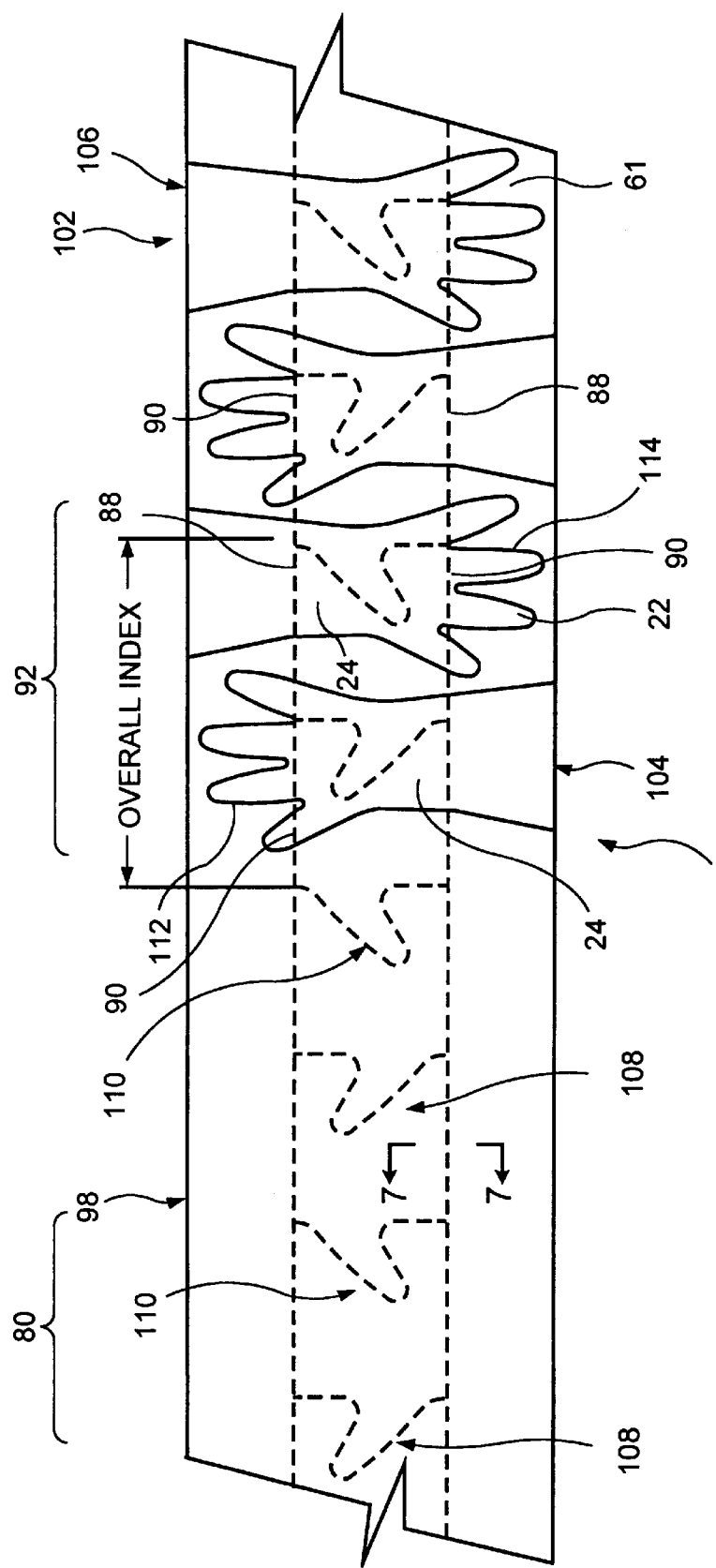
FIG. 10 is a plan view diagrammatically showing a process line for making both right-handed and left-handed type B gloves in a single process line.

FIG. 10 illustrates an alternative process line 98 for manufacturing type B gloves. Progressing from left to right, right-handed gloves 100 and left-handed gloves 102 are produced along the same process line with the wrist portion 104 of the right-handed gloves and the wrist portions 106 of the left-handed gloves located at opposite edges of the sheets of thermoplastic material used for manufacturing. By alternating the left-handed and right-handed gloves 100, 102 in opposing positions along the thermoplastic material, the material is efficiently used, generating less scrap material 61. For example, for extra large size gloves, the index between a thumb of a right-handed glove and the thumb of the adjacent left-handed glove can be about 8 in (20.32 cm), whereas when a series of same-handed extra large gloves (e.g., all right-handed) are produced, the index between the thumb of one glove and the thumb of the next adjacent glove is about 9.5 in (24.13 cm).

The process line illustrated in FIG. 10 uses the same procedures as described above for FIGS. 9A and 9B, but includes two thumb-forming die assemblies (not shown) at the second station 80 and two peripheral seam forming die assemblies (not shown) at the fourth station 92. That is, at the second station, one die assembly forms the right-handed thumb portion 108 and a second assembly forms the left-handed thumb portion 110. Similarly, at the fourth station, one die assembly forms the right-handed peripheral seam 112 and a second die assembly forms the left-handed peripheral seam 114, thus forming the finger portions 22 and hand portions 24 of the two types of gloves. The die means for forming the thumb portions and peripheral seams are coordinated such that the right-handed thumb portion is joined to right-handed finger and hand portions and left-handed thumb, finger and hand portions are similarly joined.

The two die assemblies used at the second and fourth stations in the process line 98 can either be located side-by-side or can be alternately and sequentially brought into the station. For example, the second section can include the two die assemblies located side-by-side, each with its own loop forming mechanism, so that the right-handed and left-handed thumb portions can be formed in the appropriate die plates. The right-handed and left-handed thumb portions can be formed simultaneously or sequentially. In another embodiment, the right-handed die assembly and then the left-handed die assembly may be alternately and sequentially brought into the second station such that a single loop forming mechanism can be used for both die assemblies. For example, the right-handed die assembly may be brought into the second station, a right-handed thumb portion formed, and then as the right-handed thumb portion progresses along the process line, the right-handed die assembly is moved out of the second station while the left-handed die assembly is brought into the second station to form the left-handed thumb portion at the next loop formed along the process line. Similarly, the two die assemblies used to form the right-handed and left-handed peripheral seams may be positioned side-by-side in the fourth station or may be alternately and sequentially brought into the fourth station (as described in detail below) to thermobond a right-handed peripheral seam with a right-handed thumb portion and a left-handed peripheral seam with a left-handed thumb portion.

In the process line as illustrated in FIG. 10, the third station 86 for thermobonding the transverse seams 88, 90 can use die plates common to both the right-handed and left-handed gloves. The same die assembly is used to form both transverse seams for both left-handed and right-handed gloves, with the transverse seams substantially parallel to each other and parallel to the axis of the process line. That is, the die plate that forms the lower transverse seam 88 on a right-handed glove 100 will be the same die plate that forms the upper transverse seam 90 on the left-handed glove 102. Similarly, the die plate that form the upper transverse seam 90 on a right-handed glove 100 will be the same die plate that forms the lower transverse seam 90 on the left-handed glove 102. All of the other steps used in forming type B gloves are substantially as described above for FIGS. 9A and 9B.

It will be understood that the process line for manufacturing type A gloves, as diagrammed in FIGS. 8A and 8B, can be similarly modified so that right-handed and left-handed gloves of type A can be produced on a single process line. That is, the process line can include two die assemblies for thermobonding right-handed and left-handed thumb portions and two die assemblies for forming right-handed and left-handed peripheral seams, coordinated such that the appropriate thumb portion is joined to the appropriate finger and hand portion. For the process used to form type A gloves, the thumb portions are formed at the second station and the peripheral seams are formed at the third station as described above for FIGS. 8A and 8B. As described above for dies that form the left-handed and right-handed peripheral seams, the die assemblies may be located in a side-by-side orientation or, alternatively, can shuttle in a fingertip-to-fingertip direction as described in more detail below.

Glove Manufacturing Apparatus

Figure 11:
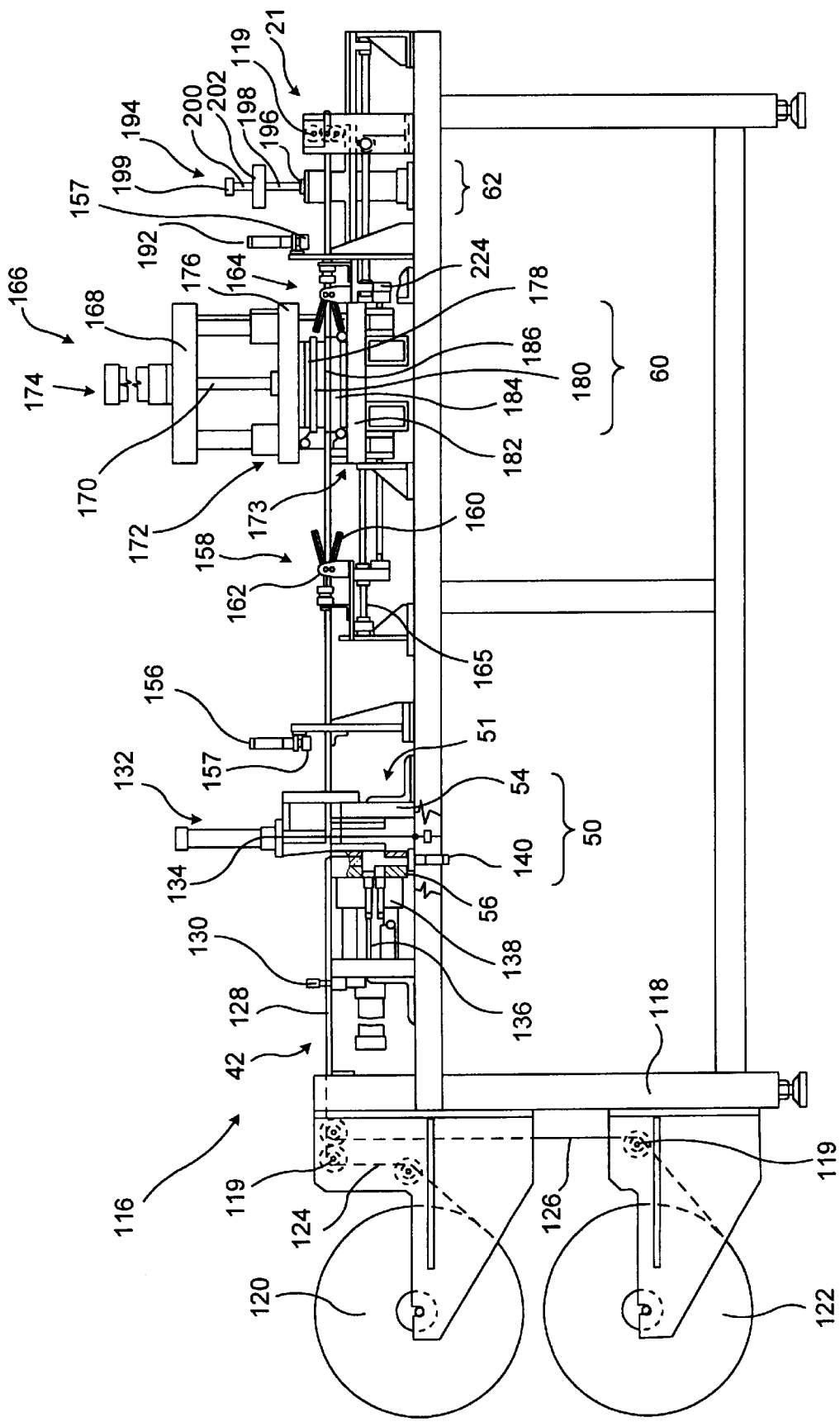
FIG. 11 is a side view of the glove manufacturing apparatus for making type A gloves.
Figure 12:
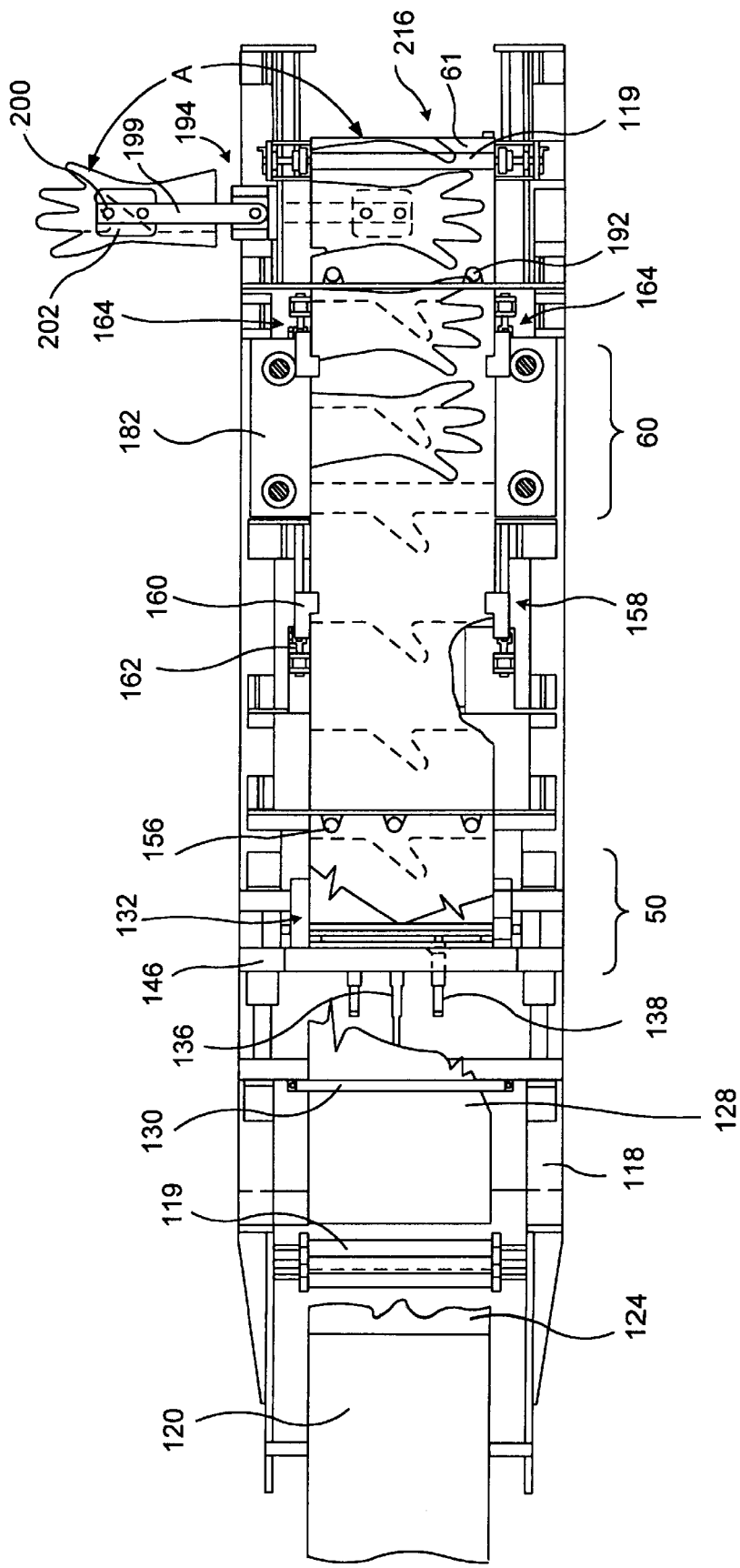
FIG. 12 is a top view of the glove manufacturing apparatus of FIG. 11.

Referring to FIGS. 11 and 12, a glove manufacturing apparatus 116 for making type A gloves using the loop method is shown in side view and from above, respectively. The device includes a frame 118 which holds two rolls of thermoplastic material 120, 122. The upper roll 120 dispenses the upper sheet 124 while the lower roll 122 dispenses the lower sheet 126 to the process line. The payout of the adjacent facing sheets 124, 126 from the pair of rolls 120, 122 is controlled by a power self-centering, braking and power feed unit to prevent overrun of the dispensed sheets and maintain orientation of the individual adjacent sheets with respect to each other and the process line. The sheets 124, 126 are aligned in an adjacent facing relation by having each sheet advance across a pair of ball bearing guide rollers 119 such that each sheet goes under the first guide roller and over the second guide roller. The sheets 124, 126 proceed along the process line to the material support platform 128 where a pressure clamp bar 130 attached to the rear stationary press plate of station 50 holds the sheets in facing adjacent relation while allowing the sheets to proceed under the pressure clamp bar 130, thus facilitating proper alignment of the sheets along the process line 42 during initial loading of the material.

At the second station 50, the upper and lower sheets 124, 126 are separated from each other by a loop forming means 132 that pulls or pushes the lower sheet 126 down to form a loop of material located between the two plates 54, 56 of a die assembly 51 that forms the thumb seam (i.e., the curvilinear and connected linear seams). The loop forming means 132 may be, for example, at least one power cylinder 134 activated by any of a variety of well known mechanical means (e.g., pneumatic or hydraulic) and attached to a rod 135 that pushes the lower sheet 126 down to form the material loop (described in further detail below at FIG. 17). The loop forming means 132 may be located between the upper sheet 124 and the lower sheet 126 of material at all times along the process line or may be inserted between the sheets at the second station 50. Alternative loop forming means, such as, for example, a vacuum suction device (not shown) located under the lower sheet 126 at the second station 50 along the process line 42 may be used to pull the lower sheet down to form a material loop.

FIGS. 13A and 13B illustrate the thumb seam forming die assembly 51 with a scrap removal system of the second station 50 in greater detail. The thumb seam is formed by a pair of plates, a heat element bearing die plate 54 and a pressure plate 56. The heat element bearing die plate 54 comprises a die plate 142 with a heat element (not shown) for thermobonding the thumb seam, an insulated backing plate 144 and a press plate 146. The surface 143 of the die plate 142 is treated and coated to form a non-smooth electrical insulation. For example, the surface 143 may be made of aluminum that is shot peen to eliminate a smooth surface, sharp hills and/or valleys and also hard anodized using well known methods, thus reducing adhesion of the thermoplastic material to the plate surface during thermobonding and providing electrical insulation. The insulated backing plate 144 separates the die plate 142 and the press plate 146, thus preventing the press plate from acting as a heat sink during operation of the die assembly. The second plate 56 of the die assembly 51 comprises a pressure plate 148 made of a resilient material, a support plate 150, and a press plate 152. The support plate 150 is located between the pressure plate 148 and the press plate 152. The support plate 150 may be made of insulating material. The two press plates 146, 152 may both move to bring the two plates together to form the thumb seam or one press plate may move while the other remains stationary; movement of the press plates can be actuated by any of a variety of well known mechanical means such as by a power actuated cylinder 136 connected to one of the plates, such as the press plate. Either or both of the plates 54, 56 may include apertures for providing vacuum between the plates to hold the loop of thermoplastic material in place before and/or during thermobonding. For example, vacuum may hold the loop within the die means while the horizontal cylindrical rod 135 used to form the loop is withdrawn. A pressure plunger 138 is also provided that extends through one of the pressure assembly plates and contacts the other plate, thereby holding the loop of thermoplastic material therebetween before, during and after thermobonding.

As shown in FIG. 13A, the die assembly 51 for forming the thumb seam includes the pressure plunger 138 in its non-extended position which leaves space between the two die elements 54, 56 for formation of the loop of material. As shown in FIG. 13B, the pressure plunger 138 of the die assembly 51, in the extended position has one end 154 that forms a contact between the two die elements 54, 56 and holds the loop of material (not shown) therebetween After thermobonding of the thumb seam has been completed, the contact end 154 of the pressure plunger 138 holds the scrap material outside of the thumb portion. The pressure plunger holds the scrap material (not shown) between the two plates while the thumb portion is withdrawn as the material proceeds along the process line, with this pulling pressure severing the thumb portion from the scrap material. For scrap removal, the pressure plunger 138 can move downward while applying pressure to the material against the die plate 142 (as shown in FIG. 13B) to pull the scrap material away from the heat element of the die assembly 51 and allowing it to drop free when the plunger 138 is released (as shown in FIG. 13A). Additionally, forced air exiting the plate can be used to blow the scrap material free.

The pressure plunger 138 can be combined with a pull down cylinder 140 for scrap removal. The pull down cylinder 140 is located within the pressure plate assembly 56 where is can be in a non-extended position as shown in FIG. 13A or extended as shown in FIG. 13B. In the extended position, the pull down cylinder 140 creates friction that is translated to the contact end 154 of the pressure plunger 138 or to the surface 143 of the die plate 142 to hold the scrap material within the space between the two plates 54, 56 while the formed thumb portion is withdrawn. When the pressure plunger 138 and the pull down cylinder 140 are returned to their non-extended positions, the scrap material is no longer held against the plate 54 and the vacuum is released and/or air flow is reversed so that the scrap material is released and allowed to fall by gravity from the space between the two plates 54, 56.

When the heat element-bearing die plate 142 and the resilient pressure plate 148 are moved together for thermobonding of the material located therebetween, the configuration of the heat element and the surface provides sufficient relief to reduce adhesion of the thermoplastic material to the surface 143 of the die plate, thereby reducing stretching of the material when it is advanced out of the second station 50 and reducing stress on translator elements used to advance the material along the process line. This aspect of the invention is described in greater detail below.

Again referring to FIGS. 11 and 12, the thumb portion formed in the lower material 126 is drawn out of the second station 50 and the upper sheet of material 124 and thumb portion formed in the lower sheet 126 proceed along the process line 42. A pressure clamp 156 located along the process line beyond the second station 50 holds the upper and lower sheets in correct alignment when they are not moving. (A similar pressure clamp 192, serving the same function, is located before the glove removal station 194.) The aligned upper and lower sheets are advanced along the process line by means of translator elements 158, 164 which are preferably clamp-type elements comprising two opposing flat surfaces 160 that can be opened, as shown in FIG. 11, and closed about a hinge 162 by any well known means (e.g., a pneumatic or hydraulic cylinder). When closed, the translator elements 158, 164 clamp both the upper and lower sheets 124, 126 of thermoplastic material between the flat surfaces 160 of elements. The translator elements 158, 164 containing the material is then mechanically translated from a first position to a second position along the process line to move the two sheets in facing alignment along the process line. The translator elements 158, 164 are mounted on carriage 224 which are mounted on rods 165 to control the distance and timing of translation of the elements during operation using any of a variety of well known means electrical and/or mechanical means.

The pressure clamps 156, 192 and the translator elements 158, 164 work in a coordinated manner to assure proper alignment of the materials as they proceed along the process line. That is, when the material is not moving, the pressure clamps 156, 192 extend to contact the material and hold it to the material support platform 128 while the translator elements 158, 164, in the open configuration moves to a first position nearer the rolls 120, 122 of material. When the translator elements 158, 164 are in the first position, they close holding the sheets of material between the flat surfaces 160 of the elements and then the pressure clamps 156, 192 retract to release the material for movement along the process line. The translator elements 158, 164 then move to a second position further from the rolls 120, 122 to position the materials at the next station along the process line. When the material is properly positioned (i.e., at the next station), the pressure clamps 156, 192 again extend to hold the material in place on the material support platform while the translator elements open to release the material and return to the first position for the next round of movement of material along the process line. At all times, the sheets of material are maintained in proper orientation either by the pressure of the extended pressure clamps 156, 192 holding the sheets on the material support platform 128 or by the closed translator elements 158, 164 holding the sheets between the opposing faces of the elements. During translation, the closed translator elements 158, 164 slightly lift the sheets of material from the material support platform to reduce dragging which may stretch the thermoplastic material. To hold the thermoplastic material securely, the pressure clamps 156, 192 may have a disk or rectangular shaped pad 157 of resilient material where the clamps contact the thermoplastic material.

Using the pressure clamps 156, 192 and translator elements 158, 164 as described above, the sheets are brought into the third station 60 for sealing the peripheral seam to form the fingers and hand portion of the glove and joining the thumb portion to the rest of the glove. The third station 60 comprises a peripheral seam forming means 166 that includes a frame 168 and a power actuated cylinder rod 170 extending therethrough and connected to the upper member 172 and a stationary lower member 173, as shown in FIG. 11. The power actuated cylinder rod 170 is further connected to a cylinder actuating means 174 which can be any of a variety of known mechanical devices. The upper member 172 comprises an upper press plate 176 connected to an upper support plate 178 connected to the resilient pressure plate 180. The lower member 173 comprises a lower press plate 182 connected to a support plate 184 connected to a peripheral seam die plate 186 bearing the thermobonding element. In FIG. 12, the top section of the cylinder actuating means 174 has been removed to show the lower press plate 168 at the third station 60. As with the thumb-forming die assembly described above, the support plates 178, 184 may be made of insulating materials. The lower member 173 may be stationary or may also move to contact the upper member 172 using a power actuated mechanism. Moreover, the lower member may be the pressure plate assembly coupled with an upper member that is the thermobonding die plate assembly.

Shuttle Die Assembly

Figure 28:
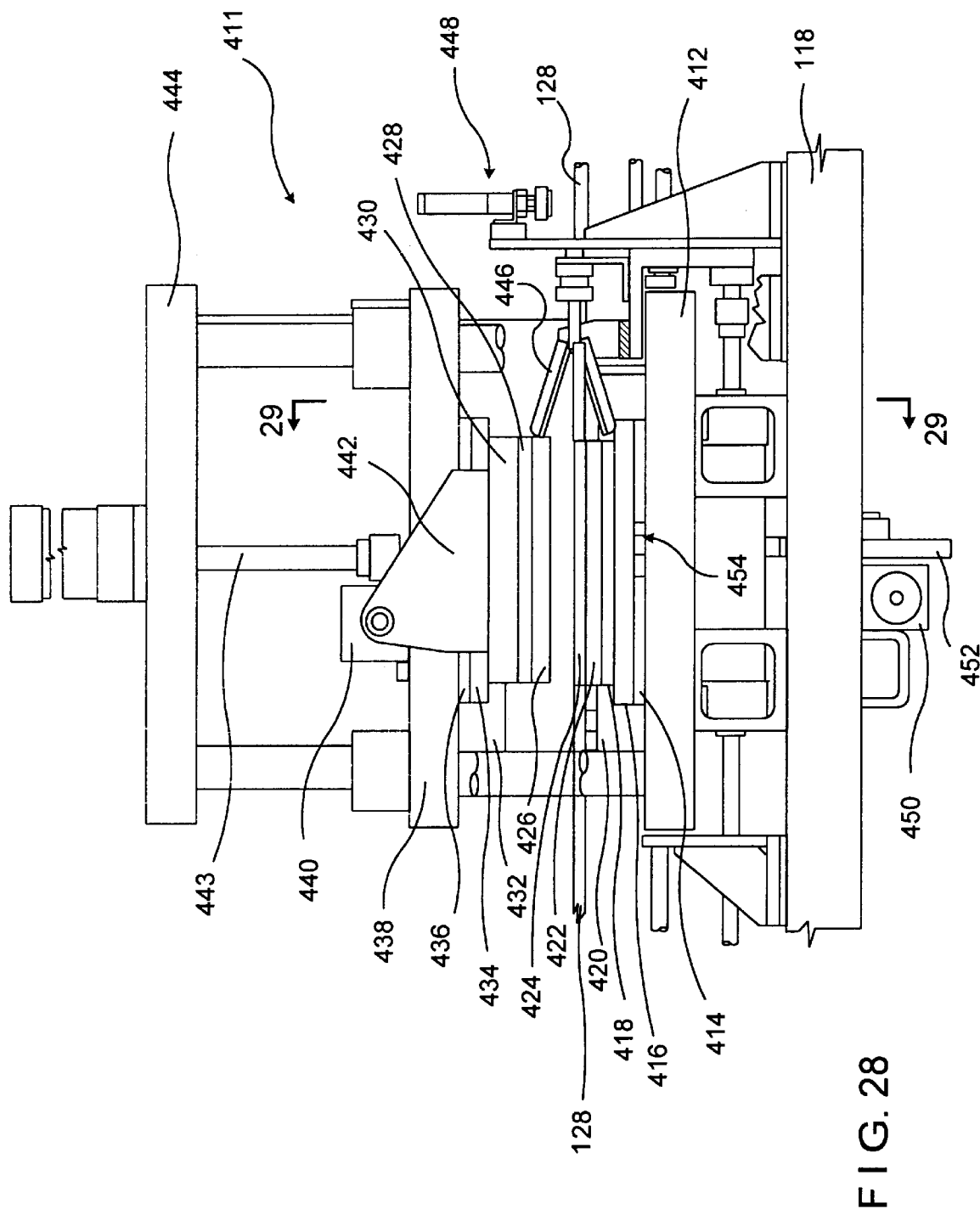
FIG. 28 is a side view of the shuttle assembly for forming peripheral glove seams for both right-handed and left-handed gloves in the same process line.
Figure 29:
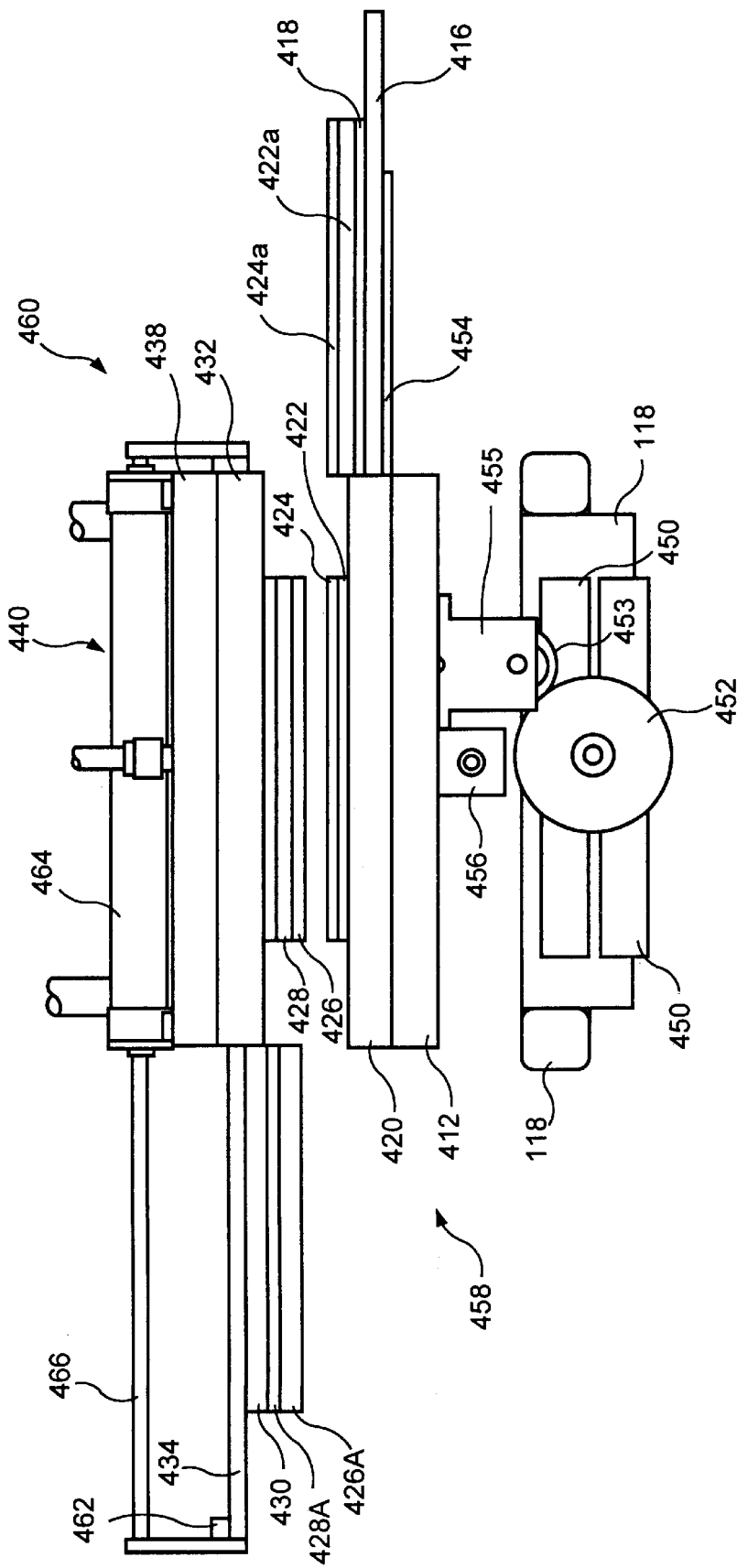
FIG. 29 is a cross section view of a portion of the shuttle assembly of FIG. 28 taken along the line 29—29.

A preferred embodiment is a shuttle assembly 411 for forming the peripheral seams of gloves is shown in FIGS. 28 and 29. FIG. 28 shows a side view of the shuttle assembly 411 for forming the peripheral seams of both right-handed and left-handed gloves. FIG. 29 shows a detail of the shuttle assembly taken along the line 29—29 of FIG. 28.

Referring to FIG. 28, the shuttle assembly 411 is attached to the main frame 118 which supports a lower stationary platen 412 which supports a movable lower portion of the assembly that includes a wear plate 414, connected to a lower slide plate 416, which is connected to a spacer 418, which is connected to a support plate 422 that supports a connected pressure plate 424. All of the movable components of the lower portion of the shuttle assembly are connected to a lower slide gib 420 for moving the movable lower portion. All of these components are located under the material support platform 128 which supports the glove material as it progresses along the production line. Above the support platform 128 is located an upper movable portion of the shuttle assembly 411 which includes a die plate 426 connected to a heat insulator plate 428 which is connected to an upper spacer 430 which connects to an upper slide plate 434 and a upper wear plate 436. The upper spacer 430, upper slide plate 434 and upper wear plate 436 are all connected to the upper slide gib 432 for shuttling the upper movable portion. Located above the upper wear plate 436 is an upper movable platen 438 which supports a slide actuator 440 (e.g., an air cylinder mechanism) which is linked to the upper spacer 430, upper slide plate 434 and a upper wear plate 436 by a connecting means 442 for shuttling the movable upper die assembly. The upper movable platen 438 is attached via connecting rod 443 to the upper stationary platen 444.

For shuttling the lower movable portion of the shuttle assembly 411, a double rack rotary actuator 450 is connected to a lower slide gear 452 which translates movement to a rack 454 attached the lower slide plate 416.

Figure 23:
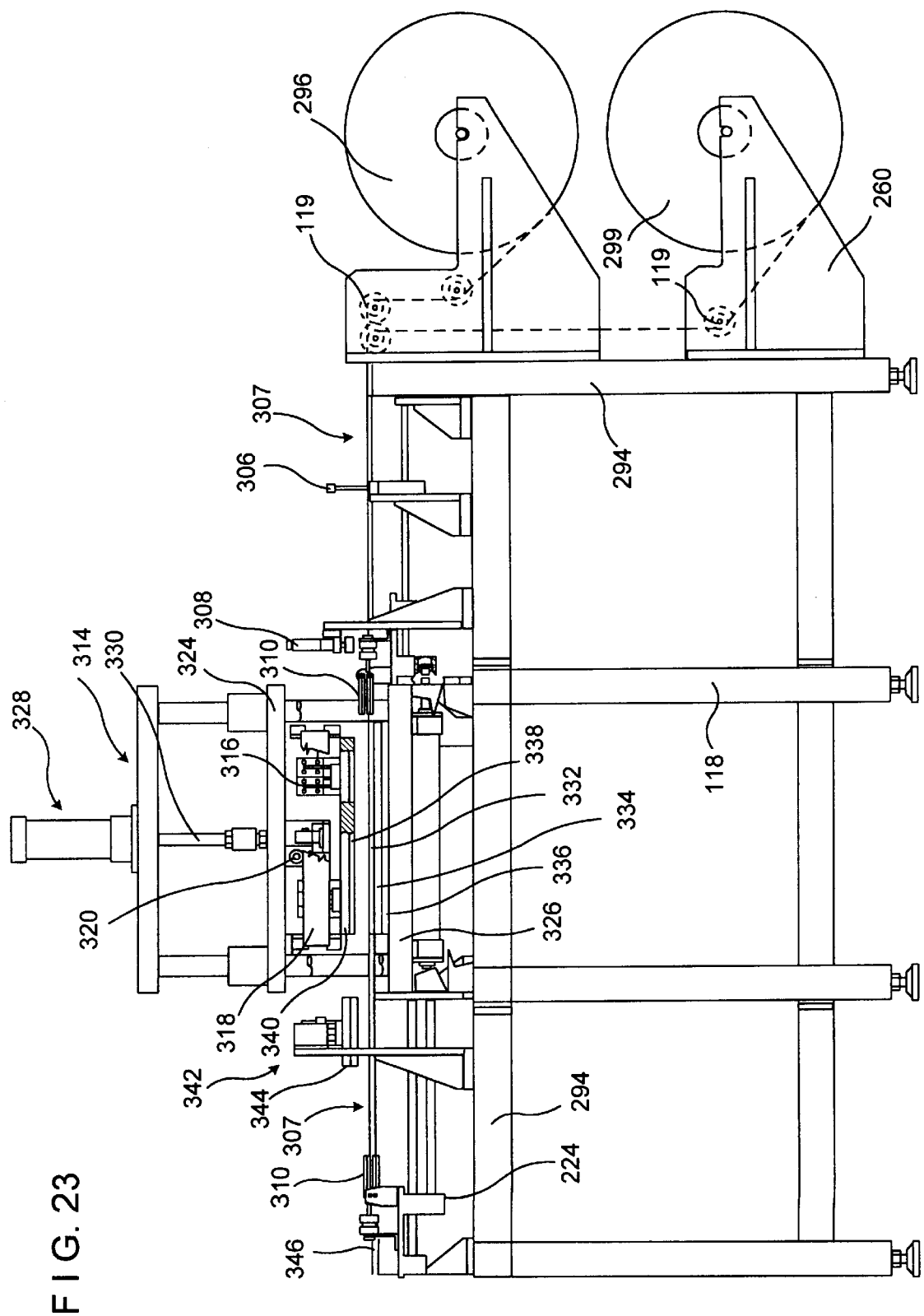
FIG. 23 is a side view of the apparatus used to form the thumb portion using the non-loop method.

The glove material on which the peripheral seams are formed is moved along the material support platform 128 by the combined action of a clamp-type translator element 446 and a pressure clamp 448, which function as described in detail below. Briefly, the pressure clamp 448 is located along the process line and, when depressed, holds the sheets of glove material in correct alignment when they are not moving and when the clamp-type translator element 446 is open as shown in FIG. 28. When the c clamp-type translator element is closed (as shown by elements 310 in FIG. 23), the clamp holds the thermoplastic material and moves it along the process line by mechanical means (not shown on FIG. 28).

Referring to FIG. 29, details of the shuttle assembly 411 are shown taken along the line 29—29 of FIG. 28. This detailed figure illustrates the lower movable portion 458, including a pair of pressure plates 424, 424a, and an upper movable portion 460, including a pair of die plates 426, 426a. The lower and upper movable portions 458, 460 can be located relative to each other in a first position, as shown, with one die plate 426 positioned over one pressure plate 424, where the paired die plate and pressure plate are used to form the peripheral seam of one type of glove (e.g., a right-handed glove). In a second position (not shown), the lower portion 458 is moved to the left and the upper portion 460 is moved to the right, such that the second die plate 426a is positioned over the second pressure plate 424a. Thus positioned, the second die plate 426a and second pressure plate 424a are appropriately aligned for forming the peripheral seam of the other type of glove (i.e., a left-handed glove). It will be understood that the first set of die plate 426 and pressure plate 424 can be used to form a left-handed glove, and the second set of die plate 426a and pressure plate 424a can be used to form a right-handed glove. Utilizing such a system, where one set of die and pressure plates shuttles into position at appropriate times, both right-handed and left-handed gloves can be made on the same process line.

Referring to FIG. 29, the lower movable portion 458 is supported by the main frame 118 and a lower stationary platen 412. The lower slide gib 420 is attached to the lower stationary platen 412 and supports the lower slide plate 416. A spacer 418 is positioned above and attached to the lower slide plate, which is connected to the pair of support plates 422, 422a that in turn support the respective pressure plates 424, 424a. The upper movable portion 460 includes the pair of die plates 426, 426a, each connected to its respective heat insulator plate 428, 428a with an upper spacer 430 located above the insulator plates. The upper slide gib 432 is attached to the upper movable platen 438 and supports the upper slide plate 434 which is used to shuttle the dies into position as described above by means of a slide actuator 440, such as an air cylinder assembly 464 with an air cylinder rod 466, using mechanisms well known in the art.

For shuttling the lower movable portion 458, a double rack rotary actuator 450 is connected to a lower slide gear 452 which connects to upper slide gears 453 contained in a gear box 455, which translate movement from the actuator 450 to the rack 454 attached the lower slide plate 416. All of these mechanisms and their equivalents are well known in the art.

Such a shuttle assembly can be used to alternately bring into position dies and pressure plates in a fingertip to fingertip orientation for forming the peripheral seams of right-handed and left-handed gloves in the same process line. After sealing the peripheral seam by thermobonding using the die and pressure plate combination, the formed glove can be carried by the shuttle out of the process lines with a built-in vacuum glove removal chamber (not shown) that is, for example, located in a top spacer. Then the detached glove is deposited in a container such as described in more detail below. The bottom pressure plate is shuttled to prevent interference that may produced by any impressions caused by a left hand die which could interfere with the right hand thermobonding.

Completed Glove Removal Assembly

Figure 14B:
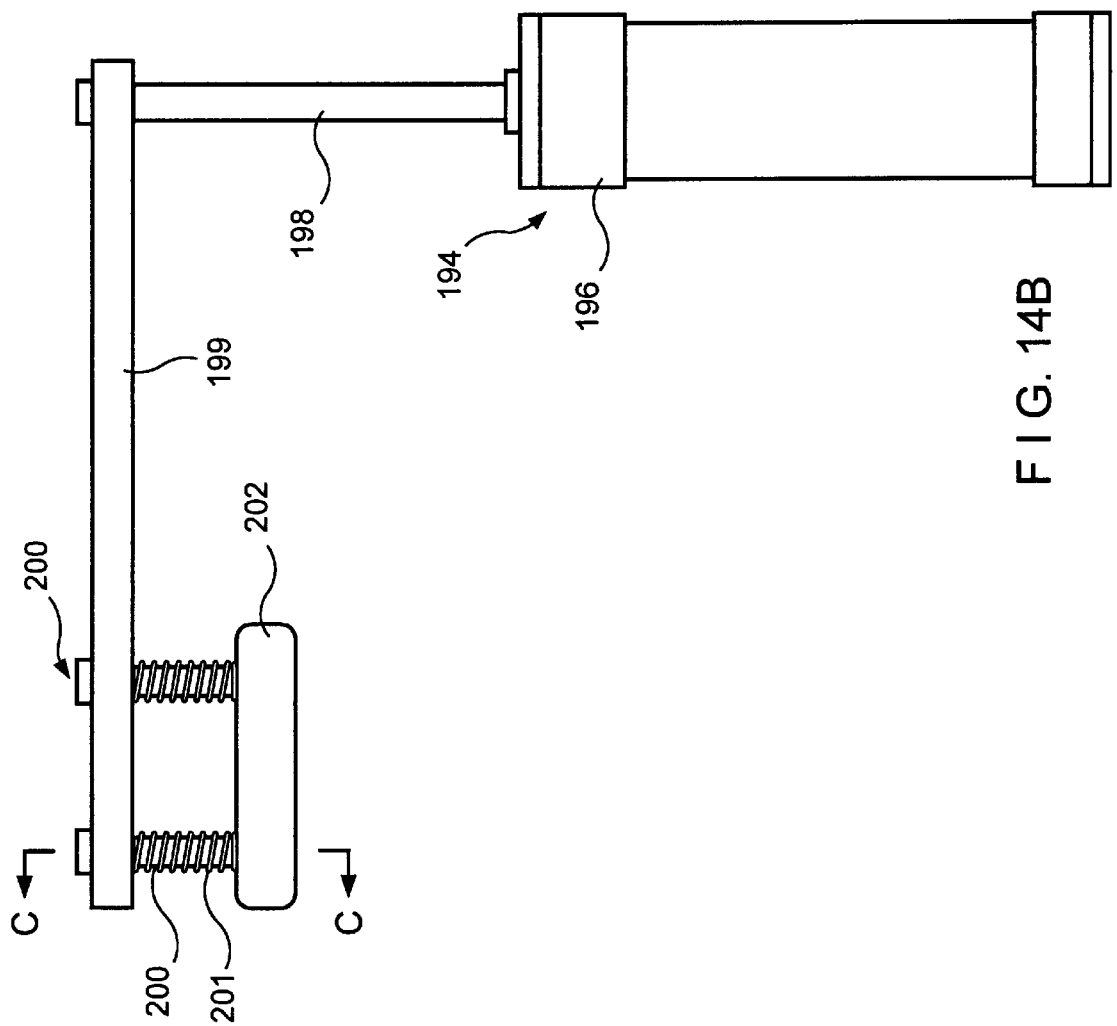
FIG. 14B is a side view of the glove removal assembly as shown in FIG. 14A.
Figure 14A:
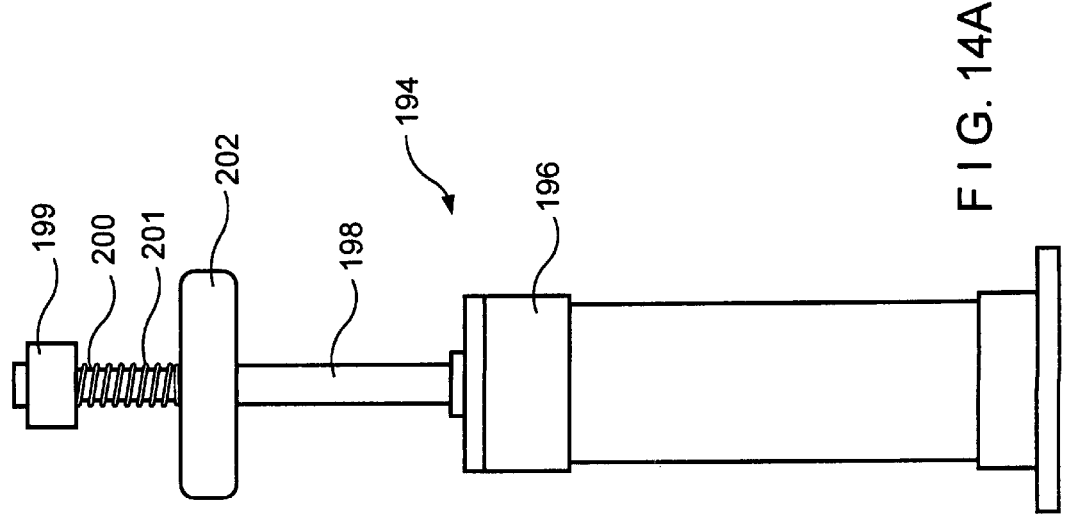
FIG. 14A is a front view of the glove removal assembly.
Figure 14C:
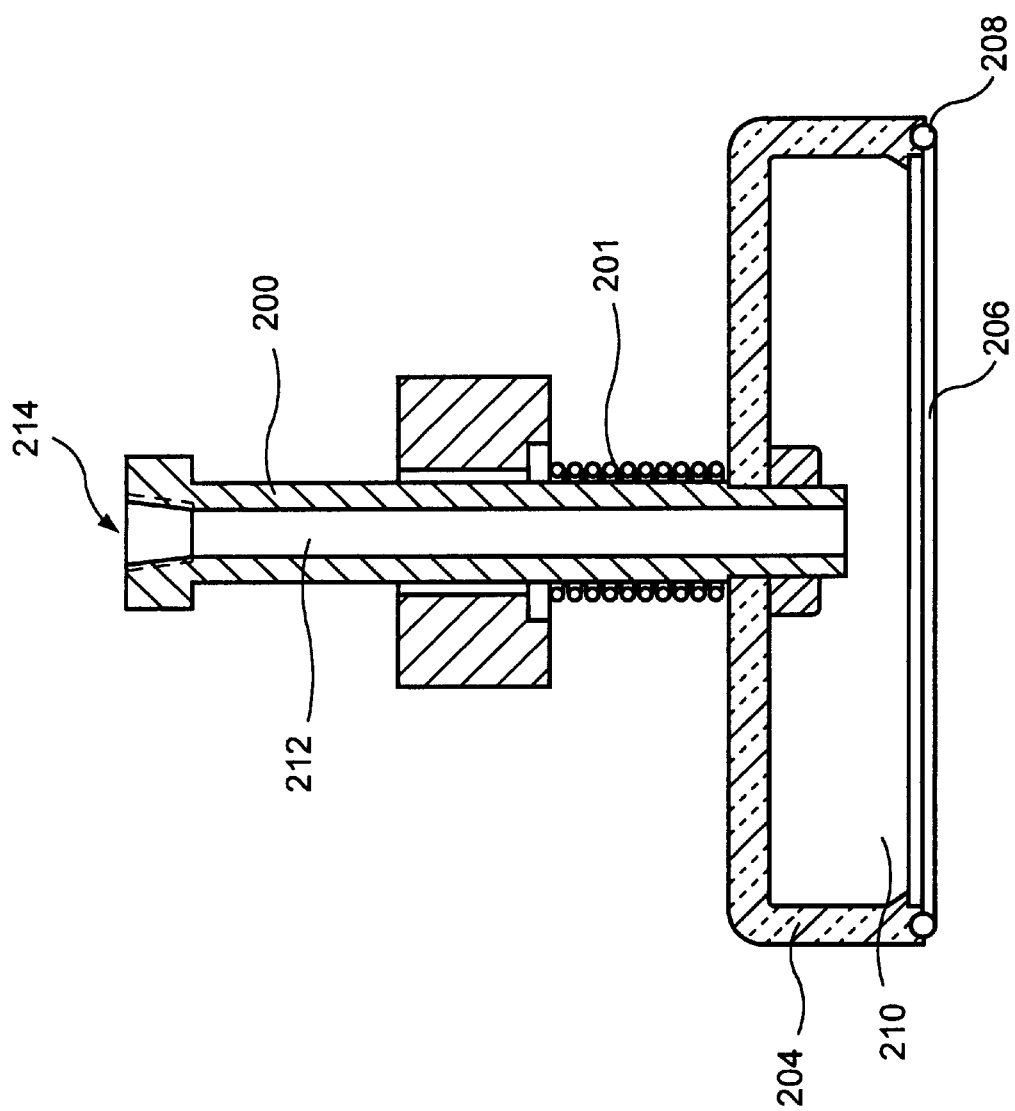
FIG. 14C is a cross-section view taken along the line C—C of FIG. 14B.

When the peripheral seam has been formed, the completed glove with its adjacent scrap material is advanced along the process line using the translator elements 158, 164 and pressure clamps as described above. The completed glove is then moved to the fourth station 62 for glove removal from the process line using a glove removal assembly 194. The glove removal assembly, which is also shown in FIGS. 14A to 14C, includes a support member 196 connected to the frame 118, a movable piston rod 198 connected to the support member, a rotatable arm 199 connected to the piston rod, a pair of movable shoulder pins 200 connected to the rotatable arm, a vacuum head 202 connected to the shoulder pins and a spring 201 surrounding each pin 200 between the rotatable arm 199 and the vacuum head 202. The vacuum head 202 comprises a wall 204 and a porous baffle 206 with a resilient seal 208 therebetween, the wall and the baffle defining an inner vacuum chamber 210. The vacuum chamber 210 is connected to a chamber 212 within the shoulder pin 200 that terminates in an aperture 214 which can be connected to a vacuum source.

In operation, the glove removal assembly 194 is in a first position (as shown in FIG. 12 in shadow lines) such that the vacuum head 202 is located directly over a completed glove in the fourth station. Using any of a variety of power actuated mechanisms, the piston rod 198 is lowered to bring the vacuum head 202 into proximity with the completed glove. Vacuum pressure through the porous baffle 206 causes the completed glove to be releasably attached to the vacuum head 202 and the piston rod 198 is raised, drawing the glove away from the scrap material 61 which remains on the process line. The resilient seal 208 and porous baffle 206 prevent damage to the glove as it is lifted by cushioning and spreading the vacuum force over a larger surface of the glove. The spring 201 permits sufficient contact pressure to set and seal the vacuum head 202 to the glove without requiring individual pressure adjustments (e.g., for different weights or types of thermoplastic material). The rotatable arm 199 then rotates (as shown by curved arrow A of FIG. 12) about greater than 90° to about 180° to a second position (shown in FIG. 12) where the vacuum pressure is released allowing the completed glove to drop into a collection bin (not shown). Positive air pressure through the baffle 206 may be used to forcibly release the glove from the vacuum head 202. The rotatable arm then returns to the first position for the next round of glove removal. It will be understood that the sequence may start with the vacuum head 202 outboard from the frame as shown in FIG. 12. The vacuum head rotates inboard and is lowered for the vacuum pickup of the glove, then reverses the movement and releases the glove.

Alternatively, a mechanism such as a finger clamp (not shown) could be substituted for the vacuum head on the glove removal assembly 194, thus eliminating the need for a vacuum. In this case, the glove removal assembly is lowered, raised and rotated as described above, but the mechanism grasps the completed glove drawing it out of the scrap material and breaking the tear seal instead of the vacuum head. A blast of air from below the material support platform and directed upward under the completed glove may lift the glove or some portion of it to facilitate the grasping of the glove by the mechanism. When the rotatable arm is positioned over the collection bin, the mechanism releases the glove, for example, by opening the finger clamp.

The remaining scrap material 61 is translated along the process line using the combined action of the pressure clamp 192 and translator elements 164 as described above to a scrap removal assembly 216 using ball bearing guide rollers 119 to maintain alignment of the scrap material until it exits the process line. The scrap material is held on the material support platform 128 by the pressure clamp and translator elements until it exits the process line, thus preventing the scrap material from pulling inward after the completed glove is removed. This is important to prevent misalignment, crimping or bunching of material which could cause misalignment along the rest of the process line. The scrap material 61 can exit the apparatus via any of a variety of means including gravity feed into a container or winding onto a roller (not shown) for disposal or recycling of the scrap material.

Figure 15:
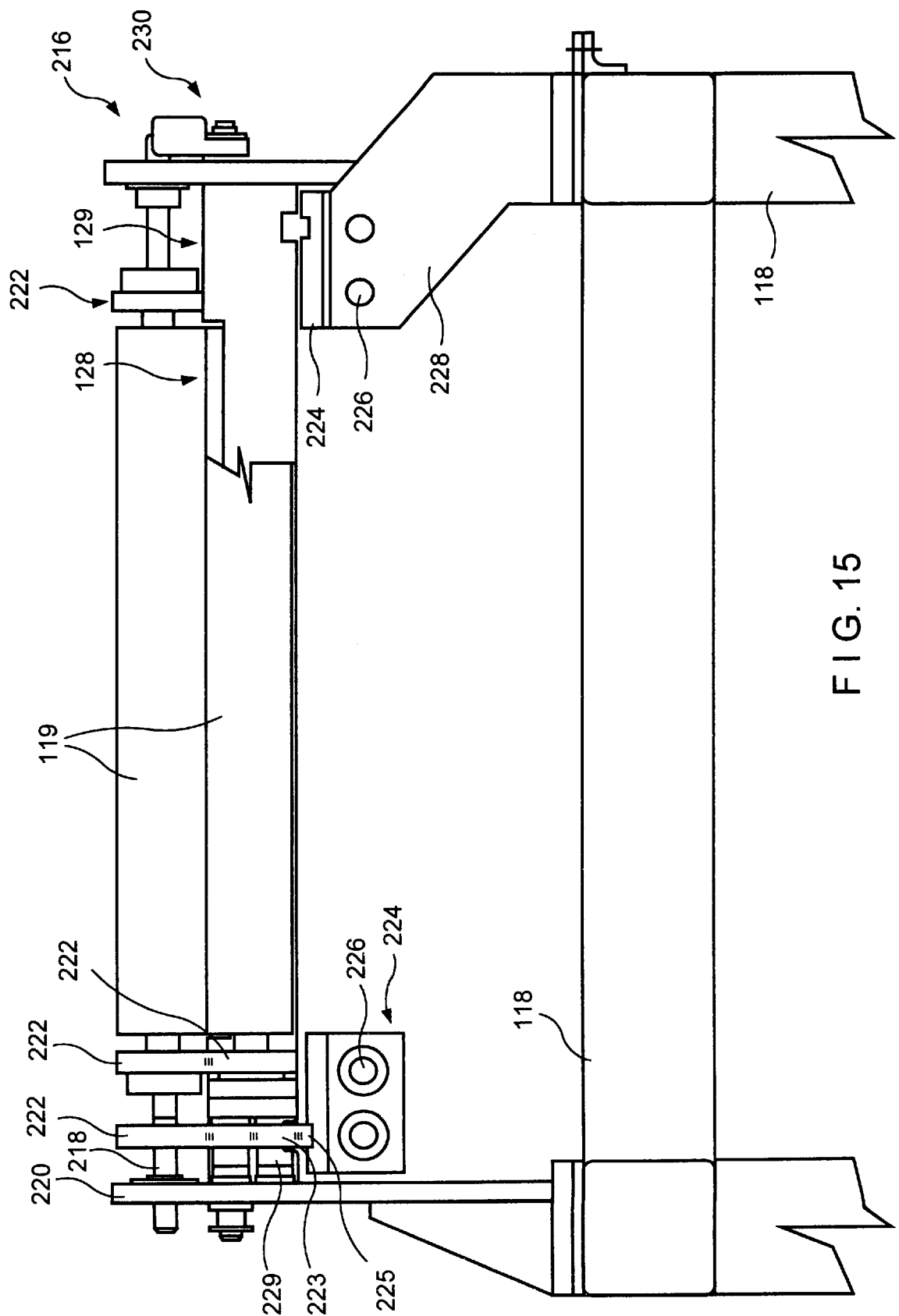
FIG. 15 is a front view of the scrap removal means.
Figure 16B:
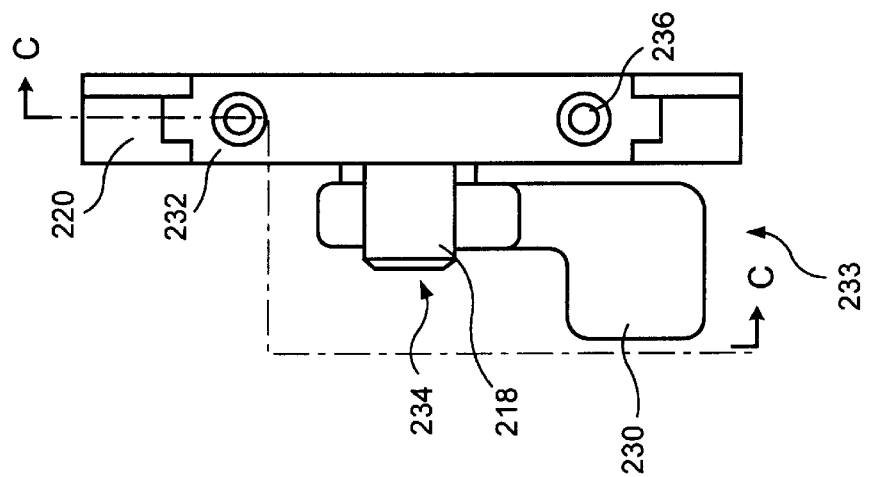
FIG. 16B is a top view of the release lever system of FIG. 16A with the release lever in a second position as shown in FIG. 16C.
Figure 16A:
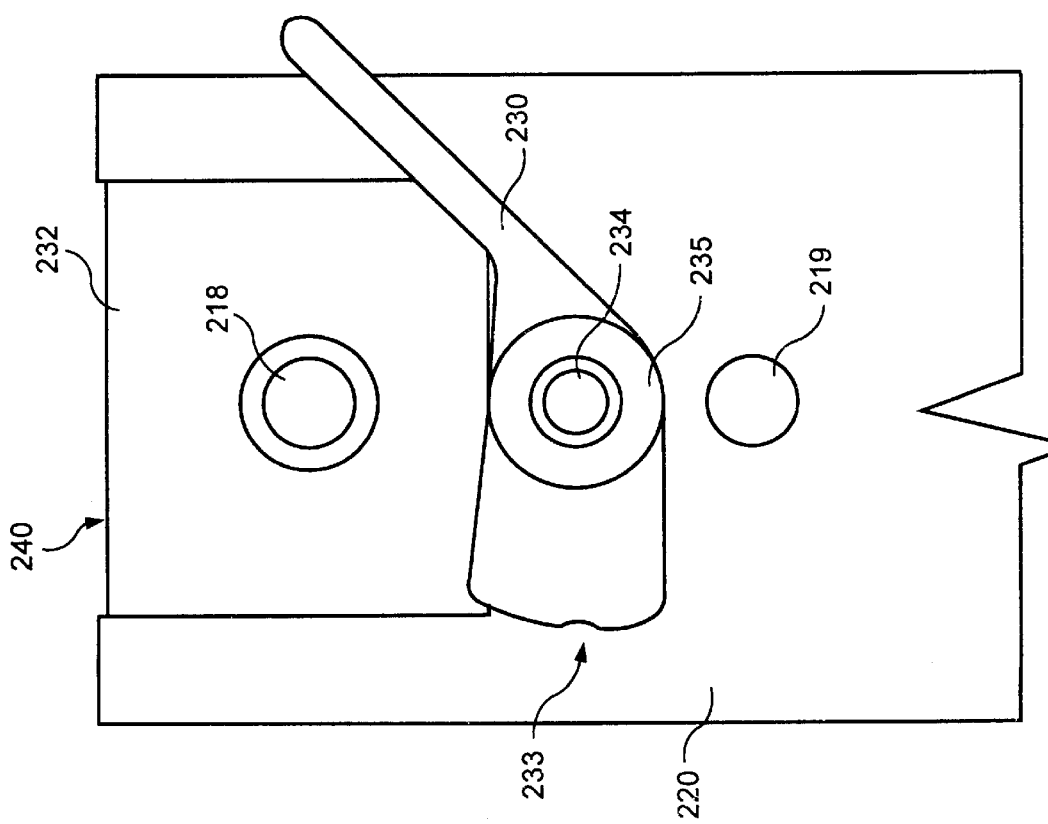
FIG. 16A is a front view of the release lever system with the release lever in a first position.

Components of the scrap removal assembly 216 are illustrated in FIG. 15, and in greater detail in FIGS. 16A to 16C. Referring to FIG. 15, the scrap removal assembly 216 includes a pair of ball bearing guide rollers 119 located adjacent to a material platform support 129, such that the edges of the rollers 119 are adjacent each other and to the material support platform 128. Each roller is connected by a shaft 218 to a scrap removal assembly support member 220 which is connected to the main frame 118. A series of gears 222 connected to the shaft 218 control the speed of rotation of the rollers 119. One gear 223 is the rack driven gear. The module further includes a rack 225 mounted on a carriage 224 which is connected to carriage shafts 226 and is operationally connected to the translator elements 164. The carriage shafts 226 are supported on rails 228 connected to the main frame 118. The speed and distance traveled by the carriage 224 and translator elements 164 is transmitted to the rack 225 and to the gears 222 and thus to the rollers 119 which are sized so that the circumferential distance travelled is equal to the linear distance traveled by the rack 225 in relation to the speed. This maintains proper alignment of the scrap material 61 along the material support platform. The assembly includes a clutch 229 connected to a gear 222 that has a lock function which drives the gear during translation of the thermoplastic material and an unlock or overrunning function which does not drive the gear while the carriage is returning to the starting position. That is, when the translator elements 164 are closed and moving the material, the rollers 119 are moving, whereas the rollers 119 are idle when the pressure clamps 192 are extended and the material is held stationary as the translator elements 164 return to their first position. Because of the proximity of the scrap removal means 216 to the glove removal assembly 194, the leading scrap material 61 is already engaged between the rollers 119 when the glove is removed and the movement of the trailing scrap material to the rollers 119 is controlled by the action of the pressure clamp 192 and the translator element 164. This system of movement controls the feed of scrap material 61 into the scrap removal means 216 and maintains the alignment of the scrap material in the process line even after the glove is removed. This is an improvement over prior art methods such as passive movement of the scrap material or movement regulated by other means (e.g., sensing the positions of punched holes, slides, sprockets in the material support platform engaged with holes in the thermoplastic material, pressure rollers) because these methods generally do not maintain the alignment of the scrap material when uneven pulling stress on the scrap material occurs once the glove has been removed. Moreover, the glove removal action may dislodge the scrap material from prior art retaining means such as sprockets engaged in holes if the material lifts up when the glove is removed whereas such dislodgement is avoided by the system of movement employed by the present invention.

Referring to FIGS. 16A to 16C, the positions of the rollers 119 relative to each other are controlled by a release lever 230 to allow initial placement of the thermoplastic material between the rollers. The release lever 230 is attached to the support member 220 via a lever shaft 234, with a retainer washer 235, wherein the shaft 234 provides the axis of rotation for the lever 230. One end 233 of the release lever 230 is adapted to contact the shaft 218 of the upper ball bearing guide roller 119. The roller shaft 218 extends through a housing member 232. Another roller shaft 219 which is attached to and flush with the support member 220 that holds the rack driven gear in place. The housing member 232 includes an upper roller retainer 240, and is attached to the support member 220 by a spring retaining screw 236 which extends between the support member 220 and the housing member 232. The spring retaining screw 236 is surrounded by a spring 238 that allows the housing member and its attached roller shaft 218 to move a limited distance in a vertical direction relative to the support member 220 while maintaining a constant pressure on the thermoplastic material that passes between the rollers 119. By adjusting the position of the spring retaining screw 236, the position of the housing unit 232 can be adjusted relative to the lower guide roller while the spring 238 provides flexibility to the system by allowing the two rollers to adjust to varying thicknesses of material that pass between the rollers.

As shown in FIG. 16A, the release lever in a first position does not contact the shaft 218, thereby allowing the upper guide roller to rest on the lower guide roller. When the release lever 230 is in the second position as shown in FIGS. 16B and 16C, one end 233 of the release lever contacts the shaft 218 of the upper roller guide raising the upper roller enough to provide clearance to slide the thermoplastic material between the rollers. Then the release lever 230 is returned to the first position and the shaft 218 is lowered, such that the upper roller and lower roller hold the material between them. Referring to FIG. 16C, a ball plunger 242 attached to the support member 220 holds the release lever 230 in the first position and limits its travel to no further than the first position.

Thumb Loop Forming Device

Returning to the process of thumb formation, the loop forming means 132 that includes a horizontal cylindrical rod 135 is illustrated in detail in FIGS. 17A–17E. As shown in cross-section in FIG. 17A, the loop forming means 132 comprises a hollow cylindrical rod 135 located between the upper sheet 124 and lower sheet 126 of thermoplastic material. The cylindrical rod 135 contains a pair of offset cables 248, 250 that prevent wobbling or skewing of the bar when it is lowered and raised (described in detail below). While a ball bearing roller guide 239 supports the sheets 124, 126 in the process line, the cylindrical rod 135 can be lowered substantially perpendicular to the plane of the lower sheet 126 (i.e., in the direction of the arrow) to draw the lower sheet 126 down, thus forming a loop for thermobonding the thumb seam. The cylindrical rod 135 returns to its original position after loop formation to be in proper position for the next round of loop formation and to prevent its capture in the scrap material after the seam is thermobonded.

Figure 17A:
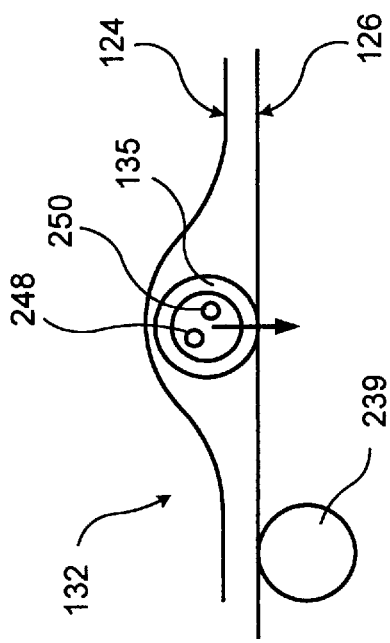
FIG. 17A is a cross-section view of the hollow rod of the loop forming means.
Figure 17B:
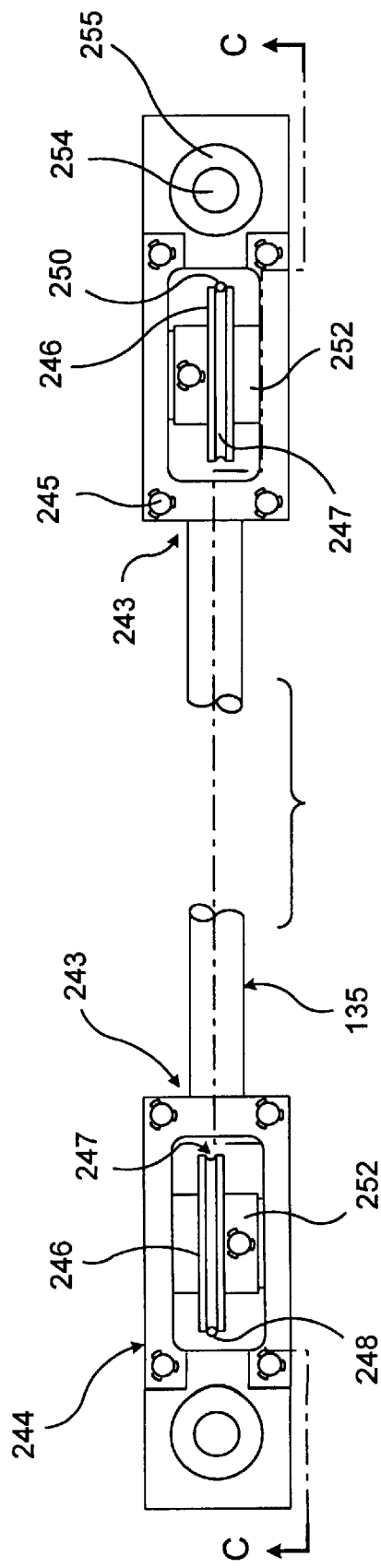
FIG. 17B is a top view of the loop forming means.
Figure 17C:
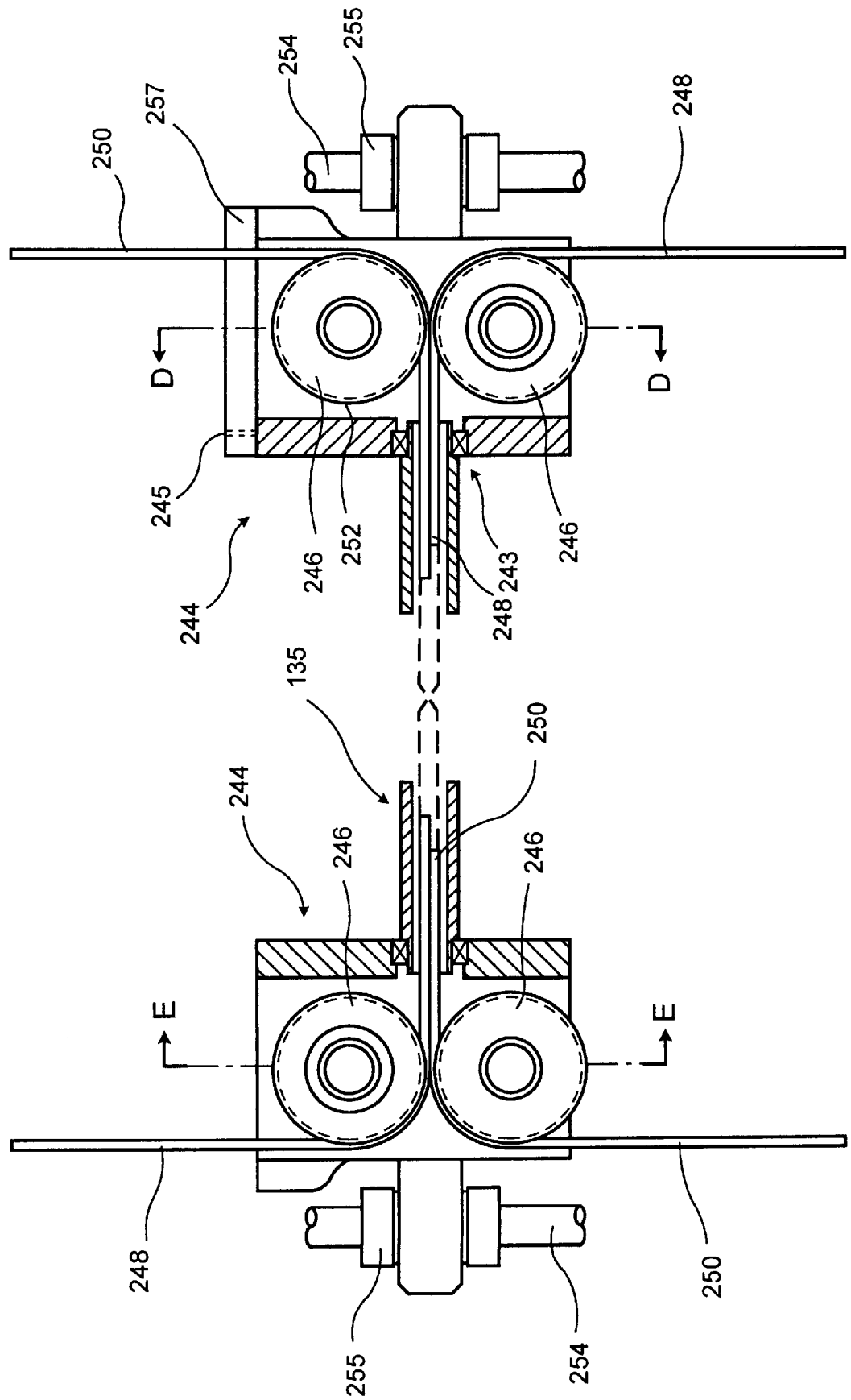
FIG. 17C is a side view with partial cross-section view taken along the line C—C of FIG. 17B.
Figure 17E:
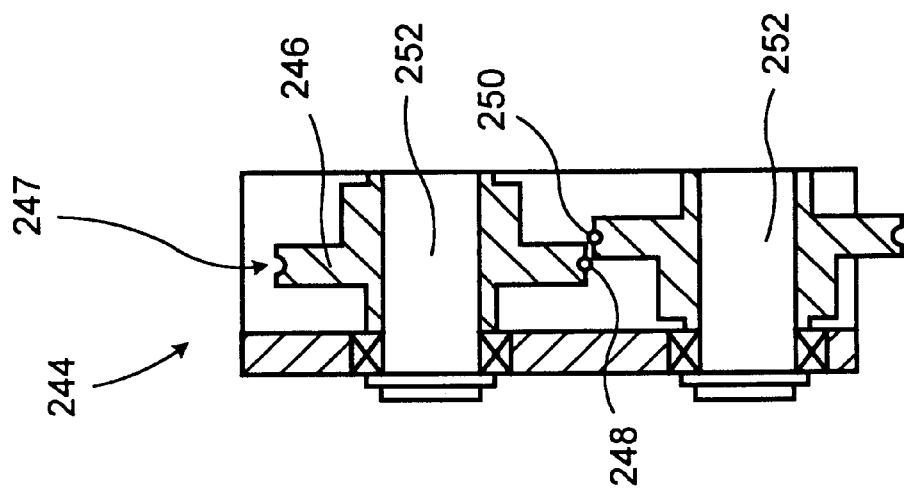
FIG. 17E is a cross-section view of one pulley housing member taken along the line E—E of FIG. 17C.
Figure 17D:
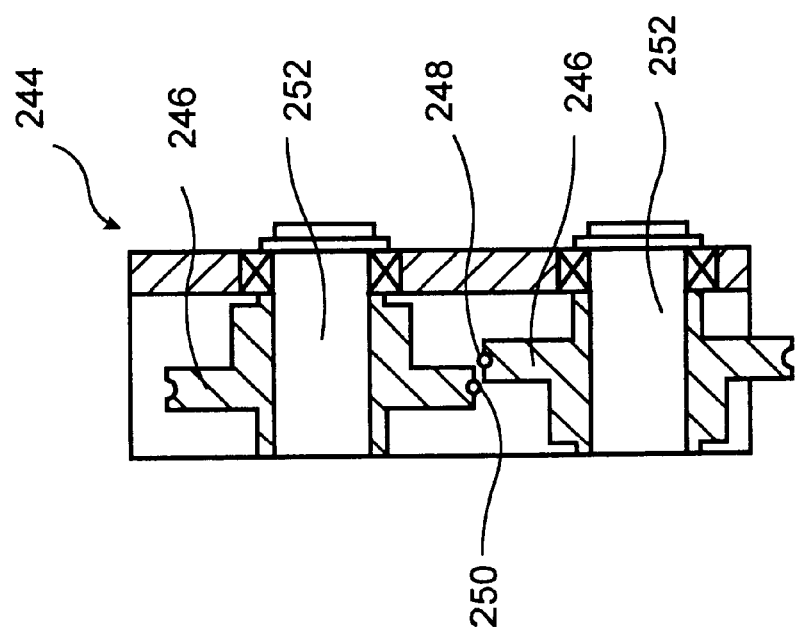
FIG. 17D is a cross-section view of one pulley housing member taken along the line D—D of FIG. 17C.

As shown in FIGS. 17B and 17C, the cylindrical rod 135 is attached at each end 243 to a pulley housing member 244 via a rod mounting plate 257 that is attached by fastening means through tapped holes 245 in the pulley housing member 244. Each pulley housing member 244 contains a pair of opposing pulleys 246 that are slightly offset relative to each other as shown in FIGS. 17D and 17E. Each pulley is shaped like a wheel with a groove 247 at the perimeter of the pulley for holding the cables 248, 250 that extend through the cylindrical rod 135. Each pulley 246 is rotatably attached to the pulley housing member 244 by an axle 252. The pulley housing member 244 is attached to a shaft 254 that extends through a ball bushing 255 to prevent the pulley housing member 244 from swinging outboard. The pulley housing member 244 is attached to a power actuated cylinder 134 (not shown in FIG. 17B, see FIG. 11) by a plate 257 mounted on the pulley housing member 244 by fastening means (not shown) through a plurality of tapped holes 245 in the pulley housing member 244.

Referring to FIG. 17C, the two cables 248, 250 are arranged such that each cable begins at an end attached to a rigid structure (e.g., part of the frame), extends in a substantially vertical direction, then extends around a pulley 246 in one pulley housing member 244, passes through the cylindrical rod 135 in a substantially horizontal direction, then extends around another pulley 246 in the other pulley housing member 244, and finally extends in a substantially vertical direction before terminating by attaching to a rigid structure. As the cable passes around the pulleys, it is held within the peripheral groove 247 of the pulley. This arrangement of cables 248, 250 means that each cable is attached at one end to an upper rigid structure, crosses through the cylindrical rod 135 and then is attached at the other end to a lower rigid structure. This arrangement means that the cable that passes under an upper pulley 246 in the first pulley housing member 244 then passes over a lower pulley 246 in the second pulley housing member 244 while the other cable is located in substantially a mirror image relative to the first cable. Thus, the two cables form a shape of the letter "H" with the crossbar of the "H" corresponding to the portion of the cables located within the cylindrical rod 135. For example, as shown in FIG. 17D, cable 250 passes under the upper pulley while cable 248 passes over the lower pulley.

After the cables pass through the horizontal bar, they reverse positions such that, as shown in FIG. 17E, cable 250 passes over the lower pulley while cable 248 passes under the upper pulley. Because of this arrangement of cables, when the power actuated plunger 134 is moved, the tension on the two cables 248, 250 as they pass through the pulley housing members 244 and through the cylindrical rod 135 ensures that the rod 135 moves smoothly without skewing or wobbling, substantially parallel to the plane of the material support platform. This smooth motion prevents stretching and thinning of the thermoplastic material during loop formation which may reduce the material strength in the completed glove or lead to seam failure. Moreover, because any force and resistance at one end of the horizontal rod will be identical to the force and resistance at the opposite end of the rod, a single power actuated plunger 134 may be used to move the horizontal bar.

Apparatus for Manufacturing Type B Gloves

Figure 18:
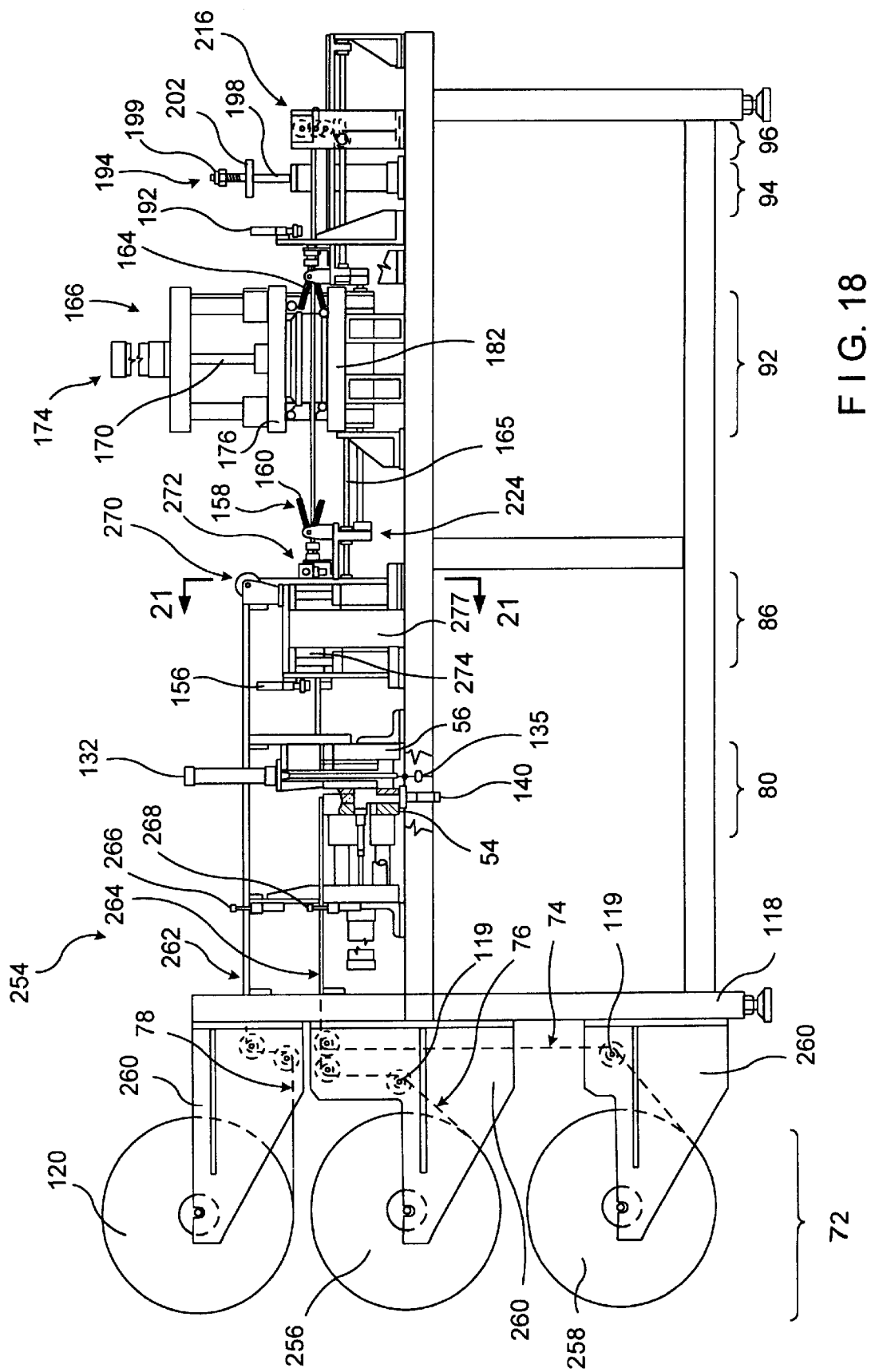
FIG. 18 is a side view of the glove manufacturing apparatus for making type B gloves.
Figure 19:
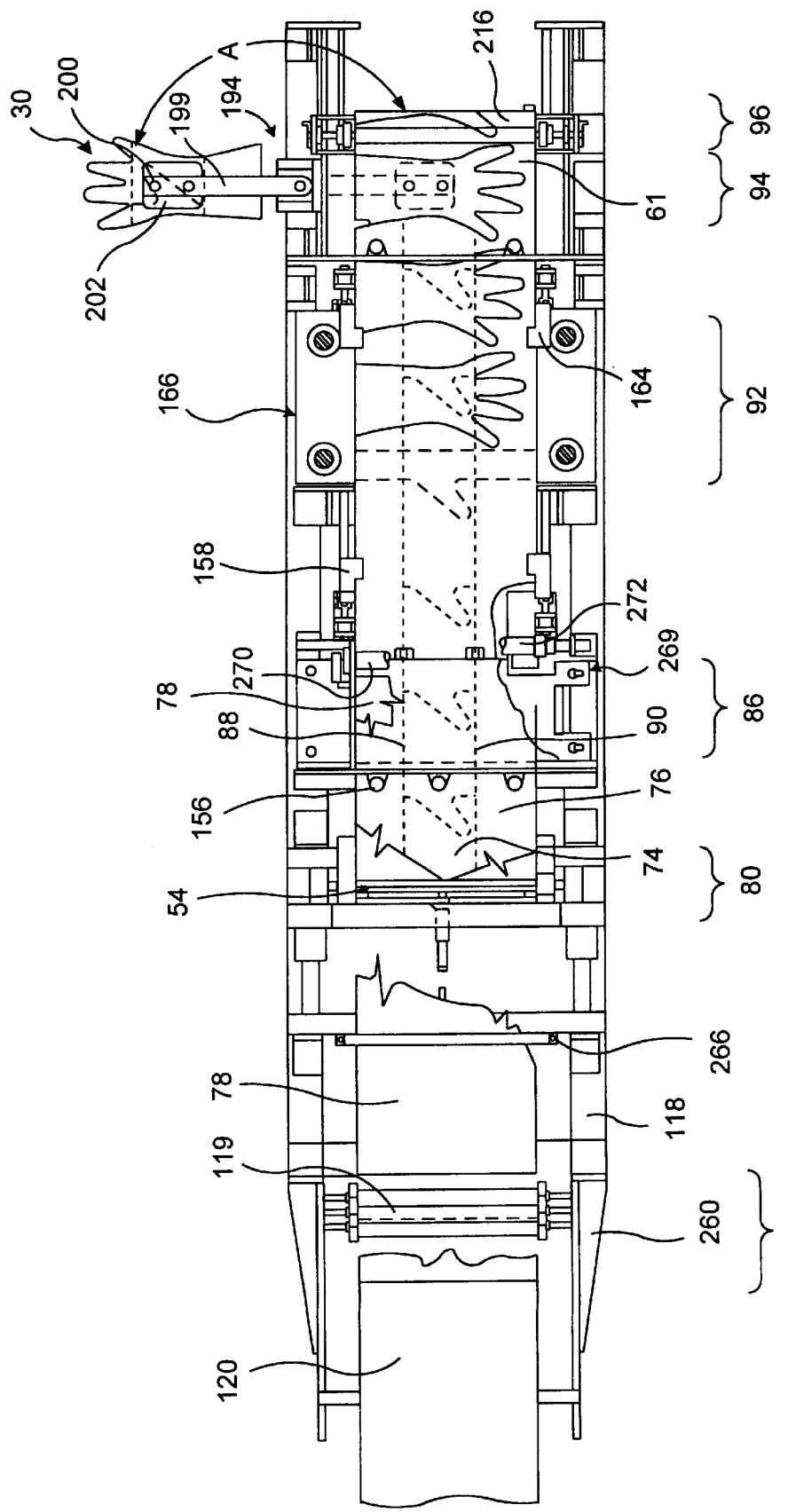
FIG. 19 is a top view of the glove manufacturing apparatus of FIG. 18.

An apparatus for manufacturing type B gloves is illustrated in FIGS. 18 and 19, showing a side view and a top view similar to those shown in FIGS. 11 and 12, respectively. The apparatus shown in FIGS. 18 and 19 includes additional elements not shown in FIGS. 11 and 12 that are needed for manufacturing gloves having a separate central strip of material 74 that forms the thumb and hand portions and peripheral strips of material 76 that form the wrist and finger portions. Many of the features of the apparatus shown in FIGS. 18 and 19 have already been described with reference to FIGS. 11 and 12 and the description of those elements is incorporated by reference here.

Referring to FIGS. 18 and 19, the apparatus includes a main frame 118 to which are attached three rolls of thermoplastic material 120, 256, 258 by means of support members 260. The upper roll 120 dispenses the upper sheet 78 of material which ultimately forms the back of the glove; the middle roll 256 dispenses the two peripheral strips of material 76 which ultimately form part of the fingers and wrist of the glove; and the lower roll 258 dispenses the central strip 74 of material that forms the palm and thumb portions of the glove 30. All of the sheets of material 74, 76, 78 each pass under and over a ball bearing roller guide 119 as described earlier to ensure proper alignment on the process line. At the first station 72 of the process line, the upper sheet 78 is dispensed to an upper material support platform 262 while the central strip 74 and pair of peripheral strips 76 are dispensed in an overlapping alignment to a lower material support platform 264.

FIG. 20 illustrates the end of the apparatus facing the three rolls 120, 256, 258 of material used in making type B gloves. Each of the rolls is attached to the main frame 118 via the support elements 260, each roll fitting onto a shaft 261 that serves as the axle as the roll turns dispensing the thermoplastic material by means of a power actuated feed and brake hub 263 attached to the shaft. The lower roll 258 dispenses the central strip of material 74 that forms the thumb and palm of the glove; the middle roll 256 dispenses two peripheral strips of material 76 that overlap the outside edges of the central strip 74; and the upper roll 120 dispenses a single sheet 78 of material that is essentially the width of the sum of the central strip 74 and the two peripheral strips 76. The upper roll dispenses the material to the upper support platform 262 while the middle roll 256 and lower roll 258 dispense material to the lower support platform 264.

Referring to FIGS. 18 and 19, both support platforms 262, 264 have associated pressure clamp bars 266, 268 under which the sheets of material pass to maintain proper alignment of the material on the support platforms. At the second station 80, the thumb seam is formed using a loop forming means 132 to draw the central strip 74 into a loop between the plates 54, 56 of the thumb forming die assembly substantially as described earlier. The thumb-forming die assembly is modified compared to that used to form the thumb of type A gloves to produce the curvilinear thumb seam and the abbreviated linear seams that extend only to the transverse seams of the glove (i.e., the die plate is about one-third the length of the type A die plate). The individual configurations of thermobonding elements in the die assemblies for forming the thumb portions and peripheral seams are described in detail below. Scrap material present in the thumb-forming die assembly may be removed substantially as described for FIGS. 11 and 12. After the thumb portion has been formed, the central strip 74 of material containing the formed thumb is drawn out of the die assembly and proceeds along the lower material support platform with peripheral strips 76 adjacent to and slightly overlapping the outer edges of the central strip to the third station 86 where the transverse seams 88, 90 are thermobonded to form a single strip of material using a strip seaming module 269. The strip seaming module comprises a pair of parallel thermobonding assemblies 274 that form substantially parallel seams 88, 90 near the lower palm and base of the fingers, respectively, on the completed glove. The upper plastic sheet 78 passes over the strip seaming module 269, and then over an upper guide roller 270 and under a lower guide roller 272 to bring the upper sheet 78 is adjacent facing relation above the thermobonded lower sheets 74, 76 on the lower material support platform 264. The sheets 74, 76, 78 progress down the process line via the action of translator elements 158, 164 that clamp onto the sheets and move them the appropriate distance to position them in the fourth station 92 where the peripheral seam is thermobonded to form the fingers and hand of the glove 30 using a peripheral seam forming means 166 substantially as described for FIGS. 11 and 12. Following thermobonding of the peripheral seam, the completed glove and surrounding scrap material is moved to the fifth station 94 for glove removal using a glove removal assembly 194 as described earlier. Following glove removal from the process line, the remaining scrap material 61 is removed at the sixth station 96 using a scrap removal means 216 substantially as described above.

Although the apparatus shown in FIGS. 18 and 19 is for producing only a single type of glove (e.g., a left-handed glove), it will be understood that the apparatus can be modified to include additional die assemblies so that both right-handed and left-handed gloves could be produced on a single process line simultaneously as described above. Alternatively, the apparatus may be set up with interchangeable die assemblies to allow production of either left-handed or right-handed gloves depending on the combination of thumb-forming and peripheral seam-forming die assemblies used together.

Strip Seaming Module

Figure 21B:
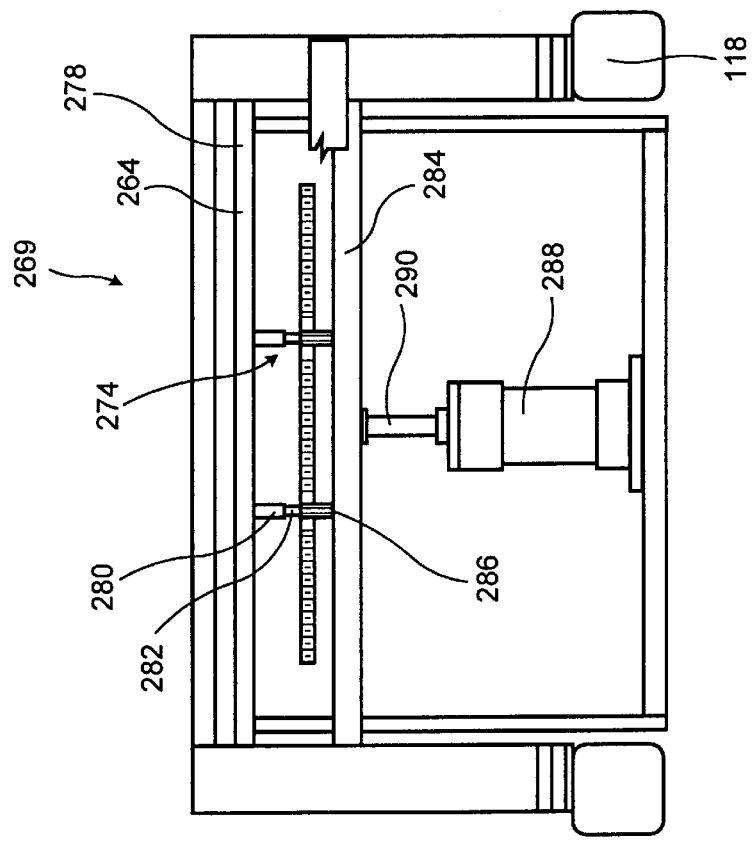
FIG. 21B is a view of the strip seaming module in the closed or thermobonding position, taken along the line 21—21 of FIG. 18.
Figure 21A:
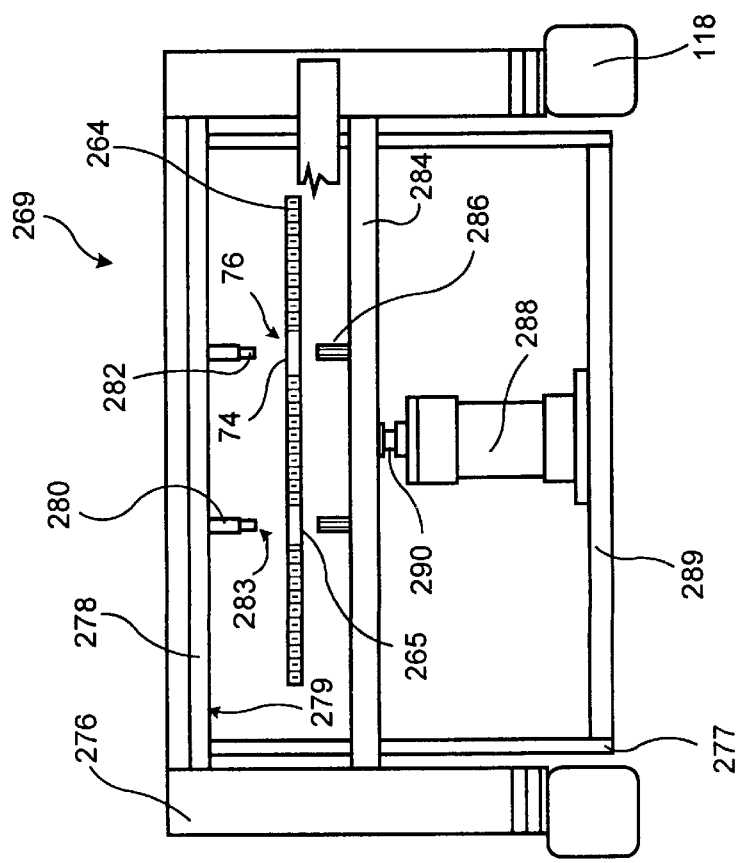
FIG. 21A is a view of the strip seaming module in the open or standby position, taken along the line 21—21 of FIG. 18.

The strip seaming module 269 for thermobonding the transverse seams 88, 90 is shown in greater detail in an open or standby position in FIG. 21A and in a closed or thermobonding position in FIG. 21B. The module includes a frame 276 for supporting the pair of press plates 278, 284 and the attached parallel thermobonding assemblies 282, 286 and connecting them to the main frame 118. The upper press plate 278 has a lower surface 279 to which is attached a pair of parallel support backings 280 providing support for the attached parallel resilient pressure plates 282. Each resilient pressure plate 282 has a lower face 283 that is substantially rectangular in shape with a major axis parallel to the process line. The lower press plate 284 supports a pair of parallel thermobonding seam die plates 286, each one positioned directly opposite and aligned with a resilient pressure plate 282 and having a major axis parallel to the process line. Although the thermobonding assemblies shown in FIGS. 21A and 21B are of the bar type, it will be understood that other thermobonding assemblies such as a roll type seaming apparatus could be used. Also, it will be understood that the positions of the pressure plate 282 and the die plate 286 could be reversed on the press plates 278, 284. Located between the thermobonding assemblies 274 is the lower material support platform 264 that includes a pair of open slots 265, each slot located between a resilient pressure plate 282 and its opposing seam die plate 286. Both press plates 278, 284 are connected to a power actuated cylinder 288 containing a piston rod 290 for raising the lower press plate 284 and lowering the upper plate 278. The power actuated cylinder 288 is attached to a support plate 289 which is attached to a vertical plate 277 that is attached to the upper press plate 278 but is not attached to the lower press plate 284. The upper and lower press plates are preferably mounted on four guide posts (not shown) to allow the plates to move up and down freely. As the piston rod 290 extends, the lower press plate 284 is raised until it hits against a stop to inhibit further upward movement. The piston rod 290 continues to extend, thus forcing the upper press plate 278 in a downward motion until it hits against a stop. Whichever plate, the upper press plate 278 or the lower press plate 284, exhibits the least resistance will move first whereas if the resistance of both plates is equal, then both plates will move at the same time.

As shown in FIG. 21A, when the press plates 278, 284 are in the open or standby position, the thermoplastic material can move along the lower material support platform 264. When the overlapping thermoplastic material of the central strip 74 and the peripheral strip 76 are located over the open slot 265, the thermobonding assemblies 274 are closed as shown in FIG. 21B by means of the power actuated piston rod 290, thus thermobonding the transverse seams between the seam die plates 286 and the resilient pressure plates 282. Following thermobonding, the die assemblies 274 are opened as shown in FIG. 21A to allow the thermobonded material to continue along the process line. When the upper plate 278 is raised and the lower plate 284 is lowered, the retraction of the thermobonding assemblies eliminates dragging and stretching of the material when it is translated to the next station.

Thumb Portion Formation Using Non-Loop Method and Apparatus

An alternative method may be employed to form the thermobonded thumb portion as illustrated in FIGS. 22 to 25. In this method, referred to as the non-loop method, two different widths 300, 302 of thermoplastic material are fed into a thumb-forming die means 314 located above the process line used for peripheral seam formation. The upper sheet 300 is wider in width than the lower sheet 302. The thumb seam is formed in a horizontal plane parallel to the plane of the main process line and the thumb forming die means 314 is attached to the main frame 118 by means of an outrigger frame 294 that is oriented at 90° to the main frame. The two different widths of material may be fed into the thumb forming die means from two rolls 296, 299, using one roll for each width. Alternatively, the two different widths may be formed by folding a single sheet of material to produce an off-center bifolded strip which is fed from a single roll 296 or a magazine (not shown). The material may also be dispensed from a magazine, for example, as two precut lengths of material having the two different widths.

When the thermoplastic material is supplied from a roll 296 as bifolded material 298 (see FIG. 22) or from two rolls 296, 299 each dispensing one width material (see FIG. 23), a cutting device (not shown) is used to partially cut the material to form edges 312 that define the proper length of material before or after it is fed into the thumb-forming die means. The cutting device may be any well known type of cutter such as a rotary shearing device (e.g., as shown in FIG. 24A) or a guillotine type cutter.

Figure 22:
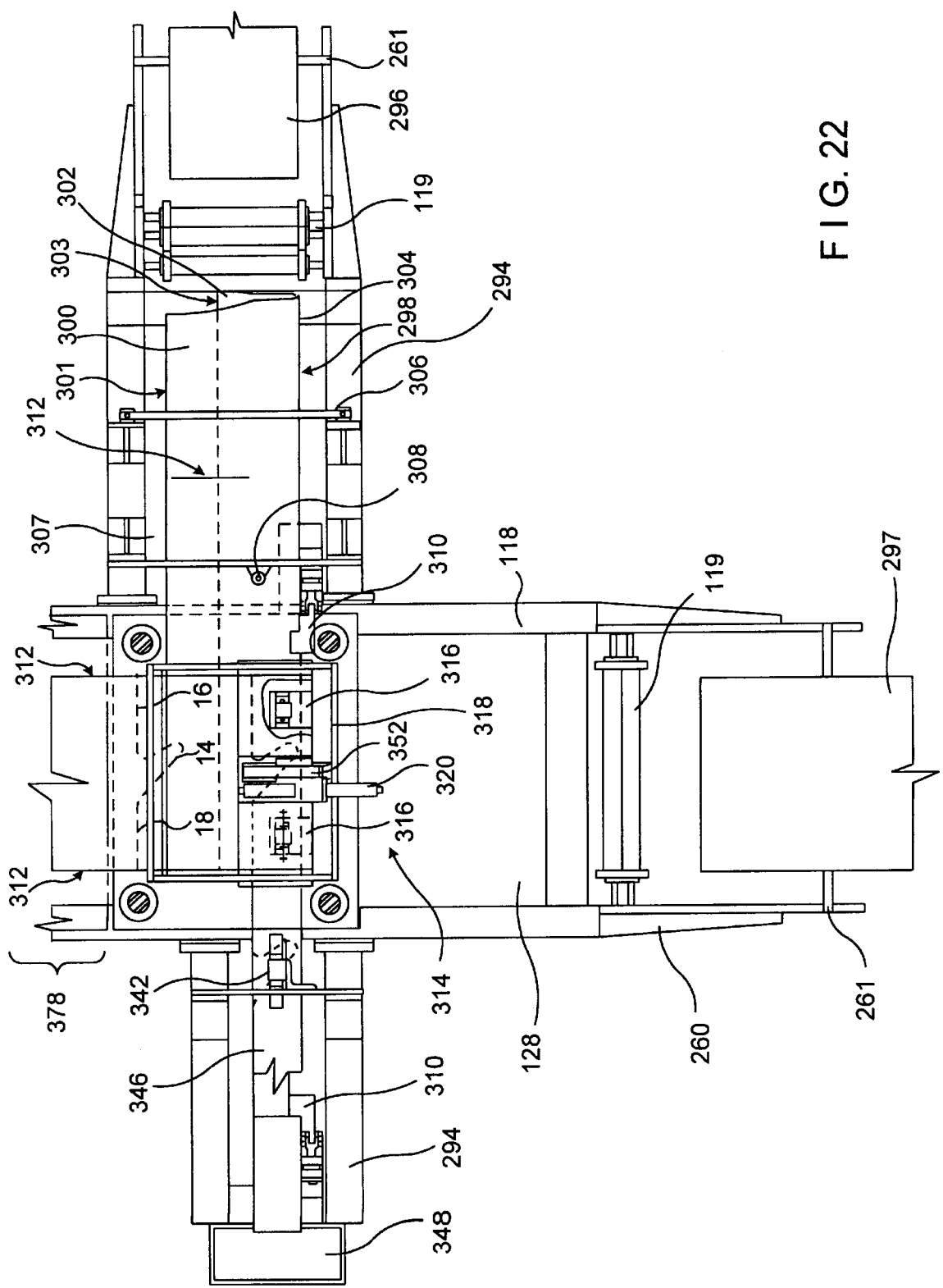
FIG. 22 is a top view of the apparatus used to form the thumb portion using the non-loop method attached to a portion of the apparatus as shown in FIG. 12.

As shown in FIG. 22, the two different widths of material are fed into the thumb-forming die means 314 such that the narrower width material 302 is located under the wider width material 300 (i.e., the narrower width material is located closest to the material support platform 307). The two widths of material are aligned along their longitudinal axes in an adjacent facing relation with one longitudinal edge of each sheet in substantially the same line, so that the other longitudinal edges of the sheets are offset from each other. In the case of bifolded material 298, the fold 304 forms the longitudinal edges that are substantially in the same line.

The two sheets 300, 302 or the folded sheet 298 of material are fed onto the material support platform 307 from the roll or rolls 296, 299 using ball bearing guide rollers 119 as described earlier for the devices shown in FIGS. 11 and 18. The thermoplastic material sheets are held in alignment on the material support platform 307 by use of a pressure clamp bar 306 and translated along the platform using the combined actions of pressure clamps 308, 342 and translator elements 310, substantially as described earlier. The two different widths 300, 302 of thermoplastic material enter the thumb forming means 314, which is parallel to the plane of the material support platform, where the curvilinear thumb seam 14 and adjacent linear seams 16, 18 are formed by the combined actions of a die plate 332 and a pressure plate 338 substantially as described earlier. The thumb seam extends between the cut edges 312 formed by use of the cutting device 356. The cutting device 356 may be cut the material within the thumb forming means 314, as shown in FIG. 24A, or may be made on the process line before the material enters the thumb forming means. By making only a partial cut through the material, the cut portion remains attached to the material dispensed from the roll thus allowing the translator elements 310 to move scrap material 346 out of the thumb forming means 314.

Figure 24B:
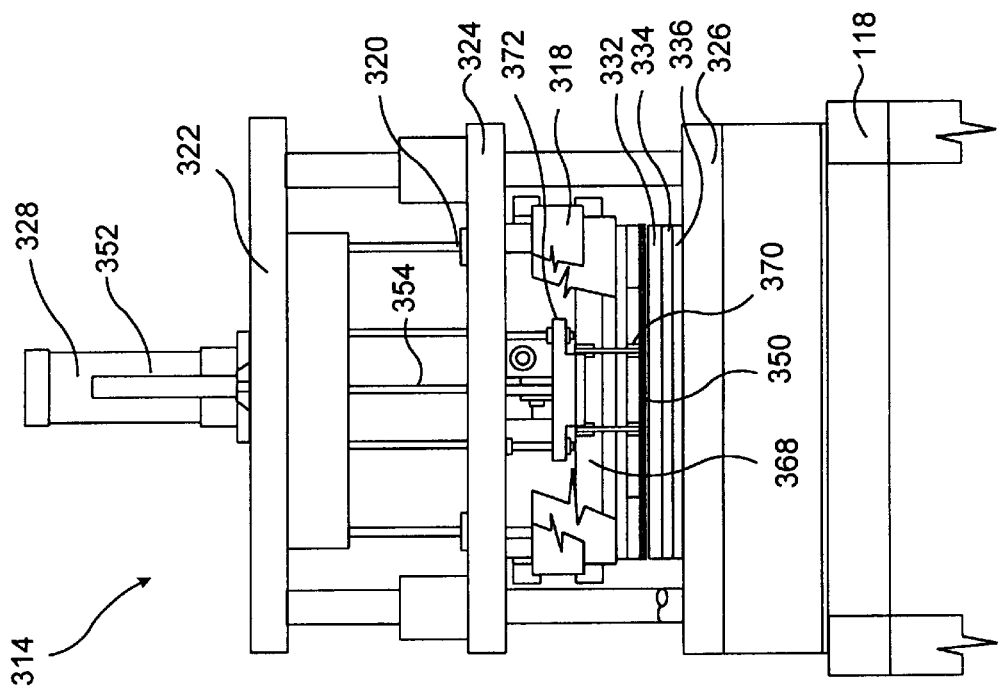
FIG. 24B is a front view of the thumb-forming die means used to form the thumb portion using the non-loop method.
Figure 24A:
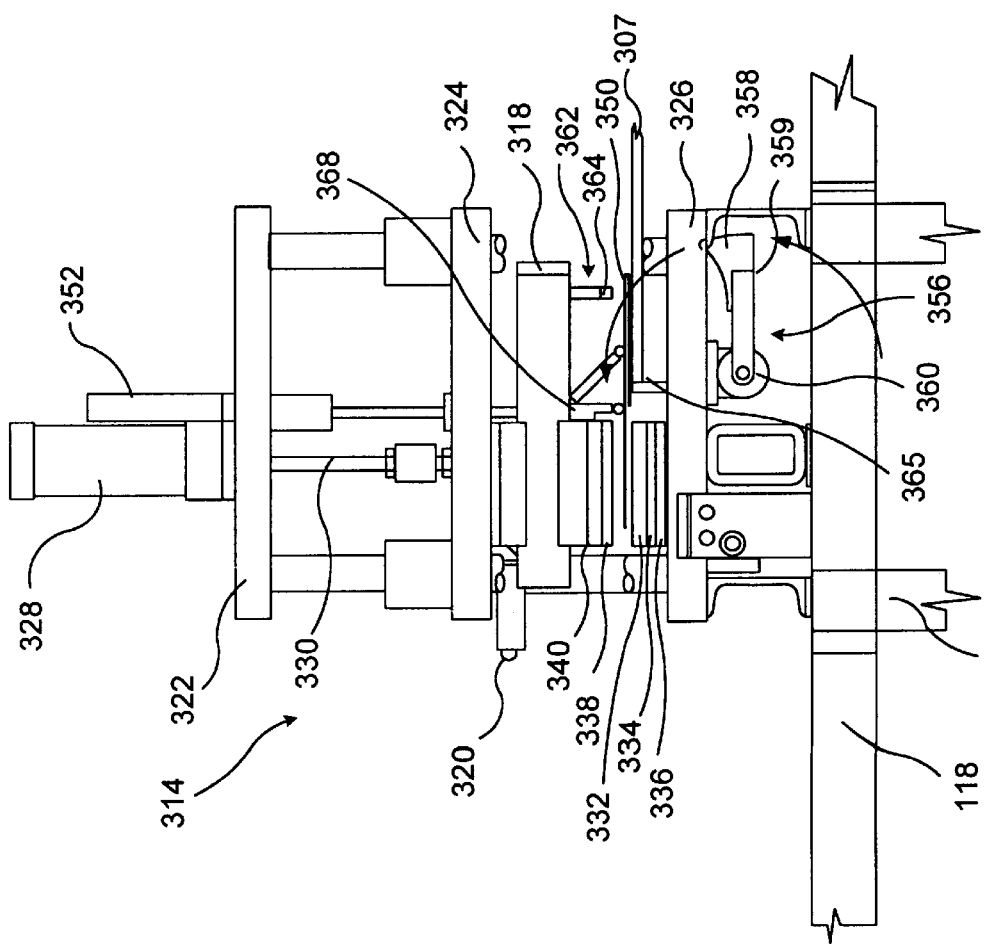
FIG. 24A is a side view of the thumb-forming die means used to form the thumb portion using the non-loop method.

Referring to FIGS. 24A and 24B, the thumb forming means 314 includes a frame 322 which holds an upper member 324 and a lower member 326 and is attached to the frame 118. The upper member 324, located above the material support platform 307, has an attached slide member 318 that can be moved back and forth in a plane parallel to the plane of the material support platform 307 by means of a rotary actuator 320. The slide member 318 includes a resilient pressure plate 364 that forms half of a strip seamer assembly 362. The upper member 324 can be moved up and down in a vertical direction perpendicular to the plane of the material support platform 307 by means of a power actuated cylinder 328 that contains a piston rod 330 connected to the upper member 324. The upper member further includes a pressure plate assembly 331 comprising a pressure plate 338 with a support backing plate 340 and a press clamp 316 with a resilient face 317 adapted to extend through the pressure plate assembly as shown in FIG. 25C. The upper member also supports a rotatable gate 350 attached to an actuating cylinder 352 which lifts or lowers the gate 350 relative to the material support platform 307 by means of a piston rod 354. The gate comprises a pair of opposing plates 351 (see FIG. 25B).

The stationary lower member 326, located below the material support platform 307, includes a thumb seam die plate 332 with an insulated backing plate 334 and a support plate 336. The thumb seam die plate 332 is located below and aligned with the pressure plate 338. Referring to FIG. 24A, the lower member 326 also includes a rotary cutting device 356 comprising a blade 358 attached to an arm 359 which is attached to a rotatable hub 360 that forms the axis for rotation of the rotary cutter. The strip seam die plate 365 that forms the other cooperating element of the strip seamer assembly 362 extends upward from the lower member 326.

Figure 25B:
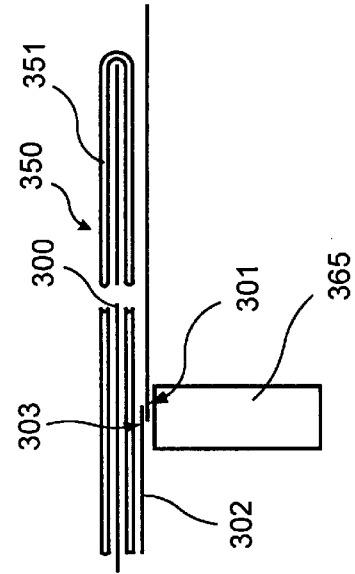
FIGS. 25A–25H illustrate the sequence of operation of thumb formation using the non-loop method.
Figure 25A:
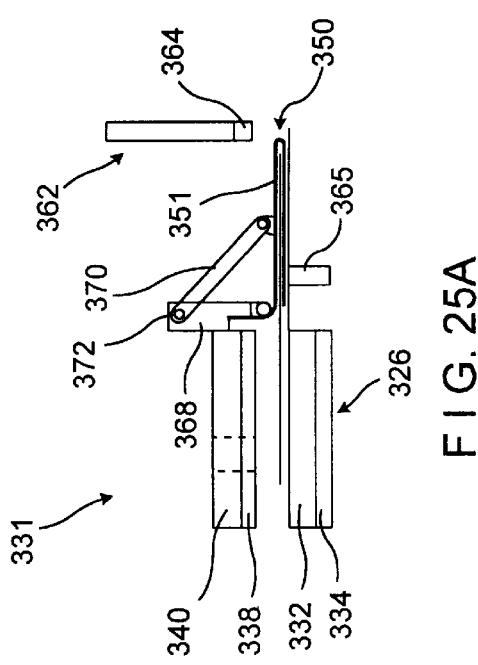
Figure 25D:
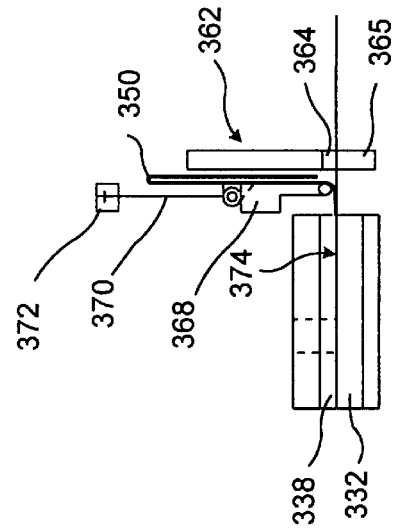
Figure 25C:
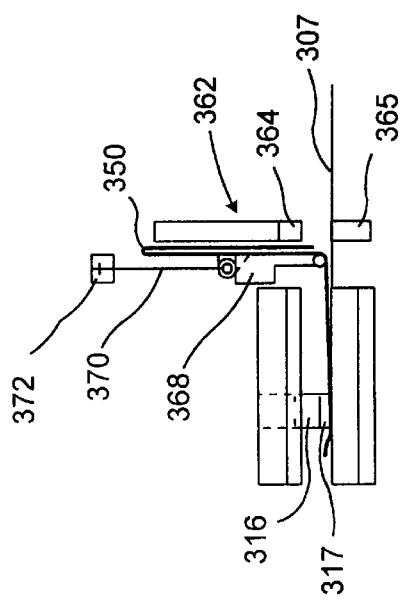

The sequence of operation of the non-loop thumb forming means 314 is illustrated in FIGS. 25A to 25H. Using the action of the translator elements 310, the wider width material 300 is fed between the gate plates 351 while the gate 350 is in the lowered position (as shown in FIG. 25A and enlarged in FIG. 25B). The narrower width material 302 is positioned below the gate 350 between the thumb seam die plate 332 and the pressure plate 338. After the press clamp 316 presses against two sheets of material, the rotary cutting device 356 (shown in FIG. 24A) makes one revolution to partially cut both of the wider and narrower widths of material, leaving an uncut portion attached to the material dispensed from the roll 296 to allow the translator element 310 positioned after the thumb forming means to move the scrap material 346 out of the thumb forming means to a scrap bin 348 (see FIG. 22). As shown in FIG. 25B, the free edge 303 of the narrower width material 302 is positioned over the free edge 301 of the wider width material 300 that immediately precedes it on the process line so that the two edges can be thermobonded using the pressure plate 364 and die plate 365, thus making a continuous strip of material for translocation of the material to the main frame process line using translator elements located thereon. As shown in FIGS. 25A and 25C, a stationary hinge plate 368 is located between the pressure plate assembly 331 and the strip seamer assembly 362. The gate plate 351 is attached to a link 370 and slide 372 system which are attached to the stationary hinge plate 368. The link 370 and slide 372 system is actuated by means of the actuating cylinder 352 and piston rod 354 (shown in FIG. 24A). When the slide 372 is pulled up, the gate rotates upward about 90°, stopping against the stationary hinge plate 368, thus moving the enclosed portion of the wider width material 300 out of the plane of the material support platform 307 (see FIG. 25C). This maneuver also positions the formed thumb portion in its prospective position in relation to the sheet of material on the support platform 128 of the main frame component of the apparatus. That is, in order for the seam formed by the action of the strip seamer assembly 362 (see FIG. 25D) to be located between gloves and outside of the glove proper, and in order for the longitudinal axis of the glove (with the thumb facing down) to be properly positioned with the finger-forming die assembly, the seaming must attach the narrower width end to the preceding material, which was formerly the wider width material. The wider width material is lifted by the gate 350 because it would otherwise be in the way during seaming as shown in FIG. 25D.

To maintain facing alignment of the narrower width material 302 with the other portion of the wider width material not contained within the gate 350, a press clamp 316 with a resilient face 317 presses the two sheets of material to the die plate 332, as shown in FIG. 25C. The pair of press clamps are positioned such that each is outside of the formed thumb portion (see FIG. 22). The press clamps 316 do not prevent the pressure plate 338 from closing because the pressure of the press clamps 316 is lower than that of the pressure plate 338. The strip seam pressure plate 364 is moved into alignment with the strip seam die plate 365 by movement of the slide 318 (shown in FIGS. 22 to 24).

As shown in FIG. 25D, the die plate 332 contacts the pressure plate 338 to thermobond the sheets of thermoplastic material therebetween forming the curvilinear and connected linear portions 374 of the thumb seam. Simultaneous, the strip seam die plate 365 contacts the pressure plate 364 forming a strip seam between the free edge 303 of the lower narrower width material 302 present in the thumb forming means and the free edge 301 of the preceding wider width sheet as described above. This linear strip seam is located outside of the formed thumb portion and attaches the formed thumb portions together in a continuous strip of material that can be drawn onto the main frame process line and away from the thumb scrap material 346. Although the strip seamer assembly 362 is illustrated as a substantially flat die plate 365 that seams the thermoplastic material by contacting the material against the substantially flat pressure plate 364, it will be understood that the die could also be a roll die.

Figure 25E:
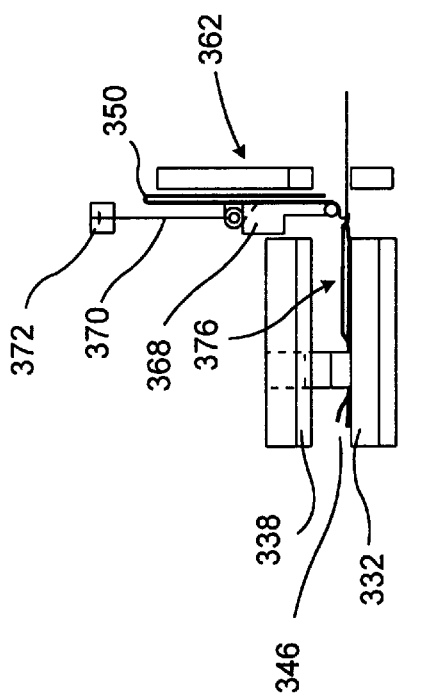
Figure 25F:
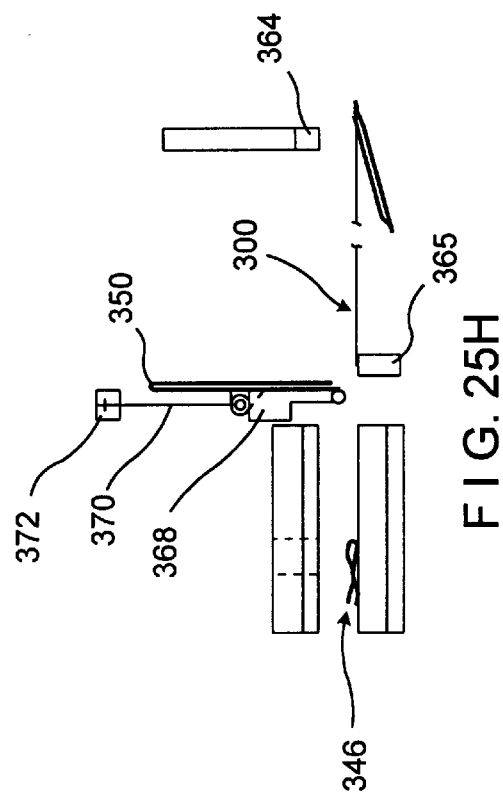

Referring to FIGS. 25E and 25F, the pressure plate 338 and die plate 332 open while the press clamp 316 remains extended and in contact with the thumb die plate 332. As the material containing the formed thumb portion 376 is drawn out of the die and press plates by the action of the translator elements located on the main frame 118, the scrap material 346 held by the press clamp 316 is detached from the thumb portion.

Figure 25G:
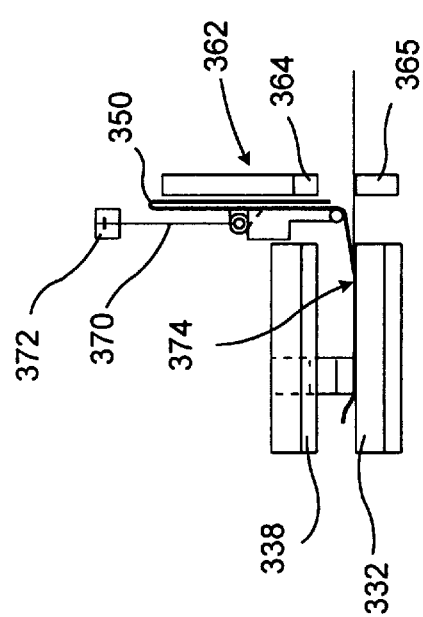
Figure 25H:
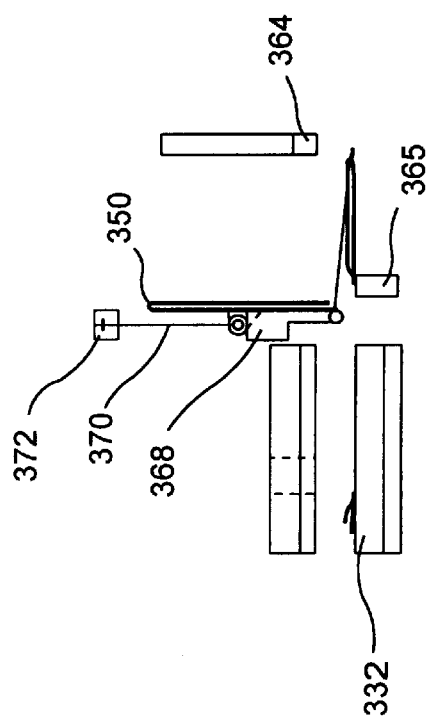

As shown in FIG. 25G, the strip seamer pressure plate 364 is moved to its first position by movement of the slide (shown in FIG. 24A). The press clamp 316 is withdrawn from the die plate 332 while the portion of the wider width material 300 contained within gate 350 is pulled out of the gate plates 351. As shown in FIG. 25H, this pulling motion positions the free edge 301 of the wider width material 300 that exits the gate over the strip seamer die plate 365 so that this edge now becomes the preceding material for attachment to the free edge 303 of the next narrower width strip 302 that enters the thumb forming means. The thumb scrap material is moved by the translator element 310 along the material support platform 307 of the outrigger frame 294 to a scrap bin 348 at the end of the outrigger frame 294 (see FIG. 22). The gate 350 is lowered to its starting position (as shown in FIG. 25A) and the next set of wider width and narrower width thermoplastic materials 300, 302 are brought into position as described for FIG. 25A for the next round of thumb seam formation.

This non-loop method can be used to form the thumb portion of either type A or type B gloves. In the case of type B gloves, the transverse seams 35, 36 linking the thumb portion to the material used to form the fingers and wrist portions of the glove may be sealed at a station 378 on the outrigger frame process line or on main frame process line using a seam forming assembly 274 such as described above for FIG. 18. The thumb portion formed by the non-loop method is translocated to the process line on the main frame by the use of guide rollers, pressure clamps and translator elements substantially as described earlier. On the main frame process line, the peripheral seam forming the fingers, hand and wrist portions of the glove is formed, the completed glove is removed, and the scrap material is removed from the process line substantially as described above.

Improved Heat Element Bearing Die Plates for Forming Thermobonded Seams

Figure 26C:
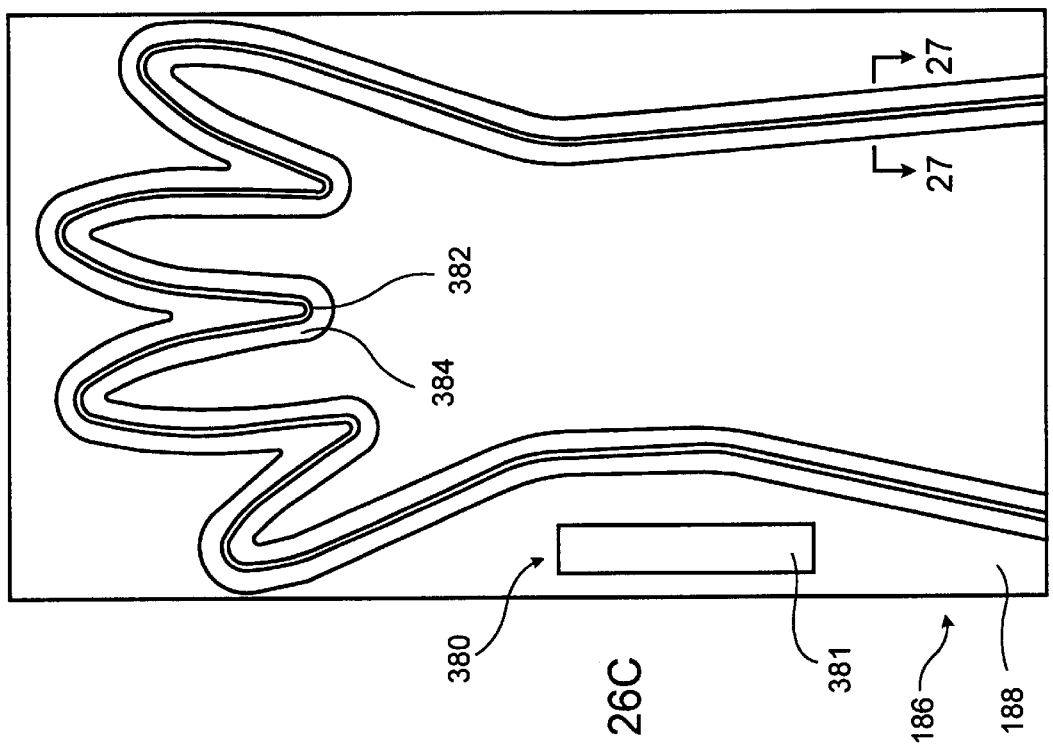
FIG. 26C is a plan view of the die plate used to form the peripheral seam.
Figure 26A:
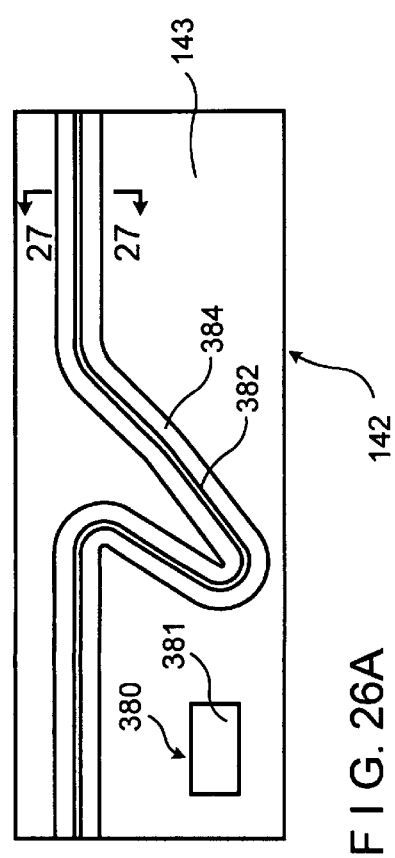
FIG. 26A is a plan view of the die plate used to form the thumb portion of type A gloves.
Figure 26B:
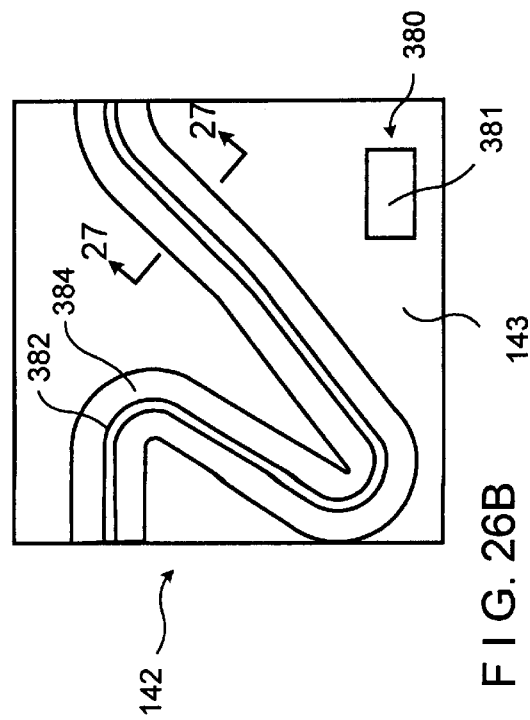
FIG. 26B is a plan view of the die plate used to form the thumb portion of type B gloves.

The die plates 142, 186 used to form the thumb portion of type A gloves (FIG. 26A), the thumb portion of type B gloves (FIG. 26B) and the peripheral seam (FIG. 26C) are illustrated. Referring to FIG. 26A, the thumb die plate 142 for type A gloves includes a curvilinear thermobonding element 382 that seals a seam defining the curvilinear thumb seam 14, and the first and second linear seams 16, 18 of type A gloves (see FIG. 1 for type A glove details). Referring to FIG. 26B, the thumb die plate 142 for type B gloves is about one-third the length of the die plate shown in FIG. 26A because the thermobonding element 382 for forming the curvilinear thumb seam only extends sufficiently to connect the curvilinear thumb seam to the transverse seams 34, 36 that are formed at the next thermobonding station (see FIG. 4 for type B glove details). The peripheral seam die plate 186 shown in FIG. 26C is the same for both type A and type B gloves. All of the die plates 142, 186 can include a cut out portion 380 that defines an aperture 381 for allowing a pressure plunger (not shown) to project through the die plate to hold scrap material to the paired press plate of the die assembly as described above.

Figure 27C:
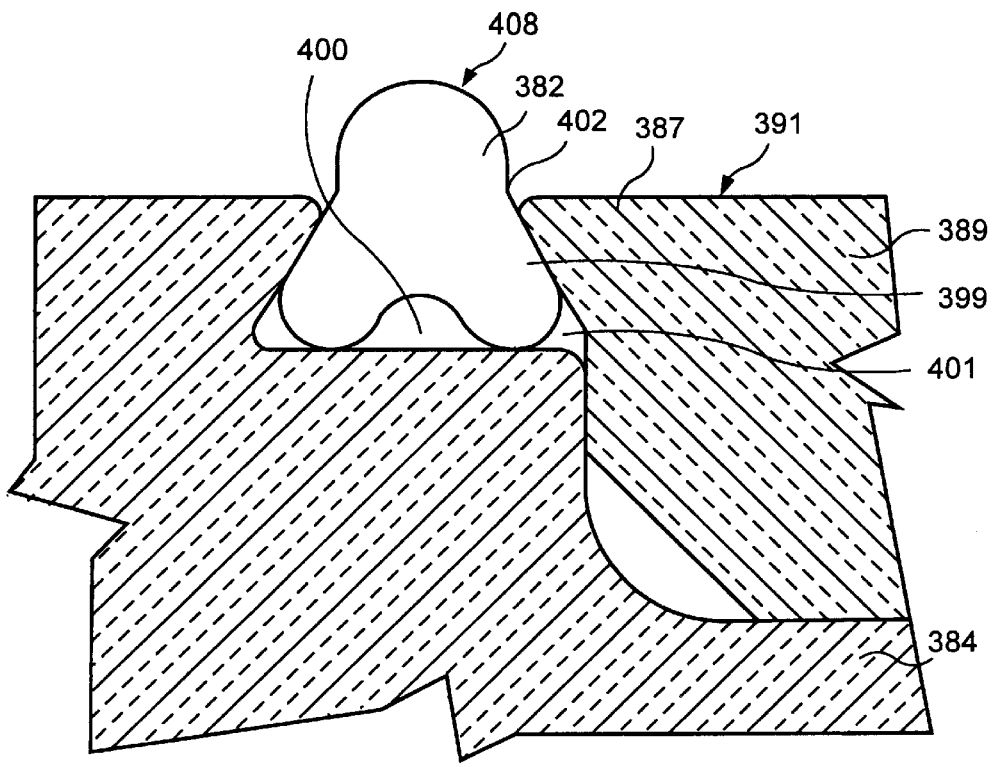
FIG. 27C is an enlarged cross-section view of the heat element housing containing a heat element used for thermobonding woven and non-woven thermoplastic materials with a contour for forming a material cut through and compression seal.
Figure 27D:
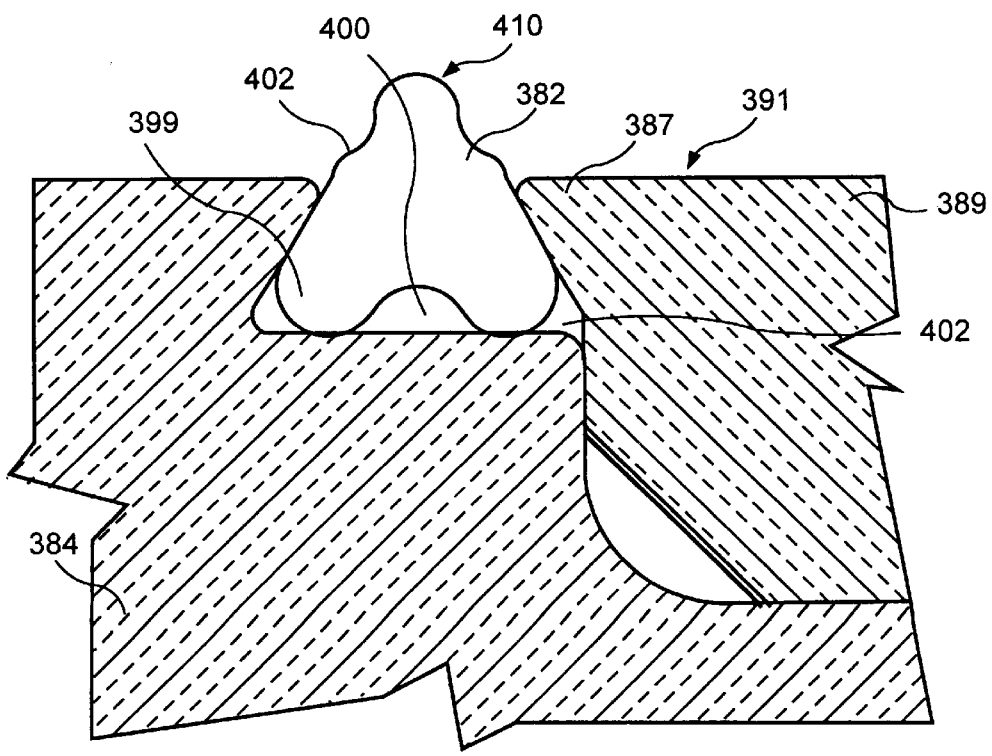
FIG. 27D is an enlarged cross-section view of the heat element housing containing a heat element used to make a thermobonded tear seal in woven and non-woven thermoplastic materials with a contour for forming a tear seal.

Each of the die plates 142, 186 includes a heat element 382 having the contour of the desired seam. The thermobonding element 382 is held to the face 143, 188 of the die plate by a housing member 384 having a channel 385 defined by wedge shaped walls 387 that encloses a portion of the thermobonding element 382. A cross-sectional view taken along the line 27—27 is substantially the same for each of the die plates as shown in FIG. 27A (shown without a thermobonding heat element). FIGS. 27B, 27C and 27D show enlargements of a portion of the housing member 384 containing thermobonding elements 382 of different shapes. The die plates 142, 186 include a metal plate 386 to which the housing member 384 containing the channel 385 is affixed by a fastener means 388 such as, for example, a screw 393. The fastener means 388 includes a set plate 389 to hold the housing member 384 to the metal plate 386. The set plate 389 may form a portion of the wedge shaped wall 387 of the channel 385. This arrangement permits the user to replace the thermobonding element 382 and/or the housing member 384 without replacing the die plate. Moreover, because the set plate 389 can include one of the wedge shaped walls 387 of the channel 385, the size and/or shape of the channel can be modified by replacing a set plate 389 having one wedge shaped wall 387 with a set plate having a different wedge shaped wall. The set plate 389 may also include a relief 401 which is a portion of the set plate that does not contact the metal plate 386, thus allowing space for expansion of the set plate 389 during heating of the thermobonding element 382.

The metal plate 386 further includes a cooling and/or heating trough 390 that defines a channel 392 that follows the contour of the thermobonding element 382 above it, thus providing even temperature along the longitudinal axis of the heat element. The channel 392 of the trough 390 can contain any of a wide variety of means to heat and cool the heat element and thermocouple to sense and control temperature variation within the trough For example, the trough 390 may contain a heat conducting electrical wire or a liquid such as an oil, solution or emulsion that can be heated and cooled and then circulated through the channel 392 at appropriate times. The trough may be continuously heated for heated die sealing or may be intermittently heated for impulse sealing. The metal plate also contains a pair of side channels 394, one adjacent to each side of the trough 390, to hold seals 396 that provide a tight fit between the metal plate 386 and its attached support plate 398. The seals 396 may be made of a resilient liquid-resistant material (e.g., rubber or silicone) to prevent leakage of material from the central channel 392. The support plate 398 may be made of an insulating material to prevent other components of the die assembly from acting as a heat sink.

The upper surface 391 of the metal plate and of the housing member 384 are preferably treated and coated to form a non-smooth electrical insulation. For example, the upper surface 391 may be made of aluminum that is shot peen to eliminate a smooth surface, sharp hills and/or valleys to reduce adhesion of the thermoplastic material to the surface of the plate after bonding, and then hard anodized to give electrical insulation. Adhesion of the thermoplastic material to the surface is undesirable because it can stretch the material as it is moved from the die plate and produce strain on the translator elements. This is especially important when film laminates are used because stretching causes thinning of the thermoplastic material thus reducing the amount of protection provided by the completed glove. The upper surface 391 of the metal plate may also include a cutting element (e.g., a sharp ridge; not shown) adjacent to and outside of the heat element to sever the sealed thermoplastic material (thumb portion or hand and fingers portion or both) from the surrounding scrap material when the thermobonded seam is formed.

Referring to FIGS. 27B, 27C and 27D, the thermobonding element 382 can have a variety of contours all of which include a pair of feet 399 at the base of the element that are held by the wedge shaped walls 387 of the channel 385 in the housing member 384. The heat element includes a relief 400 located between the feet 399. The feet 399 and the relief 400 extend along the longitudinal axis of the thermobonding element 382. The feet secure the heat element within the channel 385. The relief 400 allows for transverse expansion of the thermobonding element 382 within the channel 385 and reduces friction during longitudinal expansion of the element within the channel. The relief 400 also reduces the mass of the heat element, thus allowing better temperature control and facilitating element bending around curves. The thermobonding element 382 has a portion above the upper surface 391 of the housing member 384 with an exposed surface 402 that may be in a variety of contour shapes for thermobonding. The optimal height of the surface 402 of the thermobonding element 382 above the die plate is readily determined by those skilled in the art based on the thickness of thermoplastic material to be bonded.

Different contour shapes are appropriate for producing different thermobonded seals. A "cut-through seal" is a seal that bonds layers of thermoplastic material to produce a seam that is substantially released from the adjacent scrap material because the seal cuts through the material as the seam is formed. A "tear seal" is a seal that bonds layers of thermoplastic material to produce a seam that is still attached to the adjacent scrap material but that can be torn by applying force to the material on either side or both sides of the seam to rip the seam along its longitudinal axis. For example, the contour shape illustrated in FIG. 27B is appropriate for making a cut-through seal (using the contour shown in shadow lines) and a tear seal (using the contour shown in solid lines) on film material.

The contour shape of the heat element shown in FIG. 27C is appropriate for thermobonding woven and non-woven materials to provide a cut-through and compression seal while the contour shape of the heat element shown in FIG. 27D is appropriate for thermobonding woven and non-woven materials to provide a tear seal. In general, a tear seal is produced along an entire seam or preferably at a portion of a seam (e.g. at about the terminal 0.5 cm of the peripheral seam at the wrist of a glove). To produce a tear seal, the height of the heat element is reduced relative to that used to produce a cut-through seal by substantially the thickness of the material to be sealed which can be easily determined by those skilled in the art. The tear-through seal is weaker than the unsealed material strength allowing the seam to be torn when force is applied to the glove and/or the scrap material such that the tear seal acts as a zipper for complete separation of the glove from the scrap material.

Referring to FIG. 27B, the contour shape of the surface 402 shown in cross-section includes a semicircular head 404 having a first height ($H_1$), a flattened head 406 having a second height ($H_2$) that is less than the first height, and a trough 405 that is less than $H_2$ located therebetween. This contour surface is used to thermobond films and laminate films so that the flattened head 406 forms a first wider inner seam, a bead of material is melted within the trough 405 and a second narrower and thinner outer seam is formed by the higher semicircular head. If $H_1$ is that of the contour shown by a solid line a tear seal will be formed, such as is desirable at the wrist of a glove to maintain the glove in place during manufacturing but allow for it to be pulled away from scrap material when the glove is completed. If $H_1$ is that of the contour shown in shadow line a cut-through seal will be formed, such as is desirable around substantially most of the peripheral seam, thus forming a smooth seam with a clean cut edge for complete separation of the glove from the scrap material, rather than a ragged edge which may result when a tear seal is torn to remove the completed glove from the manufacturing process line. The difference in height between contour shape used to form a tear seal and to form a cut-through seal is determined by the thickness of the material to be thermobonded. It will be understood that a single thermobonding heat element may have a contour for forming a tear seal at some portion(s) of the heat element and a contour for forming a cut-through seal at other portions of the heat element, as will readily be determined by the type of seal desired. The bead formed in the trough 405 provides strength to the seam and maintains the integrity of the inner seam formed by the flattened head 406 when the tear seal is broken.

The contour shape of the heat element surface 402 shown in cross-section in FIG. 27C includes a single semicircular head 408 that is used to thermobond woven and non-woven materials to form a cut-through seal at the seam. The width of the head may be varied to provide different amounts of compression during sealing, thus forming a narrower or wider seam as will be readily understood by those skilled in the art. FIG. 27D illustrates in cross-section a contour surface 402 shape that is curvilinear with a small semicircular head 410 to produce a tear seal. This contour shape produces tear seal that is substantially a thin seal in the bonded material with ridges on both sides of the crease. When the tear seal contour shape shown in FIG. 27D is used in combination with the cut-through seal contour shape shown in FIG. 27C, the height of the tear seal contour is less than that of the cut-through contour as determined by the thickness of the material to be sealed as described above.

Other contour shapes are also envisioned for the heat element (e.g., one or more elliptical heads or cone-shaped heads). Moreover, a single heat element may have a combination of contour shapes at different points along its longitudinal axis as needed to produce different types of seams in the same article. For example, a heat element may include a contour surface as shown in FIG. 27D at one or both termini with a semicircular head as shown in FIG. 27C therebetween. The combinations of contour shapes needed to produce different types of seams can be readily determined by those skilled in the art.

As shown in FIGS. 27B, 27C and 27D, the wedge shaped walls 387 of the channel 385 provide a number of advantages. The wedge shaped walls 387 hold the thermobonding element 382 in the channel 385 without the need for adhesives (e.g., epoxy) which degrade and break due to heating and expansion of the thermobonding element 382 during use. The wedge shaped walls 387 eliminate the need for a series of set screws that directly hold the heating element in place but act as a heat sink producing uneven or intermittent sealing of materials by the heat element. Moreover, the wedge shaped walls 387 contact the heat element along its entire length thus providing even heat through the entire element (i.e., eliminating hot and cold spots), while allowing for expansion and contraction of the heat element along its longitudinal axis.

For all of the devices illustrated and described herein, it will be understood that any of the components may further include sensors and/or signaling devices to automatically control and coordinate the elements of the system during operation. Any of a variety of well known electrical, electrochemical, mechanical and computer controlled sensing and signaling devices are within the scope of the invention.

Although the present invention has been described in the context of particular examples and preferred embodiments, it will be understood that the invention is not limited to such embodiments. Instead, the scope of the present invention shall be measured by the claims that follow.

What is claimed is:

1. A glove, comprising:
    a wrist portion, said wrist portion formed from at least two layers of thermoplastic material such that said wrist portion has an outside surface, an inside surface, a lower end and an upper end, wherein said lower end defines an aperture of said glove for inserting a hand therethrough;
    a hand portion, said hand portion formed from at least two layers of thermoplastic material such that said hand portion has an outside surface, an inside surface, a lower end and an upper end, wherein said lower end of said hand portion is connected to said upper end of said wrist portion;
    a plurality of diverging fingers, said fingers formed from at least two layers of thermoplastic material such that each finger has a lower end defining an opening for inserting a user's finger therethrough and an upper end, said upper end of said finger being closed;
    a peripheral seam, said peripheral seam being a thermobonded seam joining said at least two layers of thermoplastic material, thereby forming said wrist portion, said hand portion and said diverging fingers, such that said wrist portion and said hand portion are aligned along a longitudinal axis that is perpendicular to said upper end of said wrist portion and to said lower and upper ends of said hand portion;
    a thumb portion, said thumb portion formed from at least two layers of thermoplastic material and having an inside surface and an outside surface, wherein said inside surface is connected to said inside surface of said hand portion, defining an internal opening for inserting a user's thumb into said thumb portion, said internal opening being located substantially along said longitudinal axis, and wherein said thumb portion extends over said hand portion at about a 45° angle relative to said longitudinal axis; and
    a thumb seam, said thumb seam being a thermobonded seam joining said at least two layers of thermoplastic material that form said thumb portion, said thumb seam having a curvilinear portion and a linear portion, said curvilinear portion defining a peripheral edge of said thumb portion and said linear portion defining a seam formed in said hand portion, wherein said linear portion is substantially parallel to said longitudinal axis.

2. The glove of claim 1, wherein said linear portion of said thermobonded thumb seam extends in a first direction to said peripheral seam adjacent to said lower ends of said fingers, and wherein said linear portion extends in a second direction to said lower end of said wrist portion.

3. The glove of claim 1, further comprising at least one thermobonded seam transverse to said longitudinal axis on a palm of said glove.

4. The glove of claim 3, wherein said glove comprises at least two thermobonded seams transverse to said longitudinal axis on said palm of said glove, wherein at least one thermobonded seam joins said upper end of said hand portion and thermoplastic material that forms said fingers, and wherein at least one thermobonded seam joins said upper end of said wrist portion and said lower end of said hand portion.

5. The glove of claim 3, wherein said thumb seam intersects said thermobonded seam transverse to said longitudinal axis on said palm.

6. The glove of claim 1, wherein said thermoplastic material is flexible and about 3 to 15 mils thick.

7. The glove of claim 5, wherein said thermoplastic material is about 6 to 10 mils thick.

8. The glove of claim 1, wherein said thermoplastic material is an array of nonwoven spunbonded fibers, an array of woven or knit thermoplastic fibers, a polymeric film, or a laminate combination thereof.

9. The glove of claim 8, wherein said thermoplastic material comprises sheets of spunbonded polyolefin fibers, polyester, nylon, polytetrafluoroethylene (PTFE) or rayon acrylic.

* * * * *